United States Patent
Sakahara et al.

(10) Patent No.: US 9,596,376 B2
(45) Date of Patent: Mar. 14, 2017

(54) PHOTOGRAPH STICKER CREATING APPARATUS, AND A METHOD OF GENERATING PHOTOGRAPH STICKER

(71) Applicant: FURYU CORPORATION, Tokyo (JP)

(72) Inventors: Wakako Sakahara, Kyoto (JP); Ryoko Inagaki, Osaka (JP); Tsuneo Okada, Hyogo (JP); Sadayasu Araki, Kanagawa (JP); Koki Imai, Hyogo (JP); Yoshiko Takemura, Kyoto (JP)

(73) Assignee: FURYU CORPORATION, Tokyo (JP)

( * ) Notice: Subject to any disclaimer, the term of this patent is extended or adjusted under 35 U.S.C. 154(b) by 0 days.

(21) Appl. No.: 14/868,657

(22) Filed: Sep. 29, 2015

(65) Prior Publication Data

US 2016/0142580 A1    May 19, 2016

(30) Foreign Application Priority Data

Nov. 14, 2014   (JP) ................. 2014-232104

(51) Int. Cl.
  *H04N 1/21* (2006.01)
  *H04N 1/00* (2006.01)
  *G06K 15/02* (2006.01)

(52) U.S. Cl.
  CPC ......... *H04N 1/2154* (2013.01); *G06K 15/024* (2013.01); *H04N 1/00148* (2013.01); *H04N 1/00167* (2013.01); *H04N 1/00175* (2013.01); *H04N 1/00183* (2013.01); *H04N 1/00278* (2013.01); *H04N 1/00289* (2013.01)

(58) Field of Classification Search
  CPC ............ H04N 1/2154; H04N 1/00148; H04N 1/00167; H04N 1/00175; H04N 1/00183; H04N 1/00278; H04N 1/00289; H04N 1/00132; H04N 1/00188; H04N 1/00196;
(Continued)

(56) References Cited

U.S. PATENT DOCUMENTS 6,408,132 B1 * 6/2002 Ishikawa ............. G03D 15/001
                                                              396/2
6,738,567 B2   5/2004 Maeda et al.
(Continued)

FOREIGN PATENT DOCUMENTS

JP    2011232630 A    11/2011
JP    2013109307 A    6/2013

*Primary Examiner* — Nicholas Giles
(74) *Attorney, Agent, or Firm* — Capitol City TechLaw

(57) ABSTRACT

A photograph sticker creating apparatus includes an image pickup device that generates a shot image, a storage device that stores a plurality of composite-use images to be combined with shot images, a compositing processor that combines the shot image and the composite-use image to generate a composite image, a printing device that prints the composite image on a sticker sheet, a display processor that generates and displays a selection screen allowing the user to select a composite-use image from a plurality of composite-use images, and a direction receiving device that receives selection of composite-use image performed by the user on the selection screen. The display processor combines a predetermined portrait image with the selected composite-use image and does not combine the portrait image with a composite-use image other than the selected composite-use image, to generate and display the selection screen.

16 Claims, 48 Drawing Sheets

(58) Field of Classification Search
CPC ........... H04N 1/00249; H04N 1/00265; H04N 1/00485; G06K 15/024
See application file for complete search history.

(56) References Cited

U.S. PATENT DOCUMENTS

| | | |
|---|---|---|
| 6,915,071 B2 | 7/2005 | Maekawa et al. |
| 7,020,390 B2 | 3/2006 | Maeda et al. |
| 2006/0077278 A1* | 4/2006 | Parulski ............. H04N 1/00132 348/333.01 |
| 2007/0147704 A1* | 6/2007 | Hirai ................ G03G 15/04018 382/294 |
| 2012/0179960 A1* | 7/2012 | Cok .................. H04N 1/00164 715/243 |
| 2012/0327252 A1* | 12/2012 | Nichols ................. H04N 5/772 348/207.1 |
| 2016/0055388 A1* | 2/2016 | Watari ............... H04N 1/00183 382/291 |

* cited by examiner

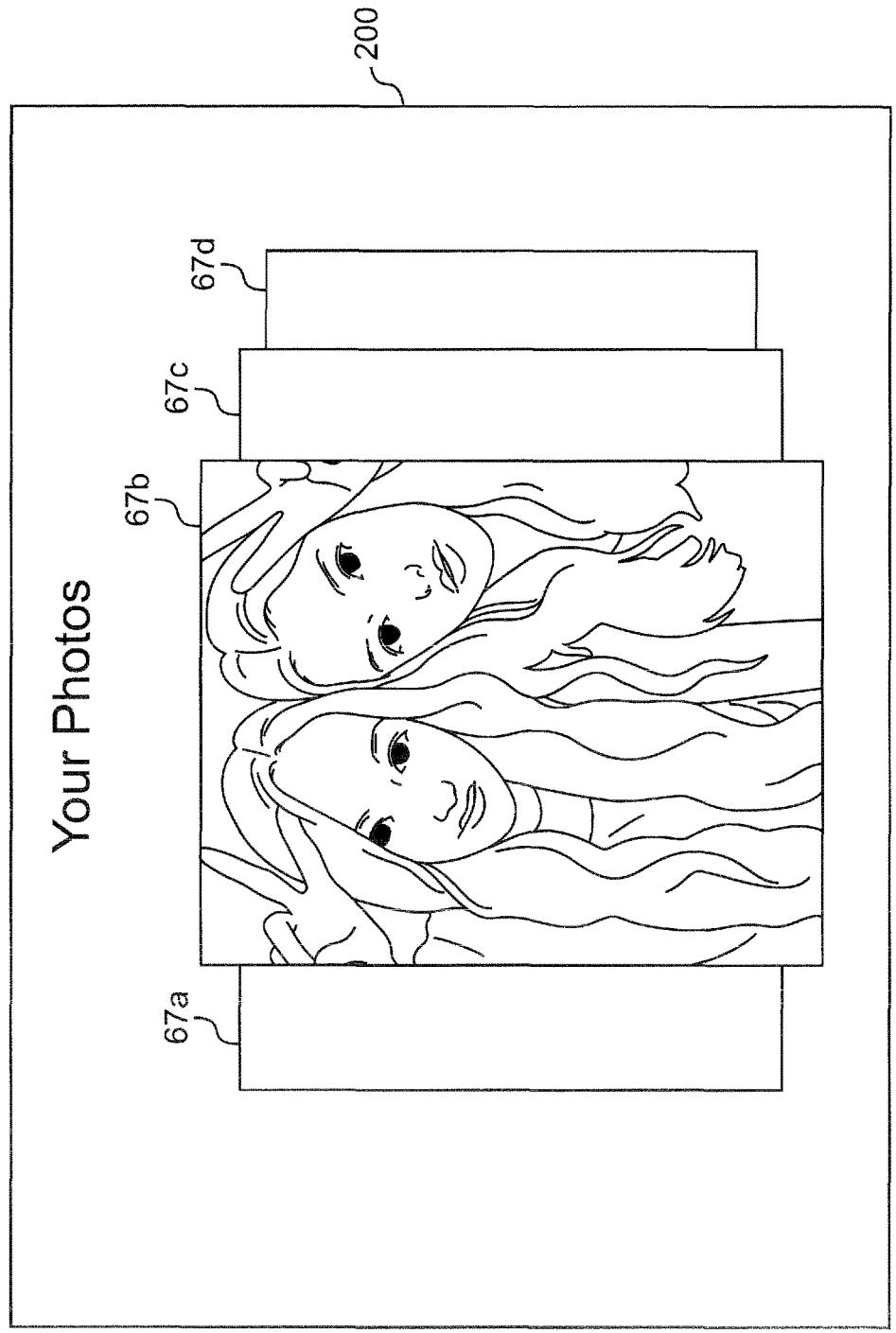

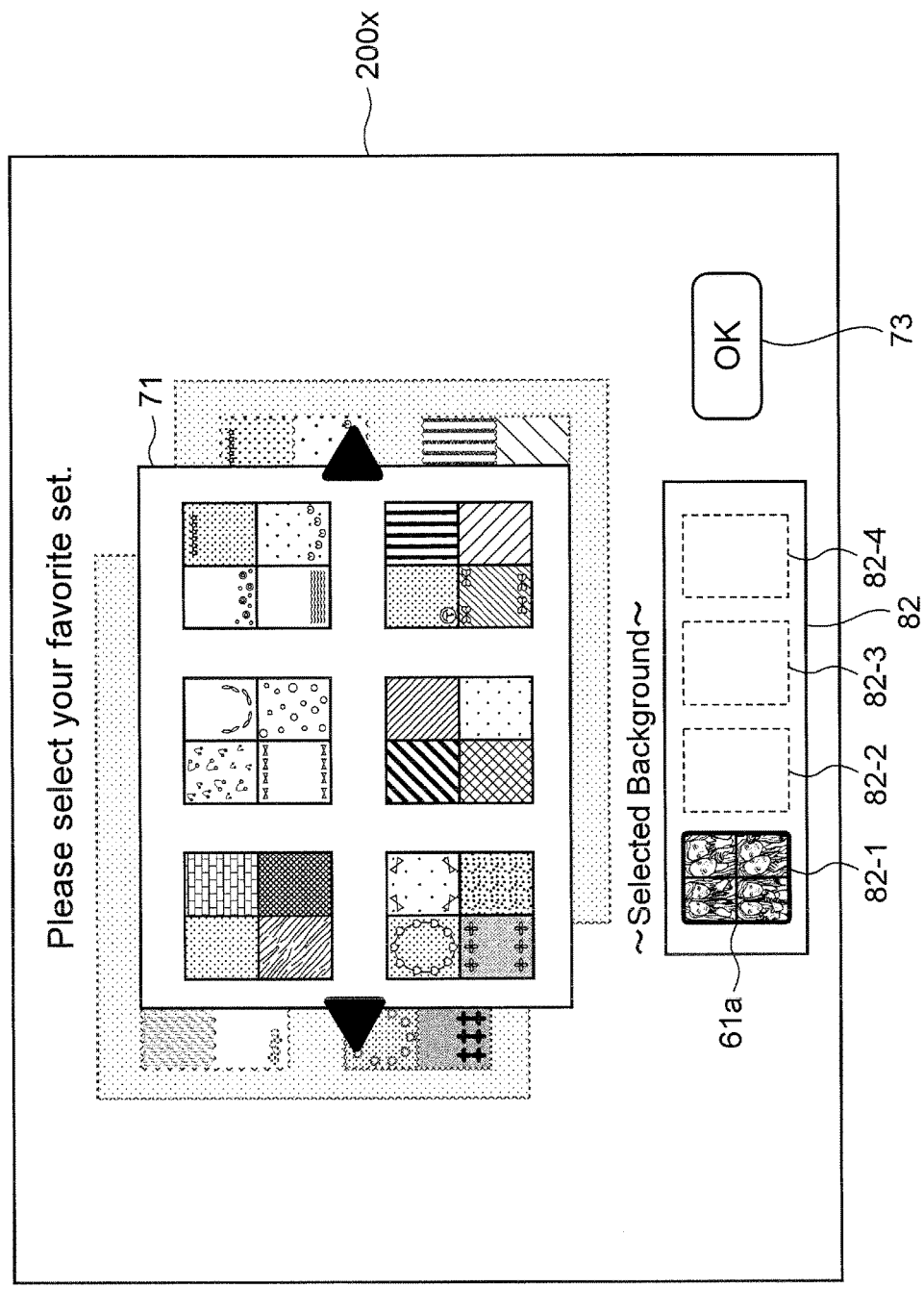

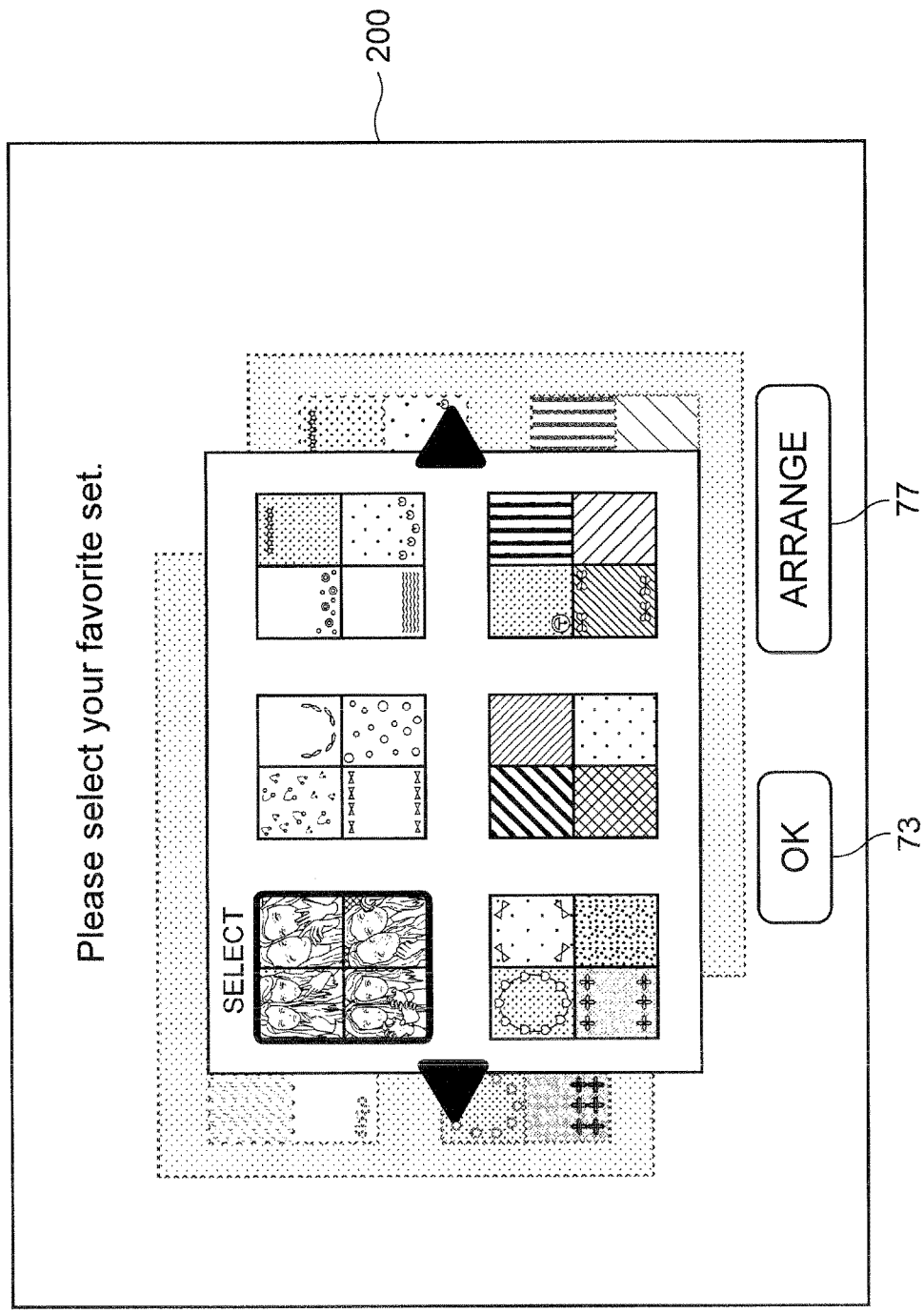

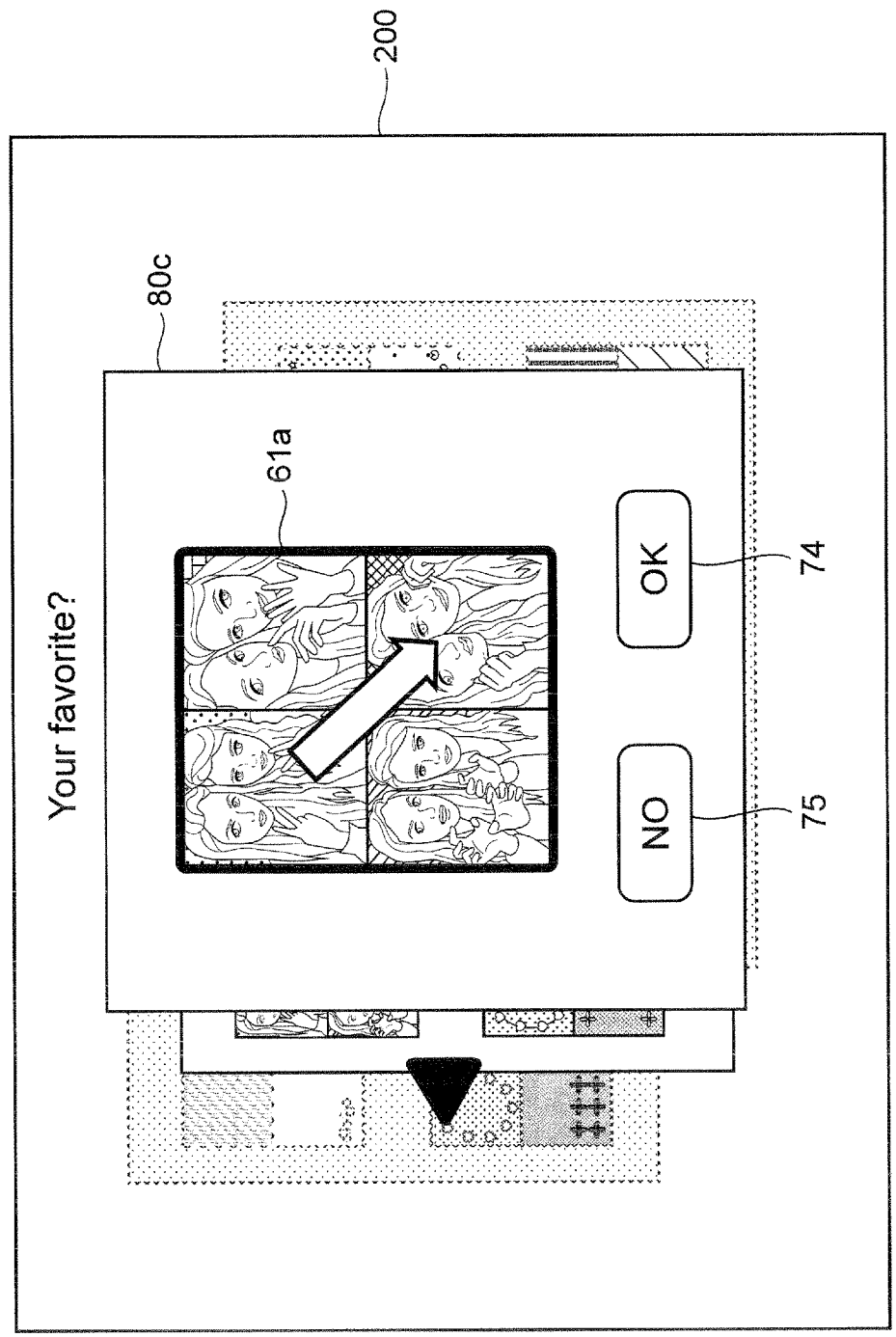

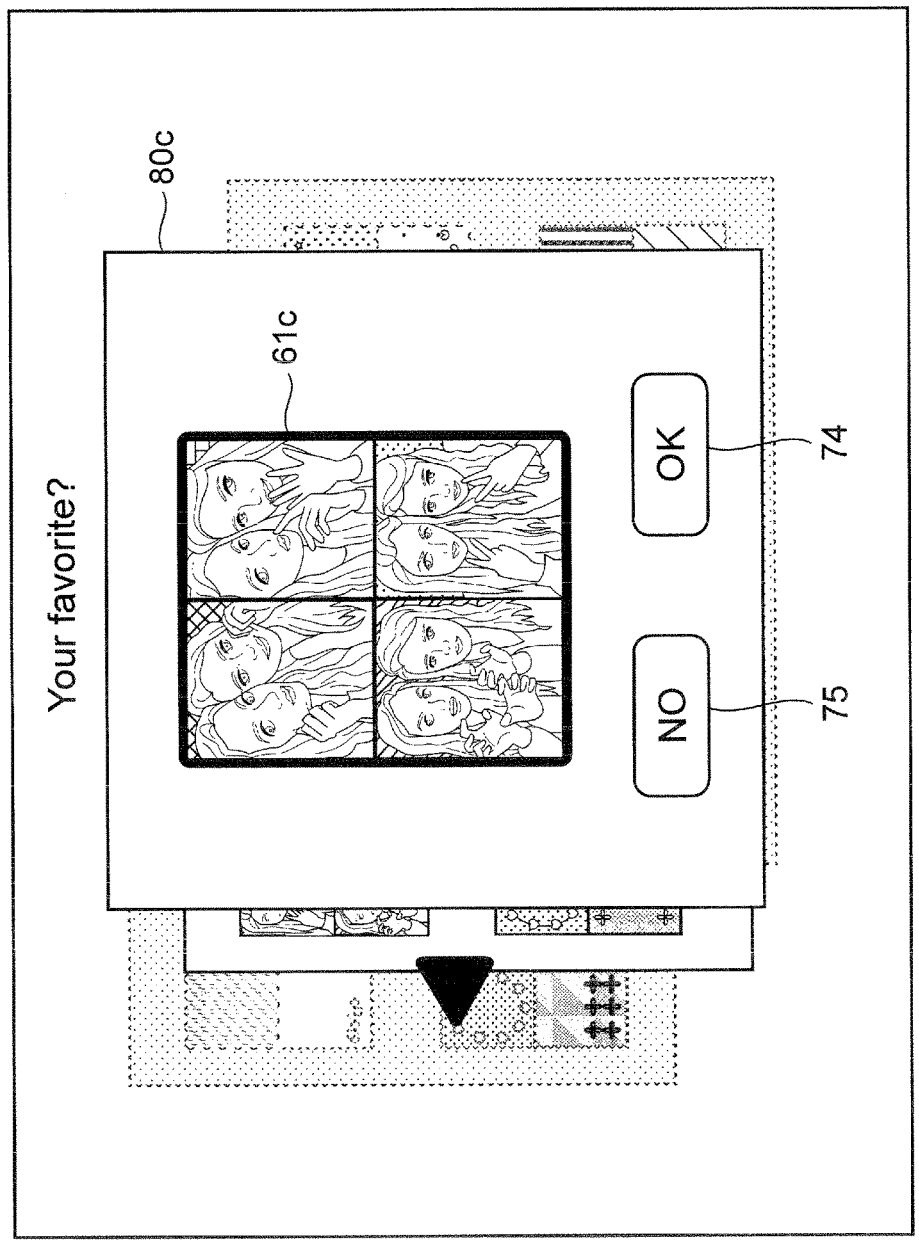

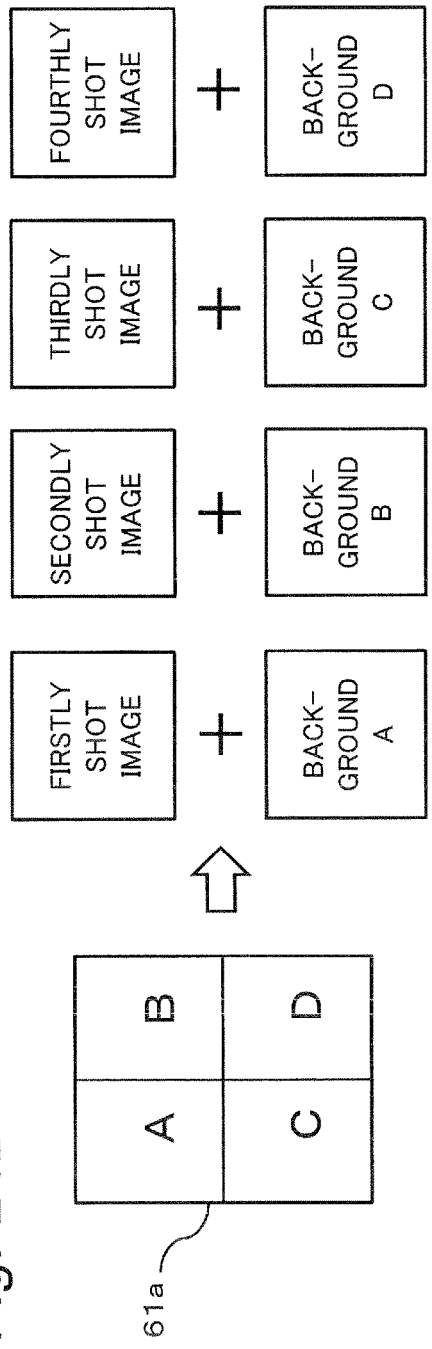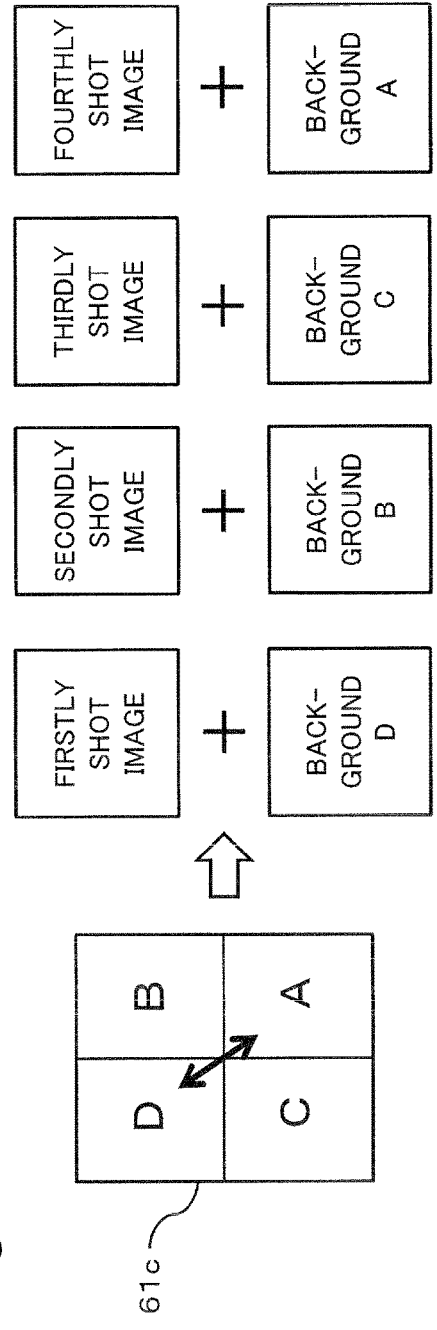

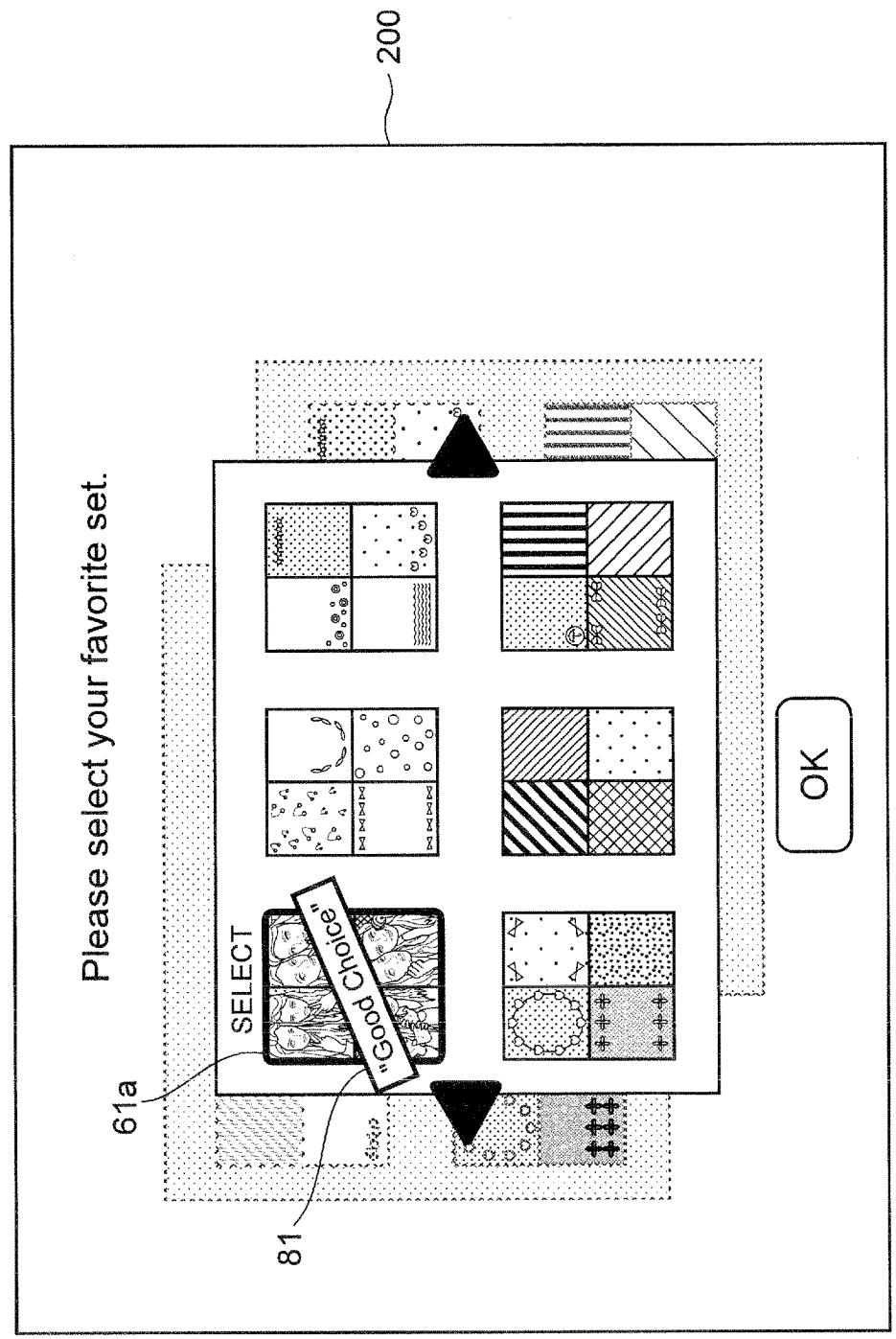

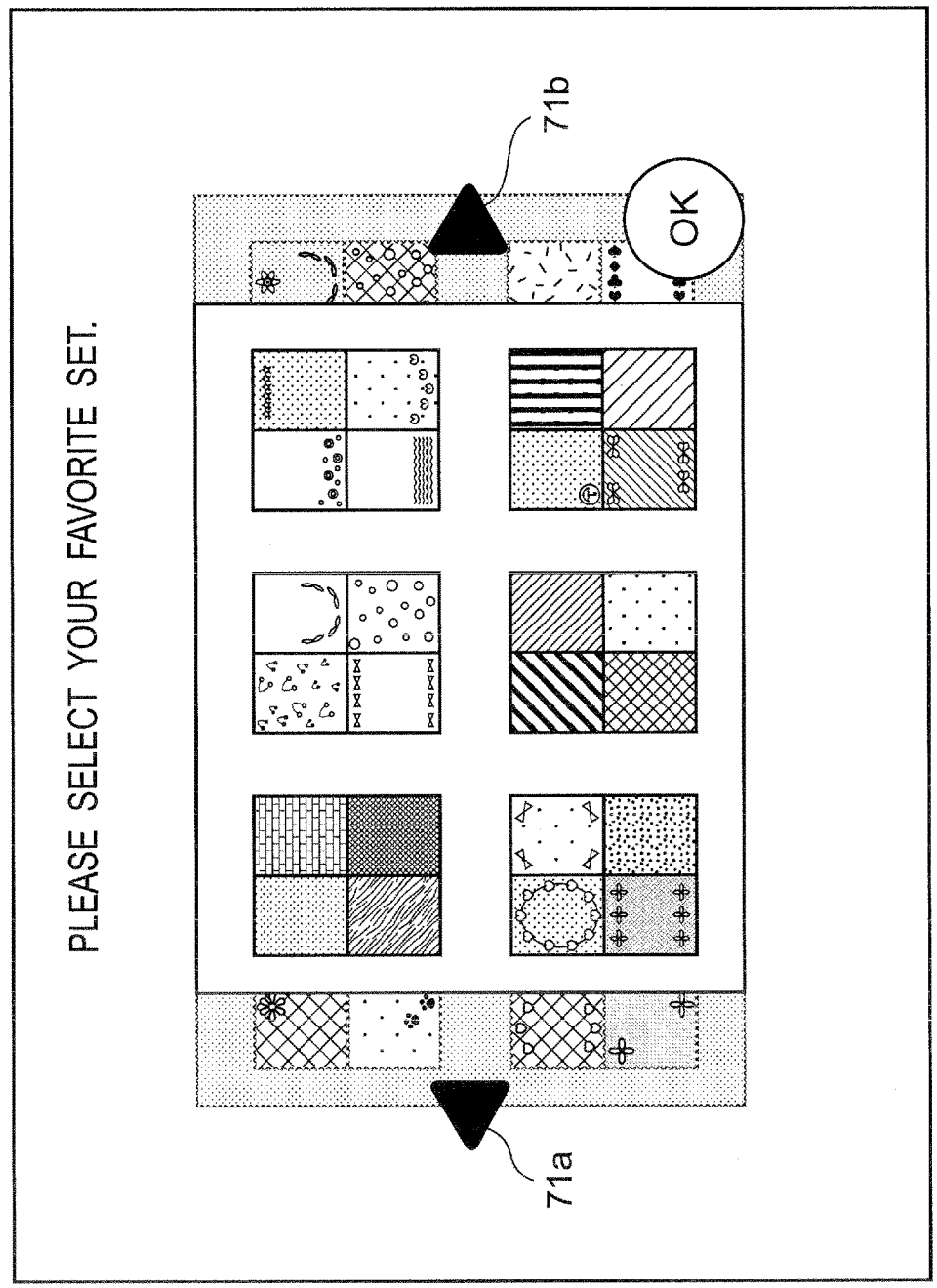

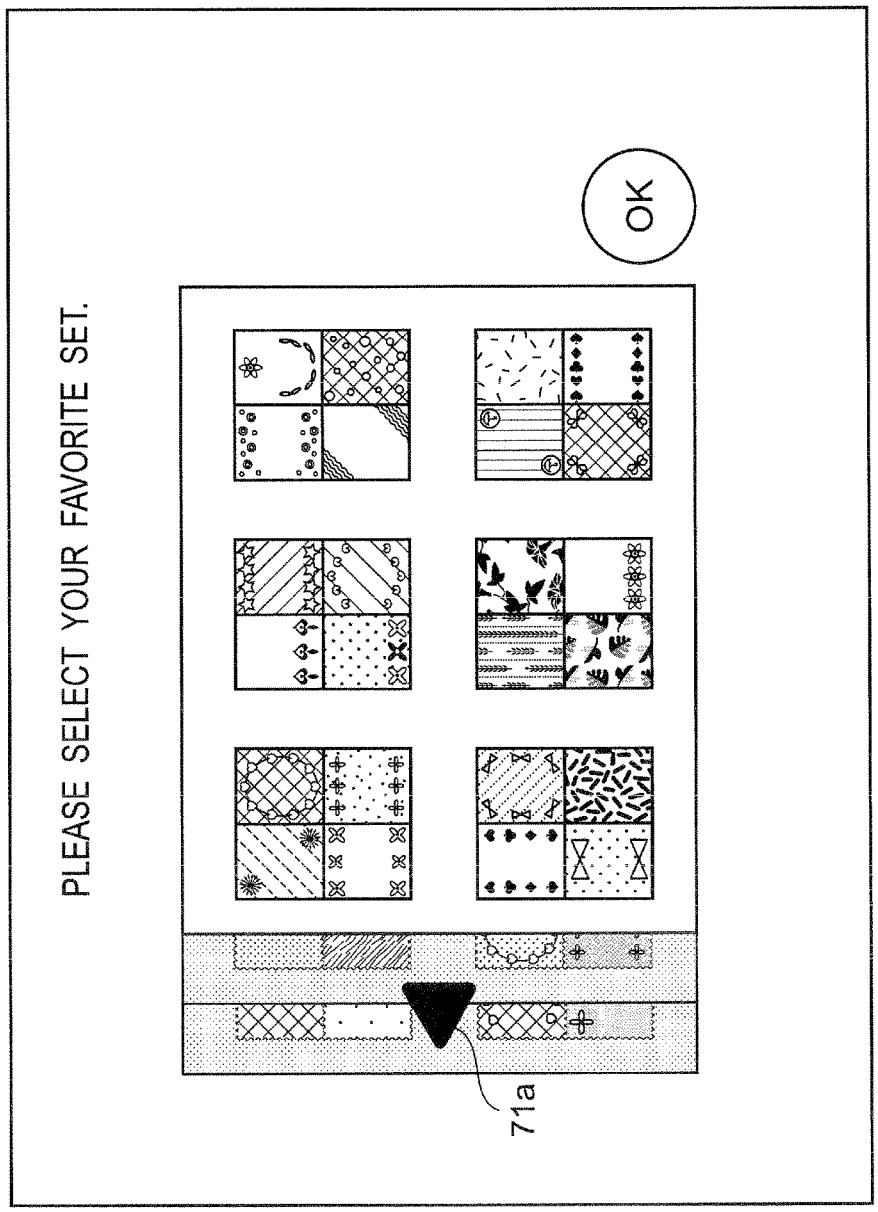

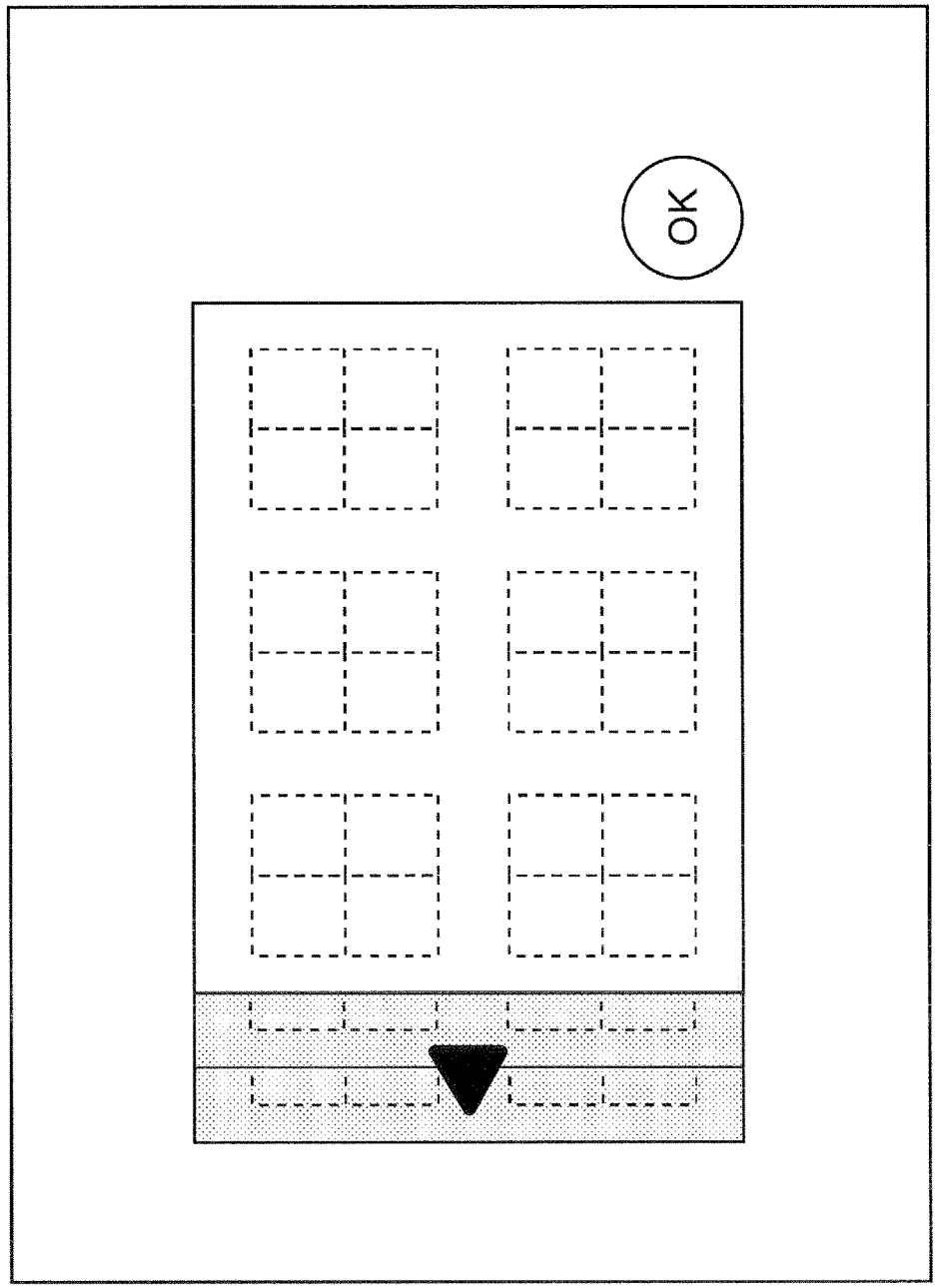

PHOTOGRAPH STICKER CREATING APPARATUS, AND A METHOD OF GENERATING PHOTOGRAPH STICKER

BACKGROUND OF THE INVENTION

1. Technical Field

The present invention relates to a photograph sticker apparatus that prints a composite image generated by combining a shot image with a predetermined image (background image, and so on) on sticker sheet.

2. Related Art

There has been known a photograph sticker creating apparatus that photographs a user (subject), edits the shot image, prints the edited shot image on a sticker sheet, and finally provides the user with the sticker sheet, as a photograph sticker (for example, Unexamined Japanese Patent Publication No. 2013-109307, and Japanese Patent No. 5521744).

In the photograph sticker creating apparatus, the user can enjoy a photograph sticker creating operation as a game (photograph sticker creating game). The photograph sticker creating game proceeds in order of photographing a subject, editing the shot image, and outputting (printing) the edited image on a photograph sticker. The user can play a series of the procedures by means of the photograph sticker creating apparatus within a limited time, and receive a photograph sticker created as a product.

The photograph sticker creating apparatus can perform a process of combining a predetermined background image with a shot image as one of editing processes. The background image to be combined with the shot image is usually selected by the user out of a plurality of images to be combined which are prepared in advance. Hence the photograph sticker creating apparatus displays a selection screen for selecting a background image. The user selects a desired background image on this selection screen.

For example, Unexamined Japanese Patent Publication No. JP2013-109307A discloses a photograph sticker creating apparatus that displays a selection screen used for selecting a composite-use image which is used as a background of a subject in a shot image, or the like. On this selection screen, a composite image generated by combining an image of the subject (person) in the shot image and the composite-use image (background image) are displayed. Further, the photograph sticker creating apparatus is provided with a "person erasing button" for erasing the display of the subject (person) on the selection screen. By means of the person erasing button, on the selection screen, a display status of the composite image generated by combining the image of the subject (person) in the shot image with the composite-use image (background image) is switched into a status where the image of the subject (person) is not combined. That is, only the composite-use images (background image) can be displayed by means of the person erasing button. This facilitates the user's checking of colors and a pattern of the composite-use image (background image).

The photograph sticker creating apparatus of JP2013-109307, A is capable of switching the display between the display of the composite images generated by combining the shot images with the background images and the display of the background images alone by operating the person erasing button.

However, when the person erasing button is operated, all composite-use images (background images) are displayed, with the shot images combined therewith. This allows the user to easily imagine composite images for all the composite-use images (background images) which are being displayed. On the other hand, it becomes difficult for the user to grasp which background image is selected. This problem becomes more significant with increase in the number of images to be combined (background images).

SUMMARY OF THE INVENTION

The present disclosure provides a photograph sticker apparatus which performs a process of combining a shot image with a composite-use image, and which is capable of facilitating the user to grasp the shot image to which the composite-use image is combined, and also to recognize a composite-use image selected on a screen for selecting a composite-use image to actually be combined.

In a first aspect of the present disclosure, a photograph sticker creating apparatus is provided. The photograph sticker creating apparatus includes an image pickup device configured to shoot an image of a user to generate a shot image, a storage device configured to store a plurality of composite-use images, each composite-use image to be combined with the shot image, a compositing processor configured to combine the shot image generated in the image pickup device and the composite-use image to generate a composite image, a printing device configured to print the composite image on a sticker sheet, a display processor configured to generate and display a selection screen which allows the user to select a desired composite-use image to be used for the composite image from a plurality of composite-use images, the selection screen including the plurality of composite-use images disposed in an image selection region, and a direction receiving device configured to receive selection of the composite-use image performed by the user on the selection screen. The display processor combines (composites) a predetermined portrait image with the composite-use image selected by the direction receiving device and does not combine the portrait image with a composite-use image other than the selected composite-use image, in the image selection region, to generate and display the selection screen.

In a second aspect of the present disclosure, a method of creating a photograph sticker is provided. The method includes shooting an image of a user to generate a shot image with an image pickup device, generating a selection screen which allows the user to select a desired composite-use image to be used for the composite image from a plurality of composite-use images stored in a predetermined recording medium, the selection screen including the plurality of composite-use images disposed in an image selection region, displaying the selection screen on a display unit, receiving selection of the composite-use image performed by the user on the selection screen, combining the shot image generated in the image pickup device and the composite-use image selected on the selection screen to generate a composite image, and printing the composite image on a sticker sheet with a printing device. In the generating the selection screen, on an image selection region, a predetermined portrait image is combined with the selected composite-use image, and the predetermined portrait image is not combined with a composite-use image other than the selected composite-use image, thereby to generate the selection screen.

According to the present disclosure, a predetermined portrait image is displayed on the selection screen for image compositing, to a selected composite-use image. This enables the user to easily grasp an image to be obtained after image compositing. Further, the predetermined portrait image is displayed only to the selected composite-use image, but is not displayed to a non-selected composite-use image. This enables the user to easily recognize the selected composite-use image on the composite-use image selection screen.

BRIEF DESCRIPTION OF DRAWINGS

FIG. 5A is a diagram showing an example of all preview screen.

FIG. 20B is a view explaining the background selection process of the sixth modified example;

FIG. 24A is a view explaining a background selection process of an eighth modified example (a background selection screen which enables changing of the order of background images);

FIG. 24B is a view explaining the background selection process of the eighth modified example;

FIG. 24C is a view explaining the background selection process of the eighth modified example;

FIG. 24D is a diagram for explaining an effect by interchanging the order of background images in the composite images;

FIG. 24E is a diagram for explaining the effect by interchanging the order of the background images in the composite images;

FIG. 28 is a view explaining the background selection process of the ninth modified example (display of information indicating affirmation to the user's selection);

FIG. 38A is a view showing other examples of the background selection screen;

FIG. 38C is a view showing the state of the background selection screen of which page is scrolled to the next page from the page as shown in FIG. 38A;

FIG. 39C is a view of the background selection screen with drawing patterns of background sets removed from the background selection screen shown in FIG. 38C.

DETAILED DESCRIPTION OF EMBODIMENTS

Hereinafter, specific embodiments of the present invention are described with reference to the attached drawings.

First Embodiment

A photograph sticker creating apparatus as one embodiment of the present invention is a game machine (a machine for providing a service of play) that allows a user to perform photographing, editing and the like as a game (service of play) and provides the user with the photographed/edited image, as a photograph sticker or data. For example, the photograph sticker creating apparatus 1 is installed in a game arcade, a shopping mall, a shop in a tourist resort, and/or the like.

In a game provided by the photograph sticker creating apparatus, the user photographs himself/herself or the like with a camera provided in the photograph sticker creating apparatus. The user combines the shot image with a foreground image and/or a background image, or edits the image with an editing function (graffiti editing function) by inputting pen image or stamp image which are images to be combined and edited, to design the shot image to be a colorful one. Then, after completion of the game, the user receives, as a product, a photograph sticker printed with the edited image, or the like. Alternatively, the photograph sticker creating apparatus 1 sends the edited image to user's mobile terminal so that the user can obtain the product with the mobile terminal.

1. Configuration of Photograph Sticker Creating Apparatus
1.1 Outer Appearance

Figure 1A:
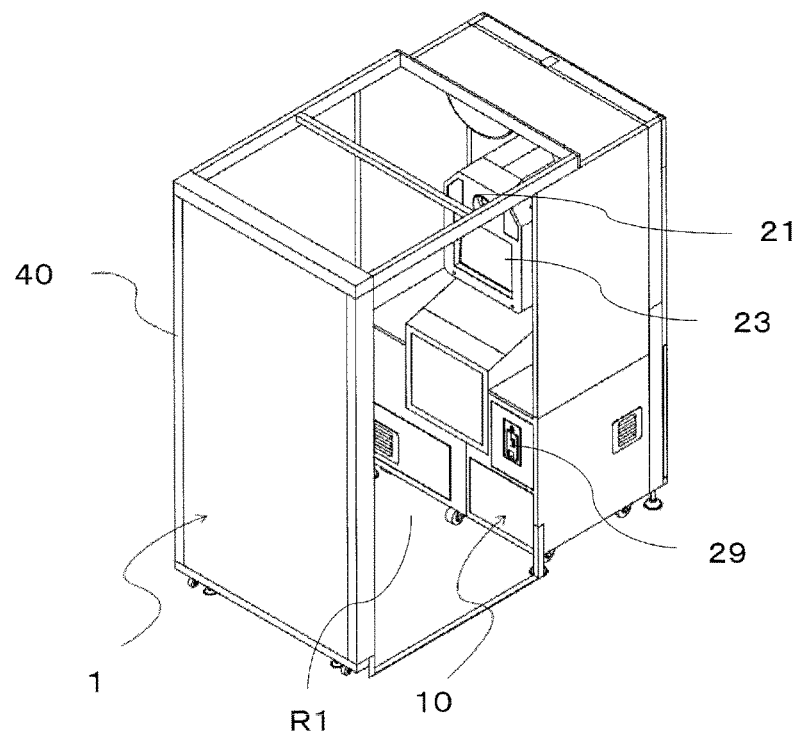
FIGS. 1A and 1B are perspective views of a photograph sticker creating apparatus as one embodiment of the present invention.

FIG. 1 is a perspective view showing an appearance of a photograph sticker creating apparatus as one embodiment of the present invention. As shown in FIG. 1A, the photograph sticker creating apparatus 1 includes a photographing unit 10 that performs photographing and editing, and a background unit 40 that controls a background for the photographing. A space between the photographing unit 10 and the background unit 40 constitutes a photographing space R1 where the user performs photographing.

Figure 1B:
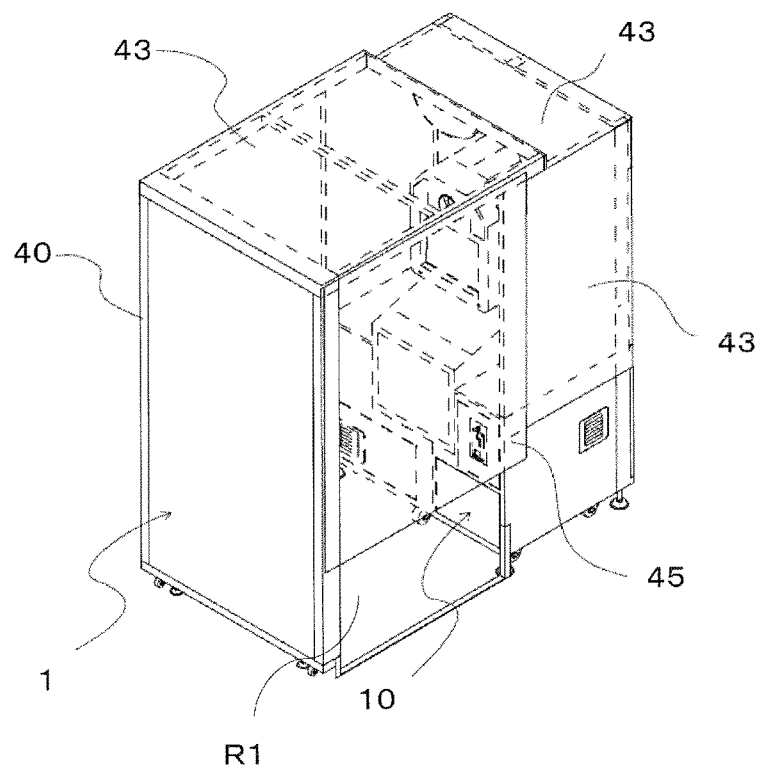

When installed and used in a game arcade or the like, the photograph sticker creating apparatus 1 is installed with its upper portion and part of its side portion covered by a shielding sheet 43 as shown in FIG. 1B. Further, the photograph sticker creating apparatus 1 is installed in a state that an opening (entrance for the user) on a lateral side of the apparatus between the photographing unit 10 and the background unit 40 is covered by a curtain 45. In such a manner, the curtain 45 shields the space (photographing space R1) inside the photograph sticker creating apparatus 1 from the outside. This allows the user to perform photographing operation within the photographing space R1 while avoiding eyes of people outside the apparatus 1. Meanwhile, the curtain 45 does not cover the lower portion of the opening (entrance) on the side of the photograph sticker creating apparatus 1, thereby preventing the photographing space R1 from being completely closed for the sake of crime prevention. Images for advertisement, information indicating instructions for the game provided by the apparatus 1, or the like are printed on the curtain 45 and the shielding sheet 43.

Figure 2A:
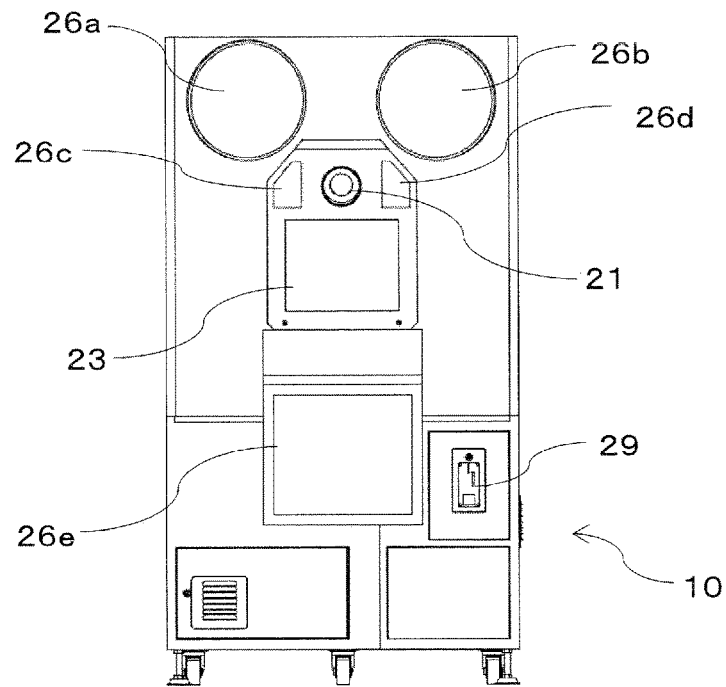
FIGS. 2A and 2B are a front view and a rear view of the photograph sticker creating apparatus, respectively.
Figure 2B:
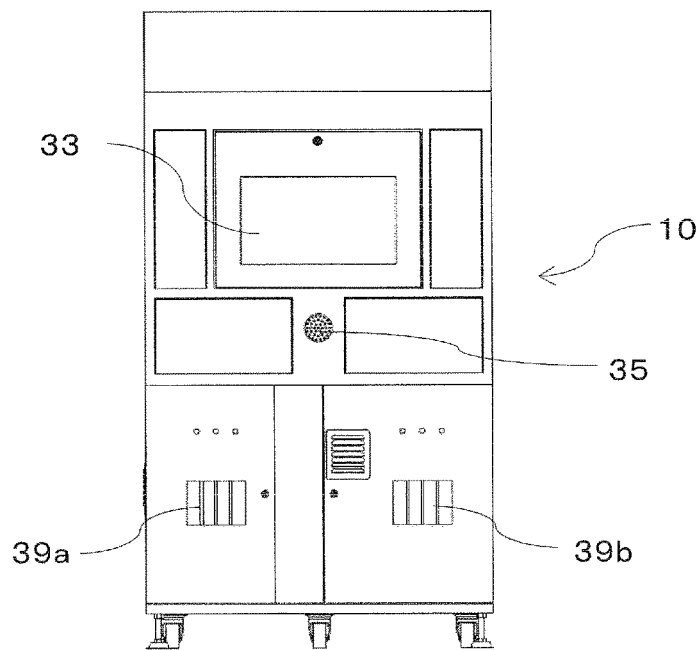

FIGS. 2A and 2B show a front view and a rear view of the photograph sticker creating apparatus 10, respectively. As shown in FIG. 2A, a camera 21, lighting apparatuses 26a to 26e, a touch panel monitor 23 and a coin insert/return port 29 are provided on the front surface of the photographing unit 10. Instead of the coin insert/return port 29, a credit card reader and/or a money changer may be provided.

The camera 21 shoots (picks up or captures) an image of a subject (user) to generate a shot image. The camera 21 includes an image capturing device such as a CCD or a CMOS image sensor. A position of the camera 21 and the number of the cameras 21 are not restricted to the example shown in FIG. 2A.

The touch panel monitor 23 displays guidance of the photograph sticker creating game and guidance of how to play it, a demonstration screen, and the like. Further, the touch panel monitor 23 receives a direction from the user by a touch operation. The touch panel monitor 23 is configured of an LCD (Liquid Crystal Display), an organic EL display, or the like. A colorless and transparent touch sensor (e.g., pressure type, electromagnetic induction type) is superimposed on the screen of the touch panel monitor 23. For example, by touching the touch sensor with a stylus pen (not shown), the user's finger or the like, information of touched position (direction by the user) can be inputted. The touch panel monitor 23 displays a selection screen, as a GUI for selecting a background image and/or a foreground image (composite-use image) to be combined with a shot image generated by the camera 21.

The lighting apparatuses 26a to 26e are apparatuses that irradiate the subject with illumination light at the photographing of the subject. The lighting apparatuses 26a to 26e are each configured of a fluorescent lamp, LED lighting equipment, lighting equipment capable of emitting an electronic flash, or the like.

The coin insert/return port 29 is an opening where the user inserts a game fee for the photograph sticker creating game and receives change, or the like. Although not shown, a speaker for providing a voice guidance, a sound effect, and the like to the user in the photographing space R1 is provided on the side surface of the photographing unit 10.

As shown in FIG. 2B, a tablet built-in monitor 33, a speaker 35 and a sticker outlet 39a and 39b are provided on the rear surface of the photographing unit 10.

The tablet built-in monitor 33 displays an editing screen, as a GUI for editing a shot image generated by the photographing operation in the photographing space R1, or the like. On the editing screen, two images to be edited are simultaneously displayed so that each of a pair of users can individually perform graffiti editing with a stylus pen. These two simultaneously displayed images to be targets for the graffiti editing may be the same one or different ones.

The tablet built-in monitor 33 is composed of a tablet that can input information of touched position with the stylus pen, and a monitor having a display device that can display an image. Here, the tablet is, for example, a pressure-type or electromagnetic induction-type input device (touch sensor), and it is colorless and transparent, and is installed on a display screen of the display device. The display device is an LCD, an organic EL display or the like. That is, the tablet built-in monitor 33 does not only display a GUI screen or the like by means of the display device, but also receives an input operation form the user by means of the tablet. The tablet built-in monitor 33 may include a touch panel monitor by which a user can input information with user's finger, or the like.

The speaker 35 outputs a voice or sound concerning the editing operation of the photograph sticker creating game, such as a voice guidance, a sound effect and a BGM. The number of the speakers 35 installed, and a design, a shape and the like of the speaker 35 are arbitrary.

The sticker outlets 39a and 39b ejects a photograph sticker generated, based on the shot image taken in the photographing space R1, by reflecting a selection made in the photographing space R1 and edition performed in an editing space R.

1.2 Internal Configuration

Figure 3:
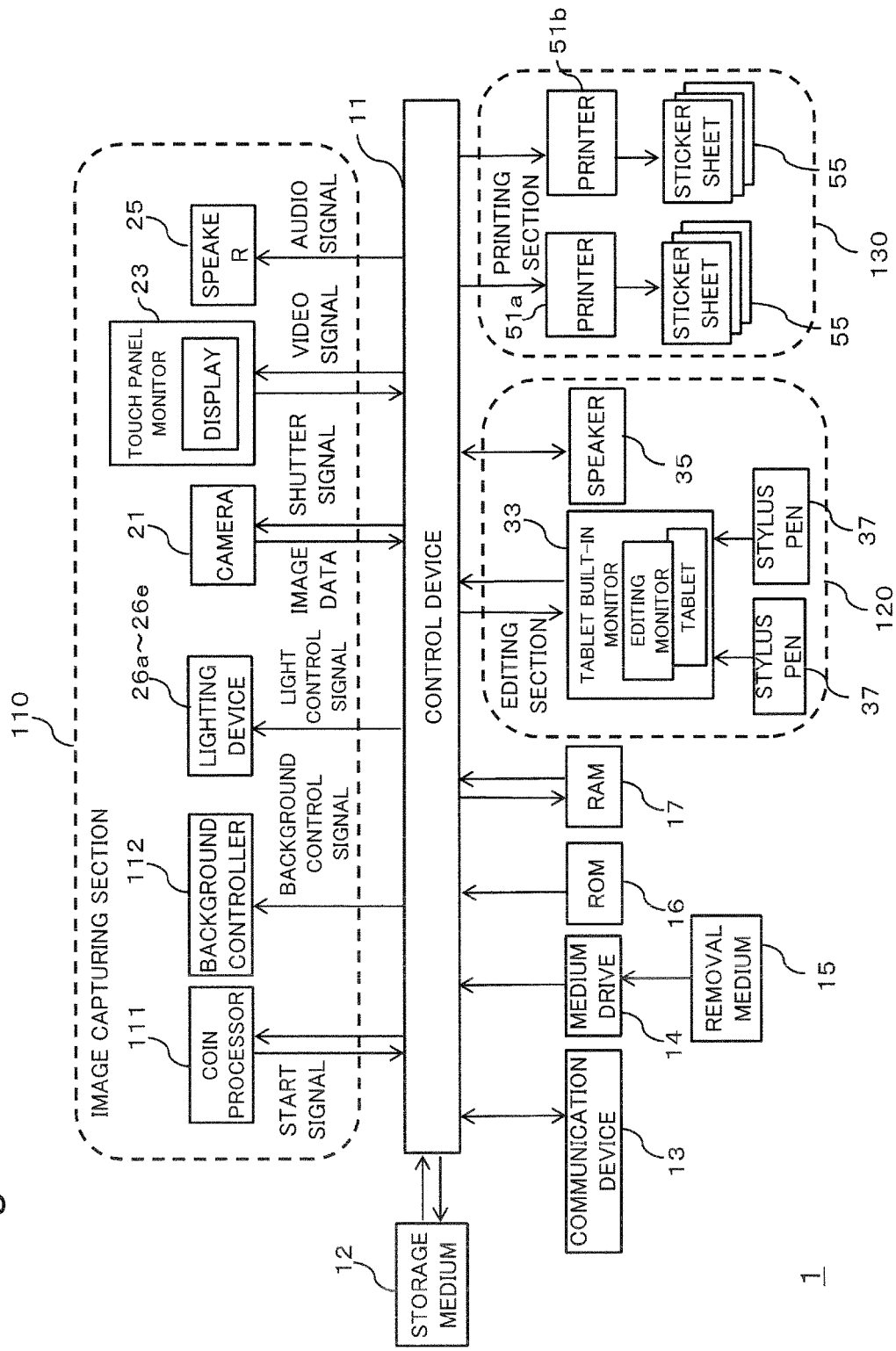
FIG. 3 is a diagram showing an internal configuration of the photograph sticker creating apparatus.

Hereinafter, an example of an internal configuration of the photograph sticker creating apparatus 1 is described. FIG. 3 is a block diagram showing one example of a functional configuration of the photograph sticker creating apparatus 1. The same constitutional elements as the constitutional elements described above are respectively provided with the same numerals, and descriptions thereof are omitted.

As shown in FIG. 3, the photograph sticker creating apparatus 1 has a control device 11 that controls the whole operation of the photograph sticker creating apparatus 1. The control device 11 is connected with a storage medium 12, a communication device 13, a medium drive 14, a ROM (Read Only Memory) 16, a RAM (Random Access Memory) 17, an image capturing section 110, an editing section 120 and a printing section 130, via respective predetermined buses. The control device 11 includes a CPU, an MPU or the like, and executes a predetermined program to achieve general functions of the photograph sticker creating apparatus 1 including predetermined functions as described below. The predetermined program may be installed from a predetermined recording medium into the photograph sticker creating apparatus directly or via a communication line. The predetermined recording medium includes, for example, an HDD (Hard Disk Drive), an SSD (Solid State Drive), a magnetic disk such as a floppy disk (registered trademark), optical disks such as a CD (Compact Disc), a DVD (Digital Versatile Disc) and a BD (Blu-ray Disc), a magneto-optic disk such as an MD (Mini Disc) (registered trademark), and a removable medium such as a memory card. It is to be noted that the control device 11 may be designed as a dedicated electronic circuit that achieves the predetermined functions.

The storage medium 12 includes a non-volatile recording medium such as a hard disk drive (HDD), a flash memory or a solid-state drive (SSD). The storage medium 12 stores a variety of setting information, and reads the stored setting information to supply it to the control device 11. The recording medium included in the storage medium 12 may be any type of recording medium so long as it is a non-volatile recording medium.

The communication device 13 communicates with other communication device (not shown) via an external network (not shown) such as the Internet or a public communication network, or simply via a communication cable (not shown). That is, the communication device 13 communicates, under control of the control device 11, with other communication device such as user's cellular phone, user's personal computer, or a central management server. For example, the communication device 13 sends information supplied from the control device 11 to the other communication device, and supplies the control device 11 with information received from the other communication device.

The medium drive 14 is to be mounted with a removable medium 15, such as a magnetic disk (including a flexible disk), an optical disk (CD, DVD, BD, etc.), a magneto-optic disk, or a semiconductor memory. A computer program or data is read from the removable medium 15, and is supplied to the control device 11 or is stored or installed into the storage medium 12 or the like.

The ROM 16 prestores programs, data and the like which are executed by the control device 11. The ROM 16 supplies the control device 11 with the programs or the data under the control of the control device 11. The RAM 17 temporarily stores the data, the programs and the like which are to be processed by the control device 11.

The image capturing section 110 is a block concerning a photographing process, and has a coin processor 111, a background controller 112, the lighting apparatuses 26a to 26e, the camera 21, the touch panel monitor 23, and a speaker 25.

The coin processor 111 counts coins inserted from the coin insert/return port 29 and sends a signal indicating the counted amount to the control device 11. Based on the signal from the coin processor 111, the control device 11 determines whether or not coins for a predetermined amount of money have been inserted. The background controller 112 controls a background curtain suspended as a background behind the subject (on the background unit side) in the photographing space R1. That is, the background controller 112 ejects or retracts the background curtain under control of the control device 11. The background unit 40 may have a structure including a sheet metal to which a curtain for chroma key process is attached. Alternatively, the background unit 40 may be composed of only a sheet metal painted a predetermined color (for example, green). The color of the sheet metal may be a color appropriately set depending on a background image, such as white. When the background unit 40 does not need to control the ejecting and retracting of the background curtain, the background controller 112 can be omitted.

The editing section 120 is a block regarding editing process, and includes the tablet built-in monitor 33, stylus pens 37 and the speaker 35.

The printing section 130 includes two printers 51a and 51b that print, on a sticker sheet 55, a result of an editing operation performed by the editing section 120. In the following description, the printer 51a disposed on left side seen from backside of the photograph sticker creating apparatus 1 is referred to a "first printer", and the printer 51b disposed on right side is referred to a "second printer". Either one of the first and second printer is operated. The other printer is to be secondarily used, instead the operating printer, when the sticker sheet 55 for the operating printer is run out or the operating printer breaks down. The first or second printer 51a or 51b acquires image information edited by the control device 11 and prints it on the sticker sheet 55. When the printing process is completed, the first or second printer 51a or 51b ejects the printed sticker sheet 55 from the sticker outlet 39. The printed sticker sheet 55 is provided to the user as a photograph sticker which is a product of the photograph sticker creating game.

2. Operation of Photograph Sticker Creating Apparatus

2.1 Flow of Photograph Sticker Creating Game

Figure 4:
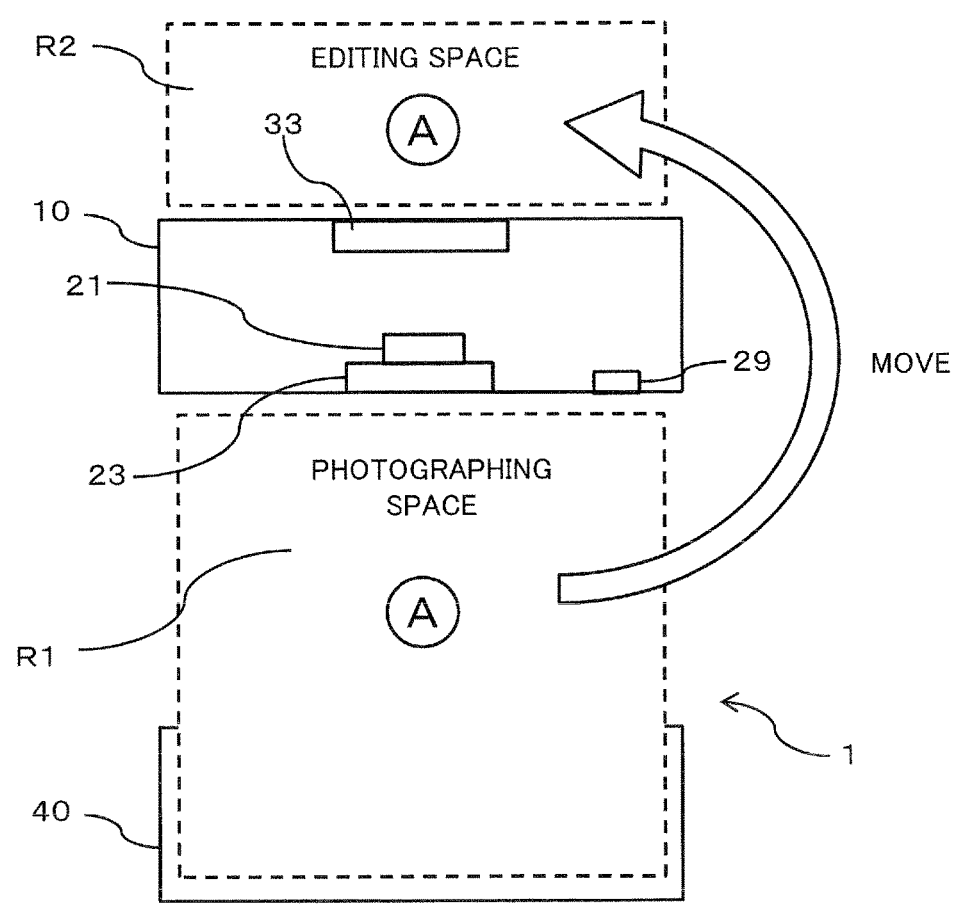
FIG. 4 is a diagram for explaining a spatial movement of a user playing a photograph sticker creating game.

With reference to FIG. 4, a flow of the photograph sticker creating game by means of the photograph sticker creating apparatus 1, and a movement of the user associated with the game are described below.

FIG. 4 is a diagram for explaining a spatial movement of the user during the game. FIG. 4 is an overhead view of the photograph sticker creating apparatus 1 seen from a observing point above the apparatus 1. As shown in FIG. 4, a user A enters the photographing space R1 from the side of the photograph sticker creating apparatus 1 and inserts the fee into the coin insert/return port 29 of the photographing unit 10, thereby to start the photograph sticker creating game. The user A then selects a background image and performs photographing by means of the camera 21 in the photographing space R1. That is, in the photographing space R1, the user A selects a background image to be combined with a shot image and photographs his or her own image or the like, using the camera 21 and the touch panel monitor 23 provided on the front surface of the photographing unit 10 (photographing operation).

Upon completion of the background-image selection and the photographing, the user A moves to the editing space R2 located behind the photographing unit 10 in accordance with guidance of the photograph sticker creating apparatus 1. In this editing space R2, the user A operates the tablet built-in monitor 33 to perform an editing operation such as graffiti-painting on the shot image. It is to be noted that, when the other user in a previous user pair is still using the editing space R2 (performing the editing operation) at the time of completion of the background-image selection and the photographing in the photographing space R1 by the user A, the photograph sticker creating apparatus 1 does not guide the user A to the editing space R2. At this time, the user A waits in the photographing space R1 until the editing space R2 becomes empty. Subsequently, upon completion of the editing operation by the previous user pair, the photograph sticker creating apparatus 1 guides the user A to the editing space R2, so that the user A moves to the editing space R2 in accordance with the guidance. When it is judged that user's operations are done in both the photographing space R1 and the editing space R2, the photograph sticker creating apparatus 1 may control the photographing process to elongate time for shooting the image in the photographing space R1 and/or the editing process to shorten time for editing the image in the editing space R2, so that waiting time for the user can be shortened.

As described above, since the photographing space R1 for performing the photographing and the editing space R2 for performing the image editing are separated from each other, different users can be guided to the respective spaces, so that two pairs of the users can simultaneously enjoy games in one photograph sticker creating apparatus 1. This can enhance an operation rate of the photograph sticker creating apparatus 1 as compared to the case of performing the photographing, the editing and the like in one space.

It is to be noted that in the foregoing example, the photographing process and the background-image selection process are performed in the photographing space R1, and the graffiti process and the printing process are performed in the editing space R2. However, the photograph sticker creating apparatus 1 may be configured to perform the photographing process, the background-image selection process, the graffiti editing process, and the printing process in different spaces, respectively. In the case of a plurality of processes being executed in one space as described above, there is an advantage of being able to reduce the photograph sticker creating apparatus 1 in size to make an installation area small. But even when different pairs of users simultaneously perform operations in the respective spaces, the maximum number of pairs of users who can simultaneously use the apparatus is two since there are only two spaces where the operations can be performed in the foregoing example. However, making the respective processes performed in different spaces allows the number of users who can simultaneously use the apparatus to be increased so that a turnover rate can be improved. It is to be noted that an installation area of the photograph sticker creating apparatus 1 becomes relatively large, and thus a relatively large area would be required for an installation place thereof.

Further, unit configuration of the photograph sticker creating apparatus 1 is not limited to the foregoing configuration, and a unit configuration other than the foregoing one may be employed. Moreover, the multiple-user servicing manner for providing multiple users (multiple pairs of users) with the respective games is not limited to the foregoing method. Specifically, two (or plural) photographing spaces and two (or plural) editing spaces may be provided, respectively. Providing two (or plural) photographing spaces and two (or plural) editing spaces allows turnover rate of the photograph sticker creating apparatus 1 to be improved.

2.2 Entire Operation

Figure 5:
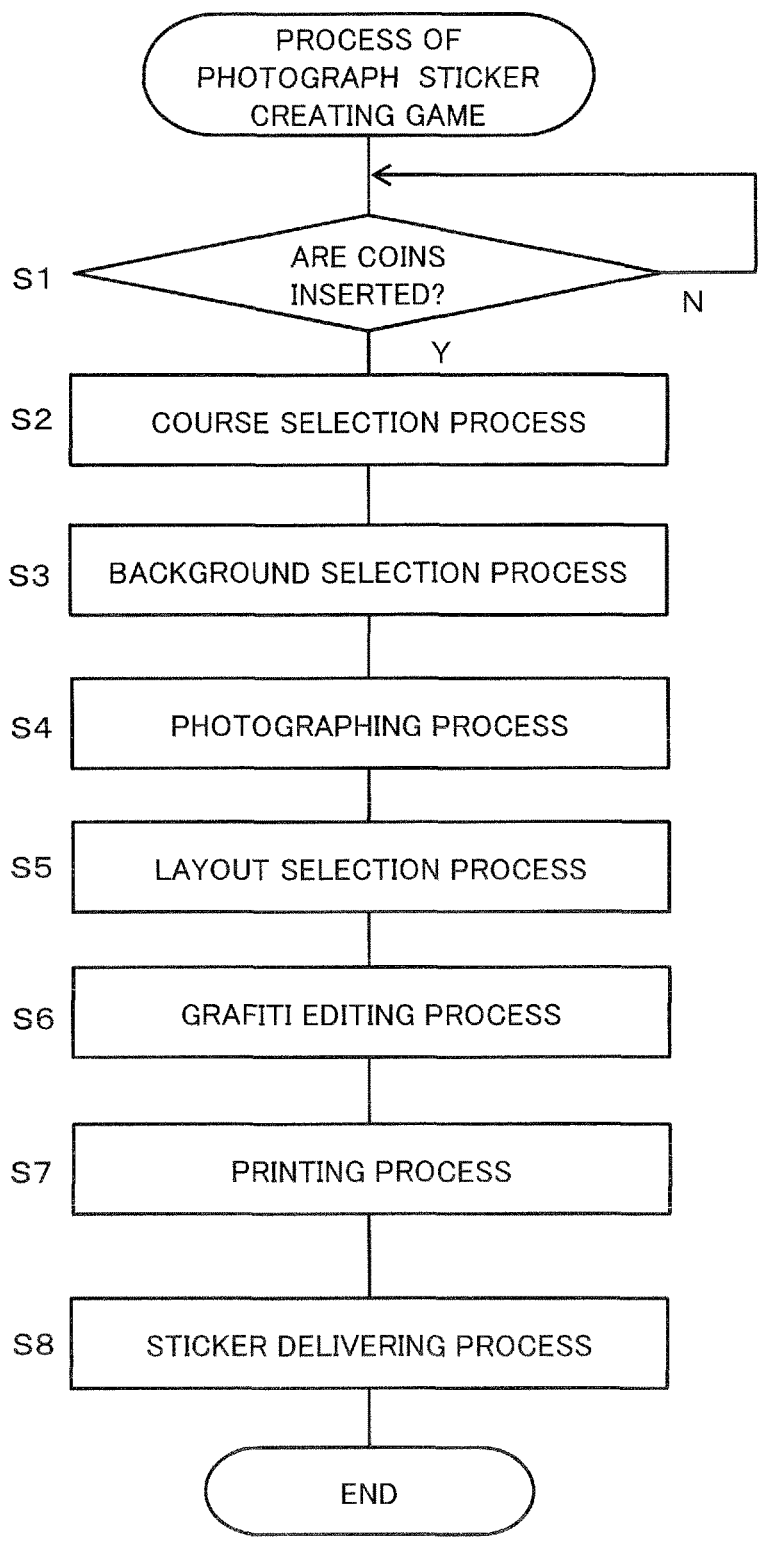
FIG. 5 is a flowchart showing a series of operations concerning a photograph sticker creating game by means of a photograph sticker creating apparatus 1.

An operation concerning the photograph sticker creating game of the photograph sticker creating apparatus 1 is described. As described above, the photograph sticker creating apparatus 1 prints and outputs on a sticker sheet an image obtained by combining a foreground or background image with a shot image of the user and performing the editing process such as graffiti-painting thereon. FIG. 5 is a flowchart showing a series of operations concerning the photograph sticker creating game in the photograph sticker creating apparatus 1. Hereinafter, the whole operation of the photograph sticker creating apparatus 1 is described with reference to the flowchart of FIG. 5.

In the photograph sticker creating apparatus 1, when coins corresponding to a predetermined amount of money required for playing the game are inserted into the coin insert/return port 29 by the user (S1), the control device 11 starts the photograph sticker creating game. It is to be noted that in the below-mentioned processes, a course selection process (S2), a background selection process (S3), a photographing process (S4), and a layout selection process (S5) are executed on the user existing in the photographing space R1. Further, a graffiti editing process (S6), a printing process (S7) and a sticker delivering process (S8) are executed on the user existing in the editing space R2.

First, the control device 11 performs the course selection process (S2). In the present embodiment, one course can be selected out of a plurality of courses. In the present embodiment, for example, a "normal course" and a "simple course" are prepared. The simple course is a course intended for a user unfamiliar with the operation of the photograph sticker creating apparatus 1. In the simple course, use can proceeds with the game by a simpler operation than in the normal course. The control device 11 displays a course selection screen for allowing the user to select a game course on the touch panel monitor 23 of the image capturing section 110. The user selects a desired course by operating the touch panel monitor 23 on the course selection screen. The control device 11 stores information of the course selected by the user into the RAM 17.

After completion of the course selection process (S2), the control device 11 performs the background selection process (S3). In the background selection process, a background or foreground image to be combined with a shot image is selected based on a direction of the user. It is to be noted that in the following description, a background image and a foreground image are collectively referred to as a "background image" for convenience of description. A detail of the background selection process (S3) is described later.

After completion of the background selection process (S3), the control device 11 performs the photographing process (S4). In the photographing process, the control device 11 controls each unit of the image capturing section 110 to shoot (pick up or capture) an image (photo) of the user (subject). Here, in the photographing process, a plurality of images (photos) of the user (subject) are successively shot. This allows the user to shoot images with a variety of desired poses. The number of images to be shot may be the same as the number of areas in the photograph sticker in which images to be printed are disposed. Further, the number of images to be photographed may be made larger than the number of the areas in which images to be printed are disposed. In this case, images to be printed on the photograph sticker may be selected by the user from the shot images.

After completion of the photographing process (S4), the control device 11 displays on the touch panel monitor 23 a guidance screen for guiding the user to the editing space R2. The user moves to the editing space R2 in accordance with the display of the guidance screen displayed on the touch panel monitor 23, and thereafter performs an operation in the editing space R2. After completion of the photographing process (S4), the control device 11 performs the layout selection process (S5).

The layout selection process is a process of deciding a layout of the photograph sticker. The photograph sticker creating apparatus 1 prepares a plurality of layouts of the photograph sticker, so that a desired layout is selected by the user out of the plurality of layouts. A detail of the layout selection process is described later.

After completion of shooting images of the user, the control device 11 displays the shot images (photos) on the touch panel monitor 23 for a predetermined time (this function is referred to as "all preview display", hereinafter). FIG. 5A shows an example of all preview display. In this example, four shot images (photos) 67a to 67d are displayed. The image 67a, image 67b, image 67c, and image 67d have been sequentially shot in this order. In the all preview display, the images 67a to 67d are overlapped and displayed so that one image displayed at the front end is entirely displayed. The image displayed at the front end is sequentially changed over according to the order of shooting the image at a predetermined interval. Hence the user can recognize all of shot images. The displaying method of the preview screen is not limited to this. Any displaying method can be adopted as far as the user can recognize contents of all of shot images. For example, all of shot images are displayed entirely and simultaneously for a predetermined time. Such all preview display can enable the user to grasp content of each shot image.

After completion of the layout selection process (S5), the control device 11 performs the graffiti editing process (S6). The graffiti editing process is a process of receiving decoration of the shot image by the user. Specifically, in the editing space R2, the user can paint graffiti (draw desired letters or picture) on the shot image by operating the stylus pen 37 on the tablet built-in monitor 33 provided on the rear surface of the photographing unit 10. Further, by operation of the stylus pen 37 on the tablet built-in monitor 33, the user can direct to paste a previously prepared decorating image (a predetermined pattern, a predetermined text, and combination of those) on a shot image to a desired region of the shot image. In the graffiti editing process, the control device 11 receives a graffiti-painting operation and a direction concerning a decorating image by the user, and combines a linear image generated by the graffiti-painting or the directed decorating image with the shot image. By this graffiti process, the user can prepare a favorably designed photograph sticker.

It is to be noted that in the graffiti editing process, the content of the graffiti editing operation presented to the user varies depending on the course selected by the user at the start of the game. For example, in the case of the simple course, since it is intended for the user unfamiliar with a photograph sticker creating game, an operating procedure in painting graffiti is made simpler or the number of kinds of selectable operations is made smaller than in the normal course. On the other hand, in the case of the normal course, compared to the simple course, more various and complex functions are presented to the user so that the user can more finely paint desired graffiti.

After completion of the graffiti editing process (S6), the control device 11 performs the printing process (S7) and the sticker delivering process (S8). In the printing process, the control device 11 edits an image for printing based on the background images selected by the background selection process (S3), the layout selected by the layout selection process (S5), and the contents of the graffiti and the decorating image directed by the graffiti editing process (S6). The control device 11 then controls the printer 51a or 51b in the printing section 130 to print the edited image on the sticker sheet 55. When the printing is completed, the sticker sheet 55 printed with the edited image is ejected from any one of the sticker outlets 39a and 39b. In the printing process, the control device 11 may transmit the image data which is edited for printing to an external server through the communication device 13. The user can download the image data from the external server to user's smartphone etc. to enjoy the image data.

In such a procedure as above, there is generated a photograph sticker that includes an image obtained by applying desired decoration to the image of the user.

2.3 Background Selection Process

A detailed operation of the background selection process (Step S3 in the flowchart of FIG. 5) is described below. In the background selection process, a background image (background or foreground image) to be combined with the shot image is selected based on a direction of the user.

Figure 6:
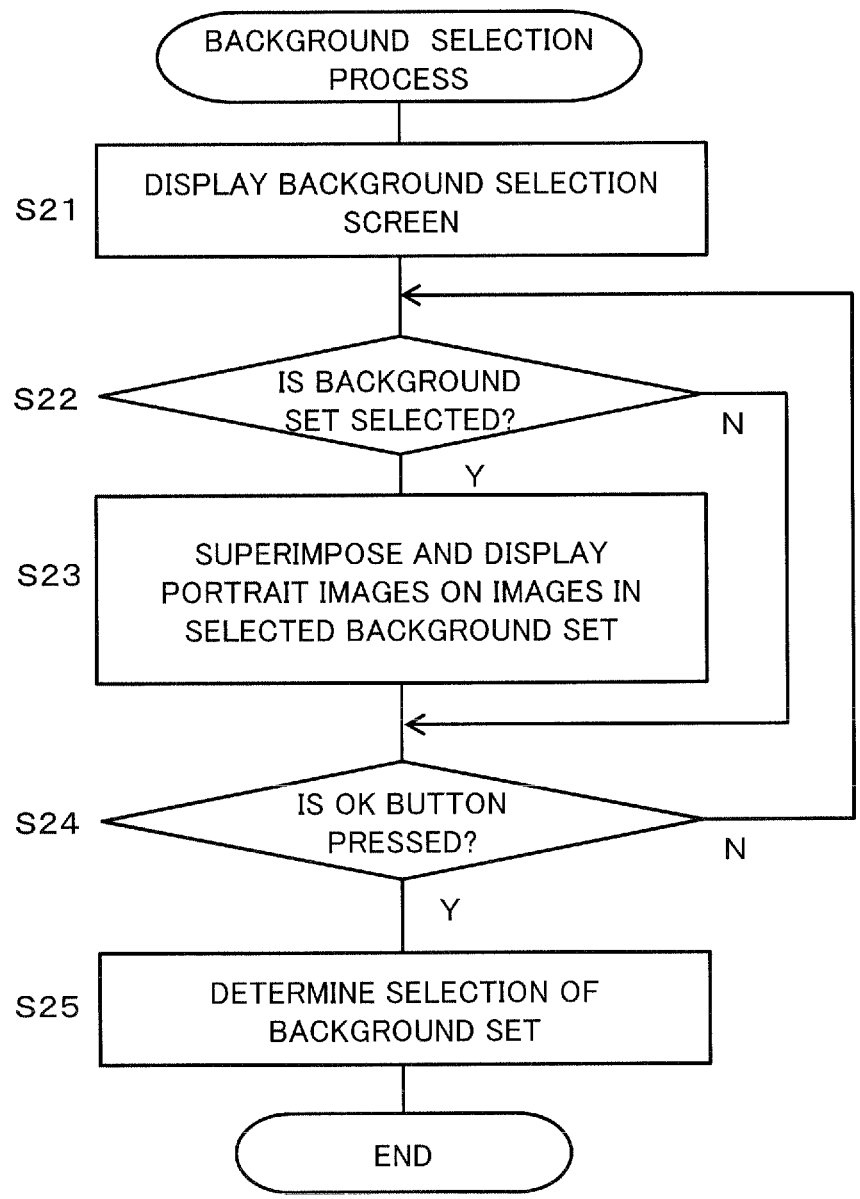
FIG. 6 is a flowchart showing a background selection process.

FIG. 6 is a flowchart showing a process of the control device 11 in the background selection process. In the background selection process, the control device 11 initially displays on the touch panel monitor 23 a background selection screen on which the user selects a background image (S21).

Figure 7:
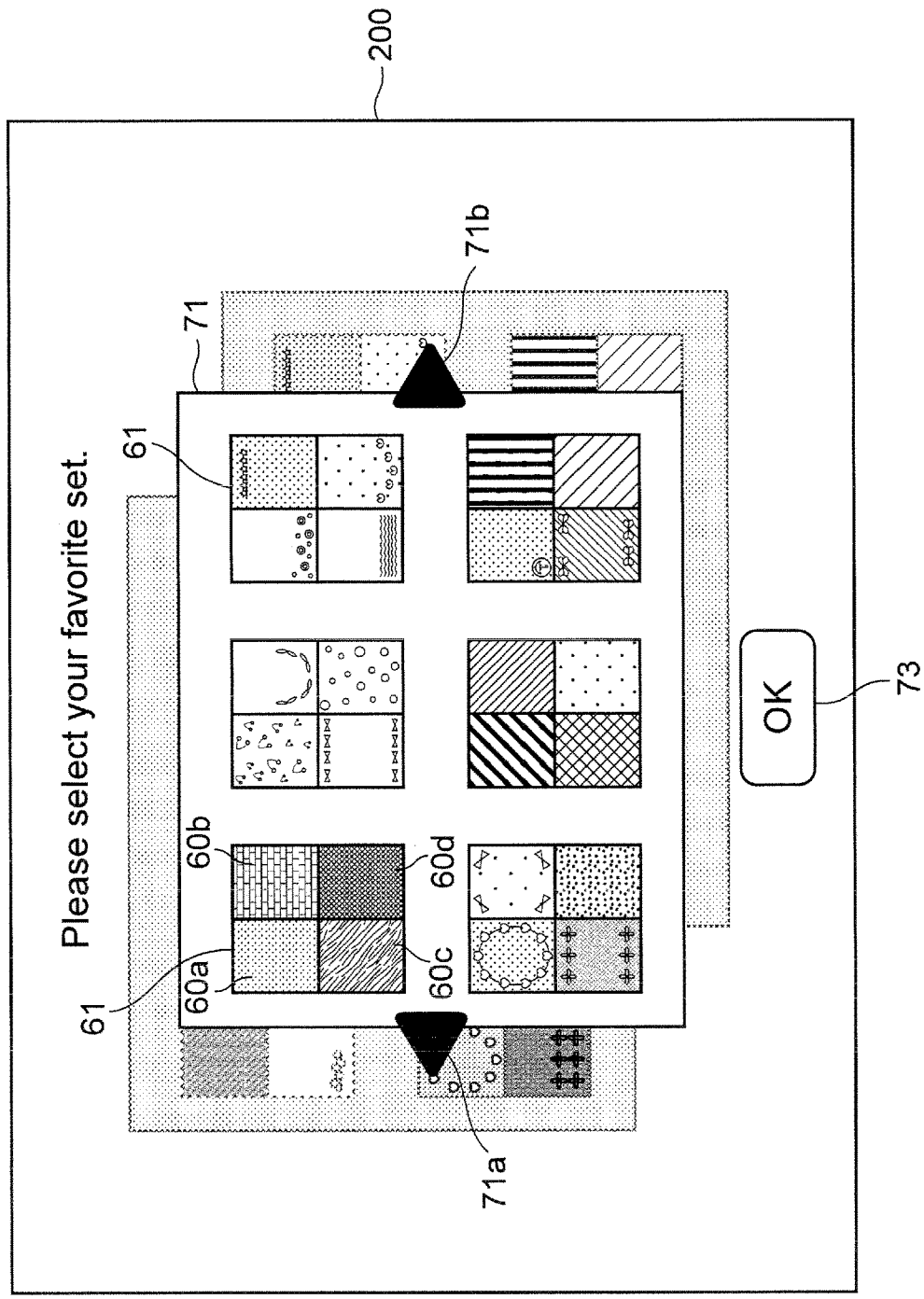
FIG. 7 is a view showing one example of a background selection screen initially displayed in the background selection process.

FIG. 7 is a view showing one example of the background selection screen initially displayed in the background selection process. On a background selection screen 200, four background images 60a to 60d are taken as one background set 61, and six selectable background sets are arranged on a base image 71. The base image 71 is a region (image selection region) on which plural selectable background sets (that is, background images) can be disposed. The background selection screen receives a selection of one background set out of the six background sets. The user can select (specify) a background set by, for example, touching a desired background set with his or her finger on the background selection screen 200.

Each background set includes four background images having the same theme ("season", "America", "space", "sweets", etc.). Data of the background images are stored in the removable medium 15 for each background set. In the background selection process, the control device 11 reads the data of the background images from the removable medium 15 via the medium drive 14, and displays the data on the background selection screen 200. The background selection screen 200 displays six background sets, as selectable background sets, per one page.

When there are seven or more background sets, the background selection screen 200 displays the background sets separately on a plurality of pages. In the case of displaying the background sets separately on a plurality of pages, the background selection screen 200 displays scroll buttons 71a and 71b, so that the display is switched to a previous page or a following page with the scroll buttons 71a and 71b, respectively. It is to be noted that the scroll buttons 71a and 71b as shown in FIG. 7 be one example, and arbitrary means can be used so long as being a means that can direct switching of the page.

Images (background images, composite images and/or the base image 71) related to a currently selected page (valid page) are displayed in a displaying method different from that for a currently non-selected page. For example, as shown in FIG. 7, the base image 71 as the currently selected page is displayed in front of that of the currently non-selected pages. Further, the currently non-selected page is grayed out. Moreover, the base image 71 (and/or background images, composite images) on the currently selected page may be displayed in a larger size than the base image (and/or background images, composite images) on the currently non-selected page. Displaying in such a manner facilitates the user's discriminating and recognizing of the currently selected page and the currently non-selected page.

Next, the control device 11 determines whether or not one background set has been selected from plural background sets disposed in the base image (image selection region) 71 by the user on the background selection screen 200 (S22). When one background set has not been selected by the user (NO in S22), the process goes to Step S24. When one background set has been selected by the user (YES in S22), the control device 11 superimposes (combines) predetermined portrait images on the selected background set in the base image 71 (image selection region) and displays the images (S23), and thereafter the process goes to Step S24. Here, predetermined portrait images are images of models taken in advance. Data of the predetermined portrait images is prestored in the storage medium 12, and the control device 11 reads the data of the predetermined portrait images from the storage medium 12 and uses them for combining with the background images.

Figure 8:
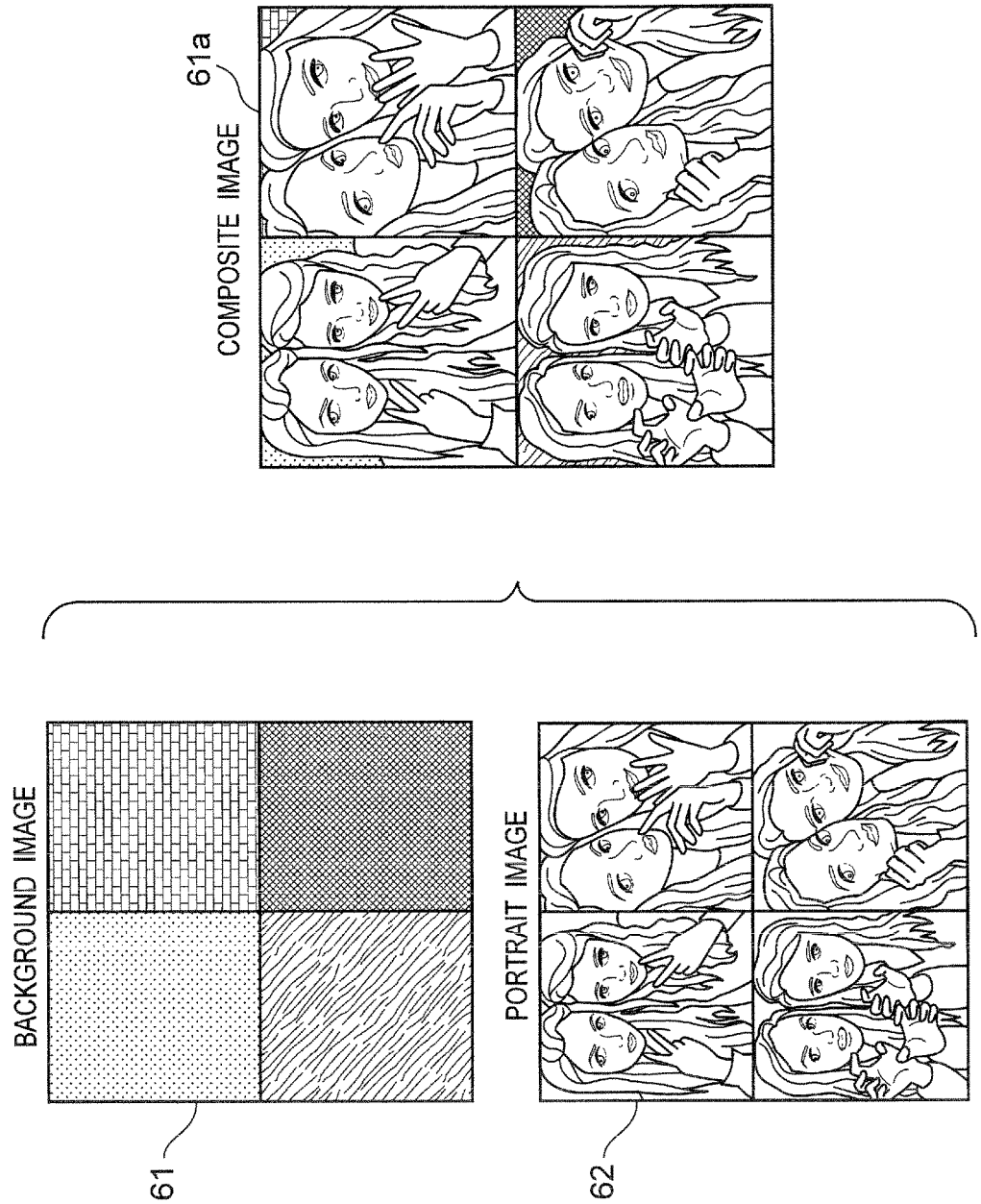
FIG. 8 is a view explaining a superimposition process for superimposing predetermined portrait images on images of a selected background set.
Figure 9:
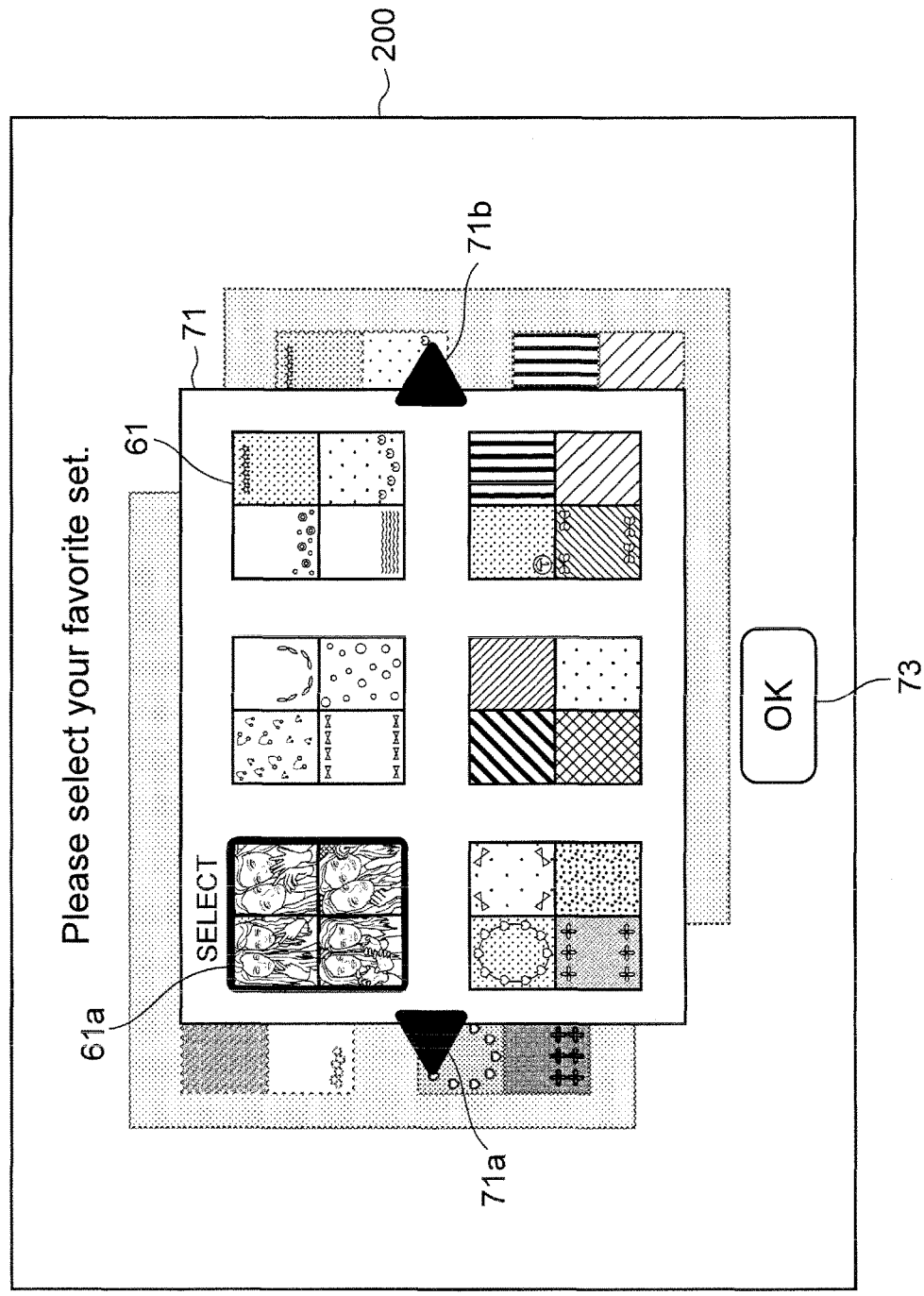
FIG. 9 is a view showing an example of a background selection screen where the portrait image is superimposed on the images in the selected background set.

FIG. 8 is a view explaining a process of superimposing (combining) the predetermined portrait images on the selected background set. As shown in the drawing, the control device 11 superimposes predetermined portrait images 62 to respective background images included in the selected background set 61 to generate composite images 61a, and displays the composite images 61a on the background selection screen 200. As a result, the composite images 61a obtained by combining the background images and the portrait images are displayed on the base image 71 (image selection region) of the background selection screen 200, as shown in FIG. 9.

It is to be noted that each of the background images 60a to 60d in the background set 61 has its order in the order of the background images 60a, 60b, 60c, and 60d. In finally combining the shot image and the background image, they are combined with the background images in sequence such that the order of shooting the image agrees with the order of the backgrounds. For example, the shot image firstly shot is combined with the background image 60a, the shot image secondly shot is combined with the background image 60b, the shot image thirdly shot is combined with the background image 60c, and the shot image fourthly shot is combined with the background image 60d.

Returning to the flowchart of FIG. 5, in Step S24, it is determined whether or not an OK button 73 is pressed (touched). When the OK button 73 is pressed (YES in S24), the control device 11 determines the selection of the background set (S25). The control device 11 then stores information indicating the selected background set into the RAM 17, to complete the present selection process. On the other hand, when the OK button 73 is not pressed (NO in S24), the control device 11 returns to the process in Step S22 and repeats the processes in Steps S22 to S24.

By the above processes, when a desired background set is selected by the user, desired portrait images are superimposed and displayed on the selected background set on the background selection screen 200. This enables the user to easily recognize which background set (background images) is being selected out of the plurality of displayed background sets (background images), and also easily imagine images obtained by combining the background images with the shot images.

2.3.1 Modified Examples of Background Selection Process

The background selection process in the photograph sticker creating apparatus 1 of the present embodiment is not restricted to the above example. Hereinafter, some of other examples of the background selection process are illustrated.

(a) First Modified Example

Figure 10B:
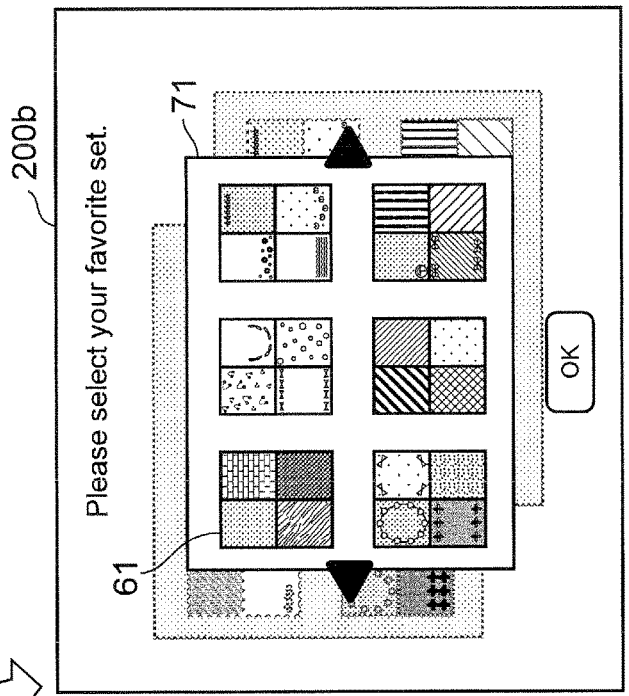
FIGS. 10A and 10B are views explaining a background selection process of a first modified example (alternately displaying, every predetermined period of time, a background selection screen with the portrait images superimposed on the images in the background set and a background selection screen with no portrait images superimposed on the background set)
Figure 10A:
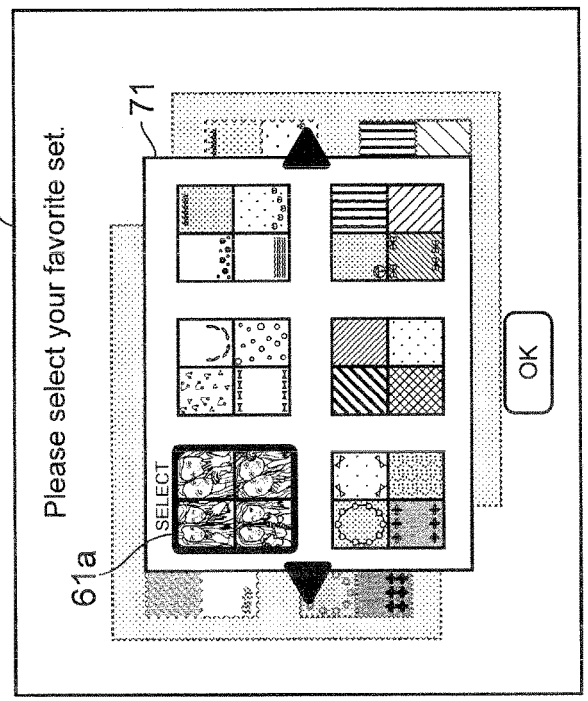

In the above example, when one background set is selected on the background selection screen 200 shown in FIG. 7, the background selection screen 200 where the portrait images are superimposed only on the selected background set is displayed (see FIG. 9). That is, the background images 61a superimposed with the portrait images and the background images 61 not superimposed with the portrait images are simultaneously displayed, but the way to display the background images superimposed with the portrait images is not restricted to this. For example, as shown in FIG. 10, when a background set is selected by the user, a background selection screen 200a where the portrait images are superimposed on the selected background set on the base image 71 and a background selection screen 200b where the portrait images are not superimposed on the selected background set on the base image 71 may be alternately switched and displayed every predetermined period of time.

Figure 11:
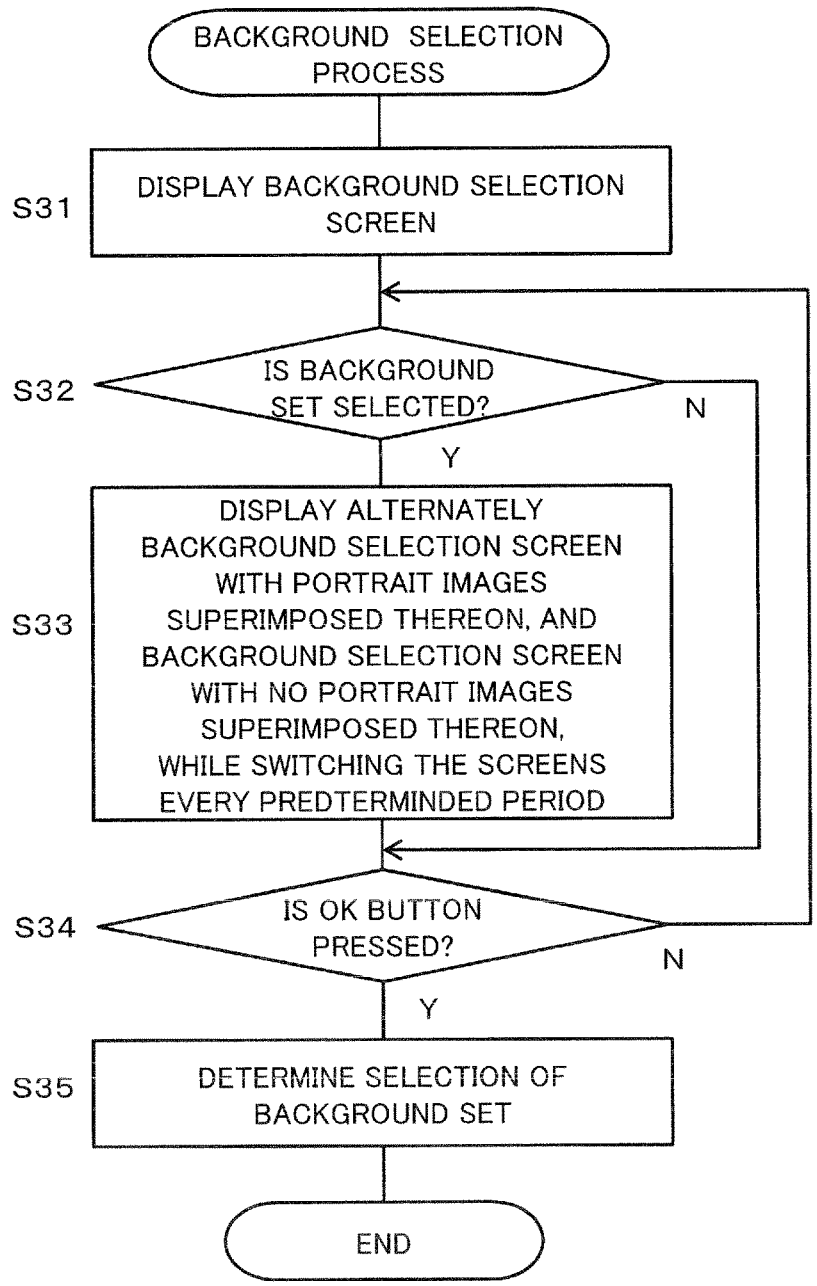
FIG. 11 is a flowchart showing the background selection process of the first modified example.

FIG. 11 shows a flowchart of such a background selection process. The control device 11 displays on the touch panel monitor 23 the background selection screen 200 for allowing the user to select a background image (S31). When a background set is then selected by the user (YES in S32), the control device 11 alternately displays, on the touch panel monitor 23, the background selection screen 200a in which the portrait images are superimposed on the selected background set and the background selection screen 200b in which the portrait images are not superimposed on the selected background set, while switching the background selection screens every predetermined period (for example, two seconds) (S33).

As described above, also by temporarily alternately displaying the background selection screen 200a with the portrait images superimposed on the selected background set and the background selection screen 200b with the portrait images not superimposed on the selected background, the user can easily recognize which background set (background images) is being selected out of the plurality of displayed background sets (background images). Further, the user can easily imagine an image to be obtained by combining the background image with the shot image.

(b) Second Modified Example

Figure 12:
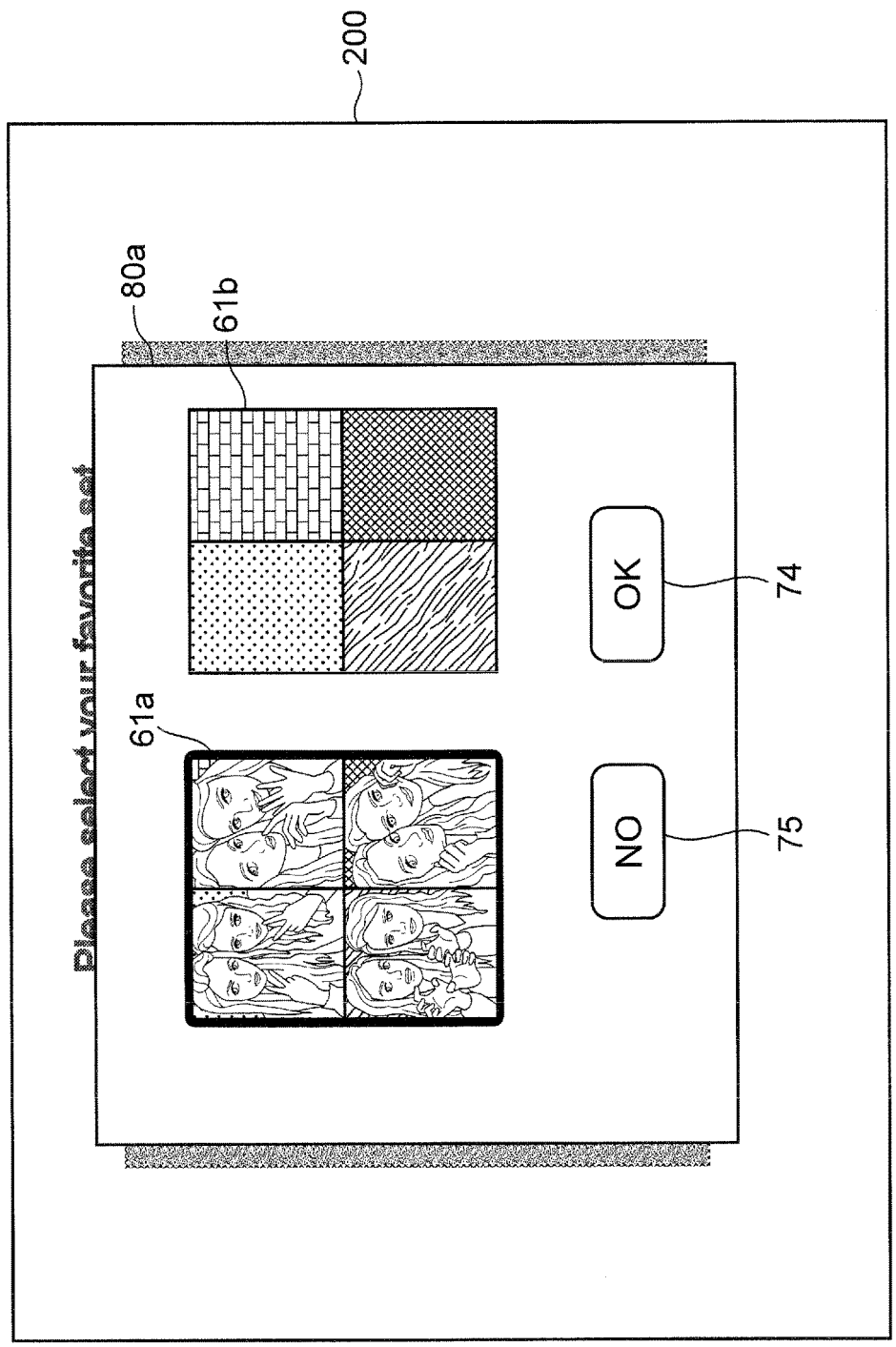
FIG. 12 is a view explaining a background selection process of a second modified example (displaying a pop-up screen of an image with the portrait images superimposed on the images in the selected background set)

When a desired background set is selected by the user on the background selection screen 200 (FIG. 7), a pop-up screen 80a may be displayed for the selected background set, as shown in FIG. 12. The pop-up screen 80a includes the composite images 61a where the predetermined portrait images are superimposed on the selected background set and images 61b of the selected background set not superimposed with the predetermined portrait images.

Figure 13:
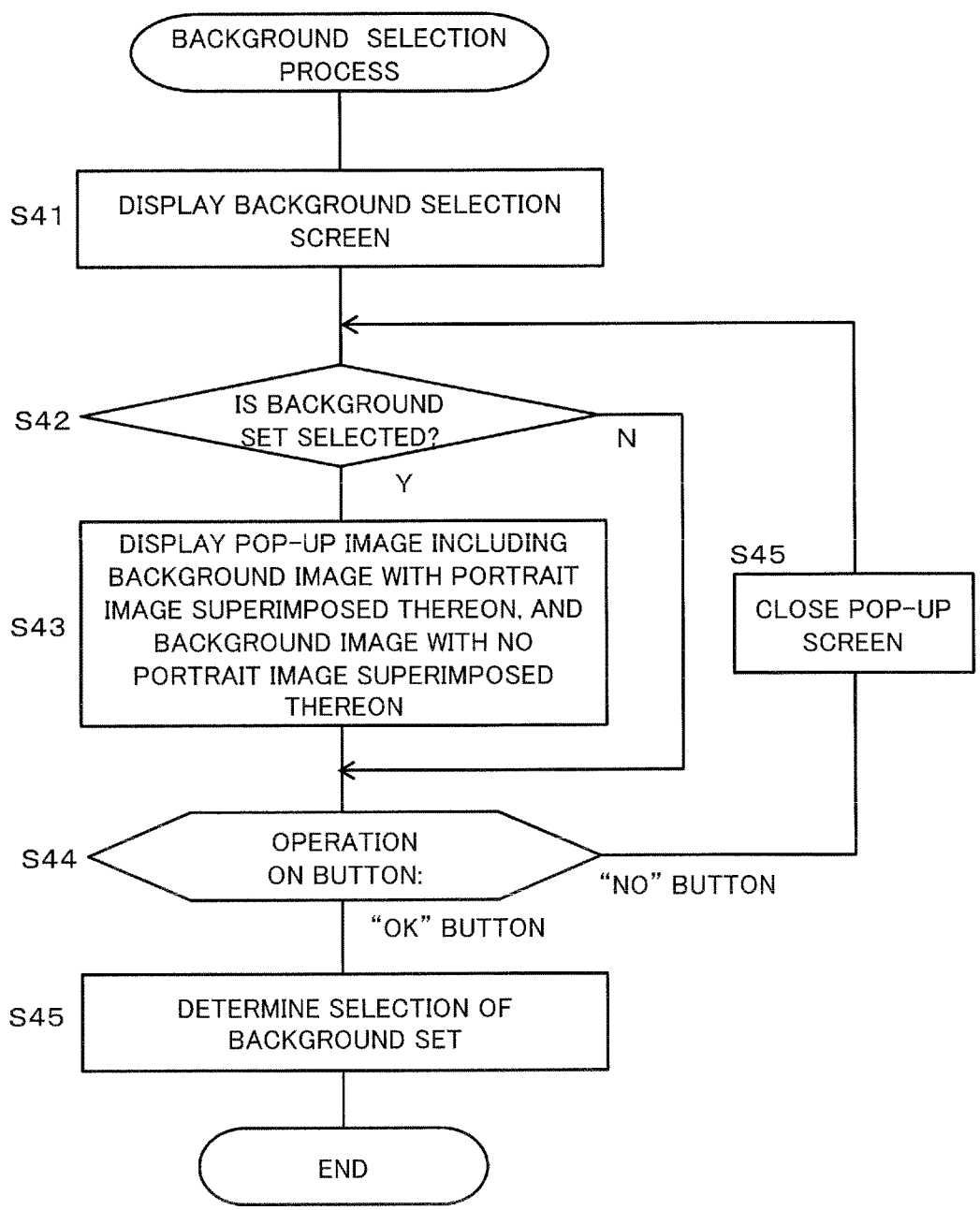
FIG. 13 is a flowchart showing the background selection process of the second modified example.

FIG. 13 is a flowchart showing such a background selection process. The control device 11 displays on the touch panel monitor 23 the background selection screen 200 for allowing the user to select a background image (S41). When a background set is then selected by the user (YES in S42), the control device 11 displays on the touch panel monitor 23 the pop-up screen 80a including the composite images 61a where the predetermined portrait images are superimposed on the selected background set and the images 61b of the selected background set not superimposed with the predetermined portrait images (S43).

Subsequently, when a NO button 75 is pressed (touched) (S44), the control device 11 closes the pop-up screen 90a (S45) and returns to the control in Step S42. Thereafter, the processes in Steps S42 to S45 are repeated until an OK button 74 is pressed (touched) (S44). On the other hand, when the OK button 74 is pressed (touched) (S44), the control device 11 determines the selection of the background set (S45) and stores information indicating the determined background set into the RAM 17, to complete the present process.

By such display of the pop-up screen 80a as described above, the user can compare and view the composite images with the portrait images superimposed on the background images and the background images alone, thereby to easily imagine both an image to be obtained by combining the background images with the shot images and an image including only the background images without the shot images.

(c) Third Modified Example

When the desired background set is selected by the user on the background selection screen 200 (FIG. 7), a method for displaying the selected background set may be made different from a method for displaying the non-selected background set.

Figure 14:
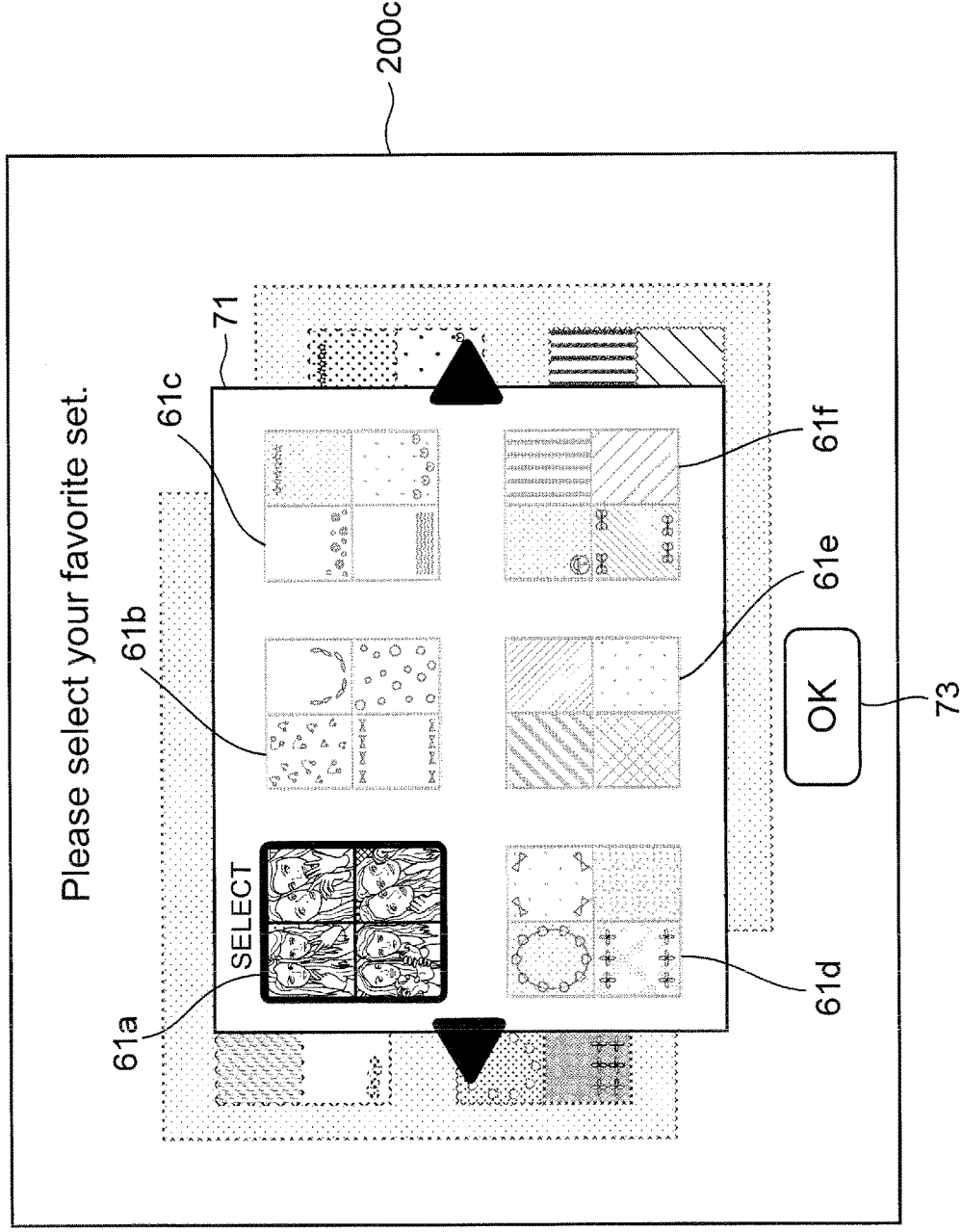
FIG. 14 is a view explaining a background selection process of a third modified example (images in the background sets which are not selected are grayed out)

For example, for the display of the non-selected background set, a saturation, a brightness and a tone of the image of the non-selected background set may be changed from original values, and then the non-selected background set including the images with the changed color may be displayed. Further, colors of the image (background image) may be inverted in the non-selected background set. FIG. 14 shows an example of superimposing and displaying the predetermined portrait images on the selected background set, and also graying out the non-selected background set 61b to 61f on the background selection screen.

Figure 15:
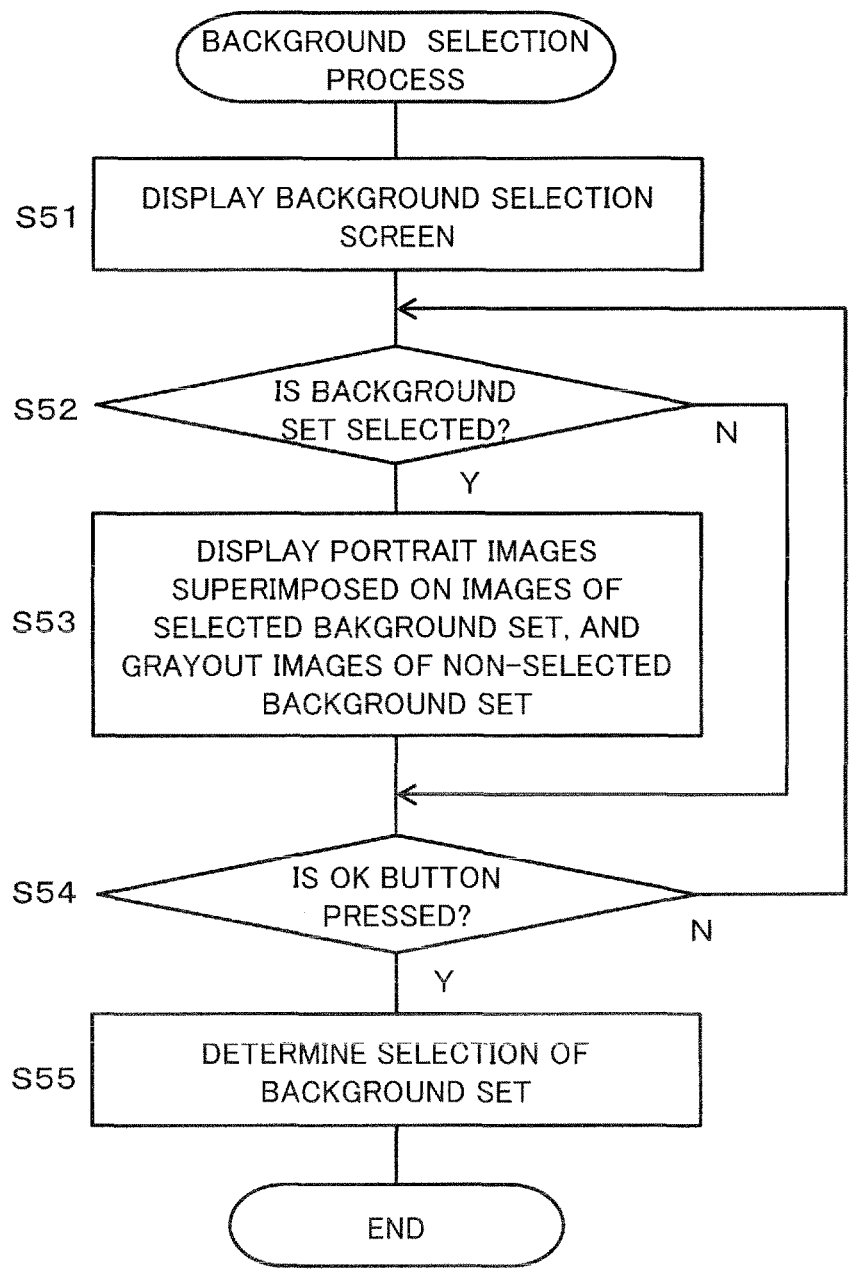
FIG. 15 is a flowchart showing the background selection process of the third modified example.

FIG. 15 is a flowchart showing the background selection process as shown in FIG. 14. The control device 11 displays the background selection screen 200 on the touch panel monitor 23 (S51). When a background set is then selected by the user (YES in S52), the control device 11 superimposes the predetermined portrait images on the selected background set, and displays a background selection screen 200c where images of background sets other than the selected background set are grayed out as shown in FIG. 14 (S53).

As described above, by graying out the images of the background sets other than the selected background set, the user can easily recognize which background set (background images) is being selected.

(d) Fourth Modified Example

As another method for making the method for displaying the selected background set different from the method for displaying the non-selected background set, an image size of the selected background set may be made different from an image size of the non-selected background set.

Figure 16:
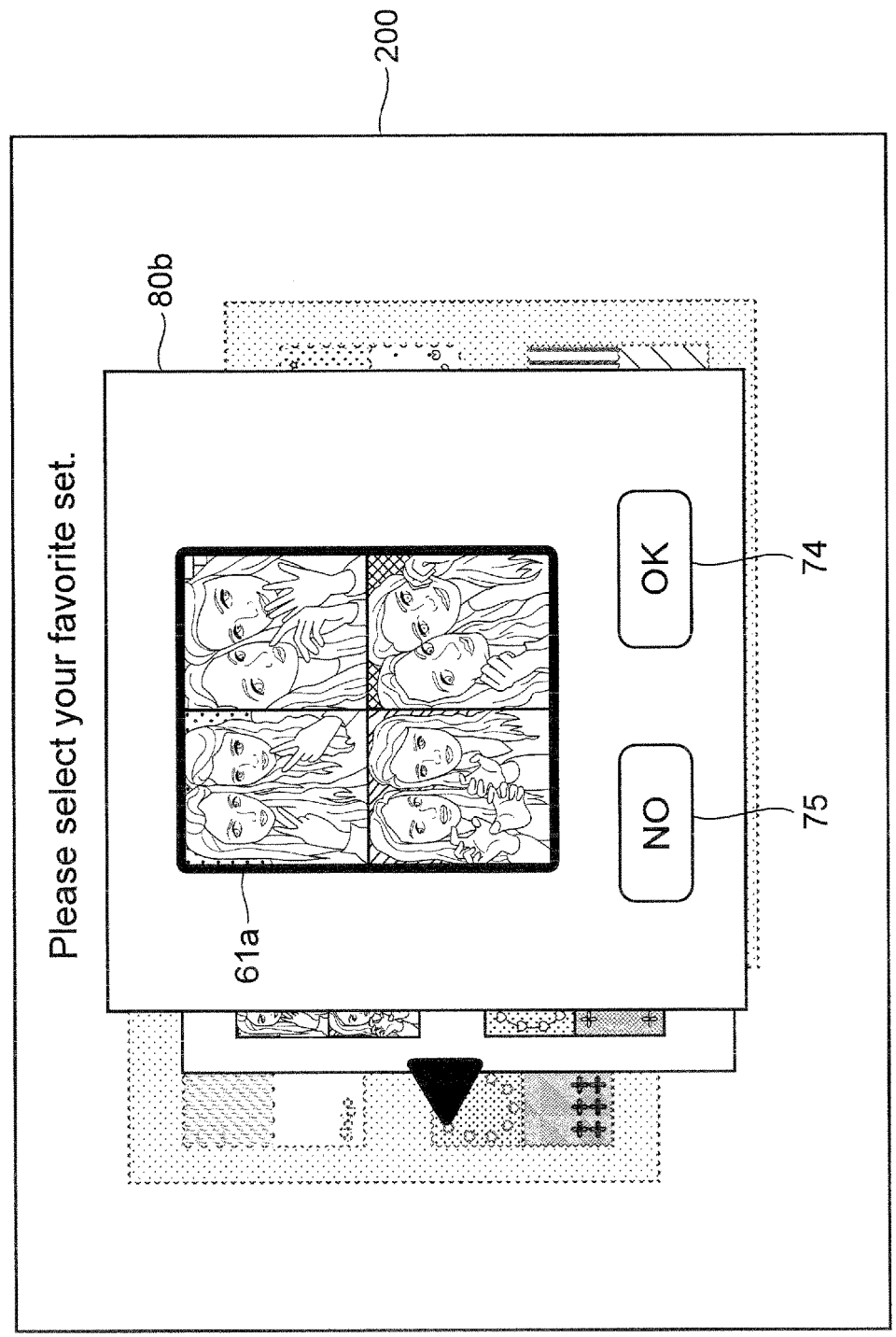
FIG. 16 is a view explaining a background selection process of a fourth modified example (enlarging and displaying composite images)

For example, when a desired background set is selected by the user on the background selection screen 200 (FIG. 7), as shown in FIG. 16, an image 80b, including enlarged composite images 61a where the predetermined portrait images are superimposed on the selected background set, may be displayed.

Figure 17:
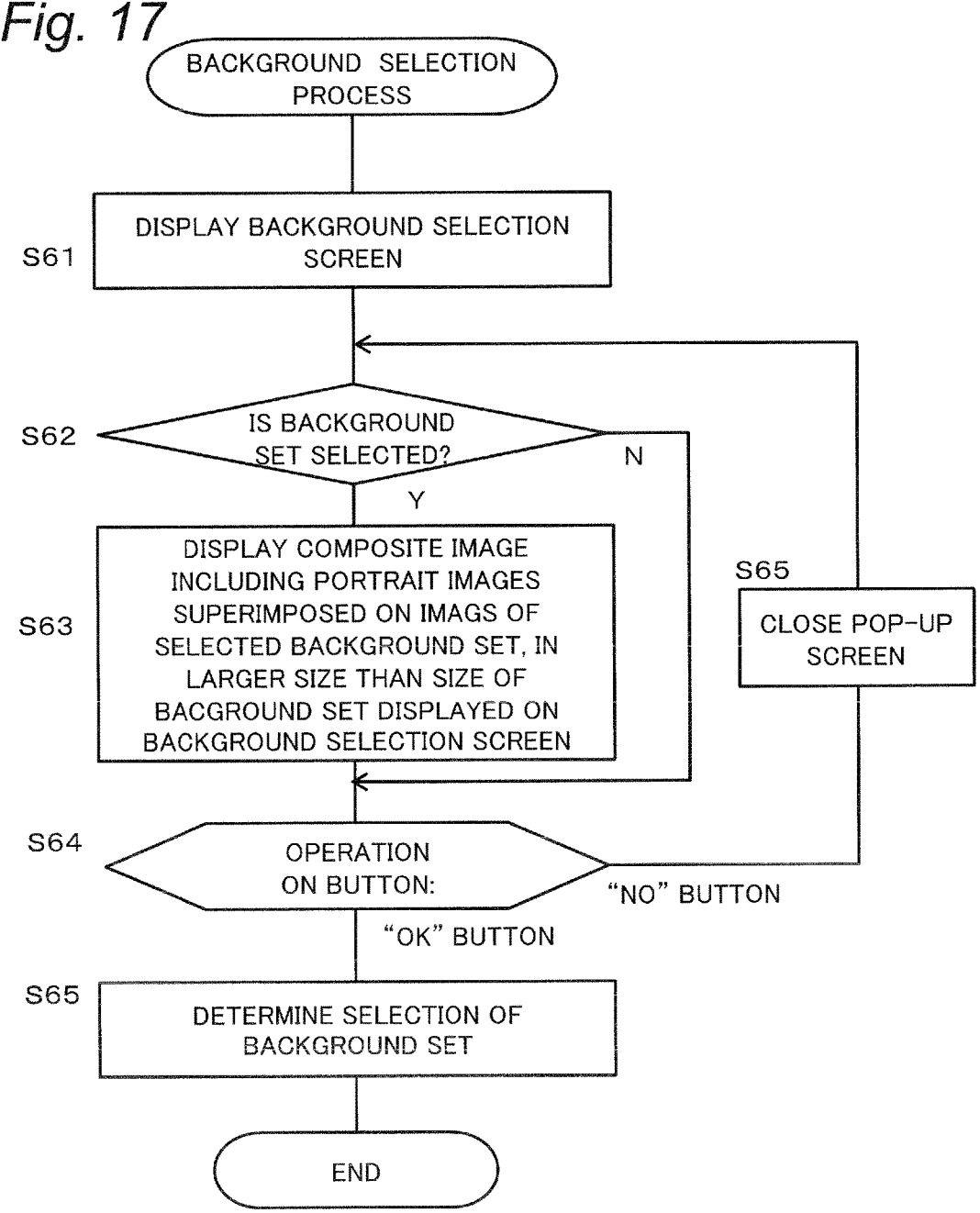
FIG. 17 is a flowchart showing the background selection process of the fourth modified example.

FIG. 17 is a flowchart showing such a background selection process. The control device 11 displays the background selection screen 200 on the touch panel monitor 23 (S61). When a background set is then selected by the user (YES in S62), the control device 11 generates composite images where the predetermined portrait images are superimposed on the selected background set, and displays the composite images in a larger size than a display size of the background set on the background selection screen 200 (S63).

Thereafter, when the OK button 74 is pressed (touched) (S64), the control device 11 stores information indicating the selected background set into the RAM 17, to complete the present process. On the other hand, when the NO button 75 is pressed (touched) (S64), the control device 11 closes the enlarged-displayed composite image 80b (S65), and returns to the control in Step S62. Thereafter, the processes in Steps S62 to S65 are repeated until the OK button 74 is pressed (touched) (S64). When the OK button 74 is pressed (touched), the control device 11 determines the selection of the background set (S65) and stores information indicating the determined background set into the RAM 17, to complete the present process.

As described above, by enlarging and displaying the selected background set, the user can easily recognize which background set (background images) is being selected.

(e) Fifth Modified Example

Figure 18:
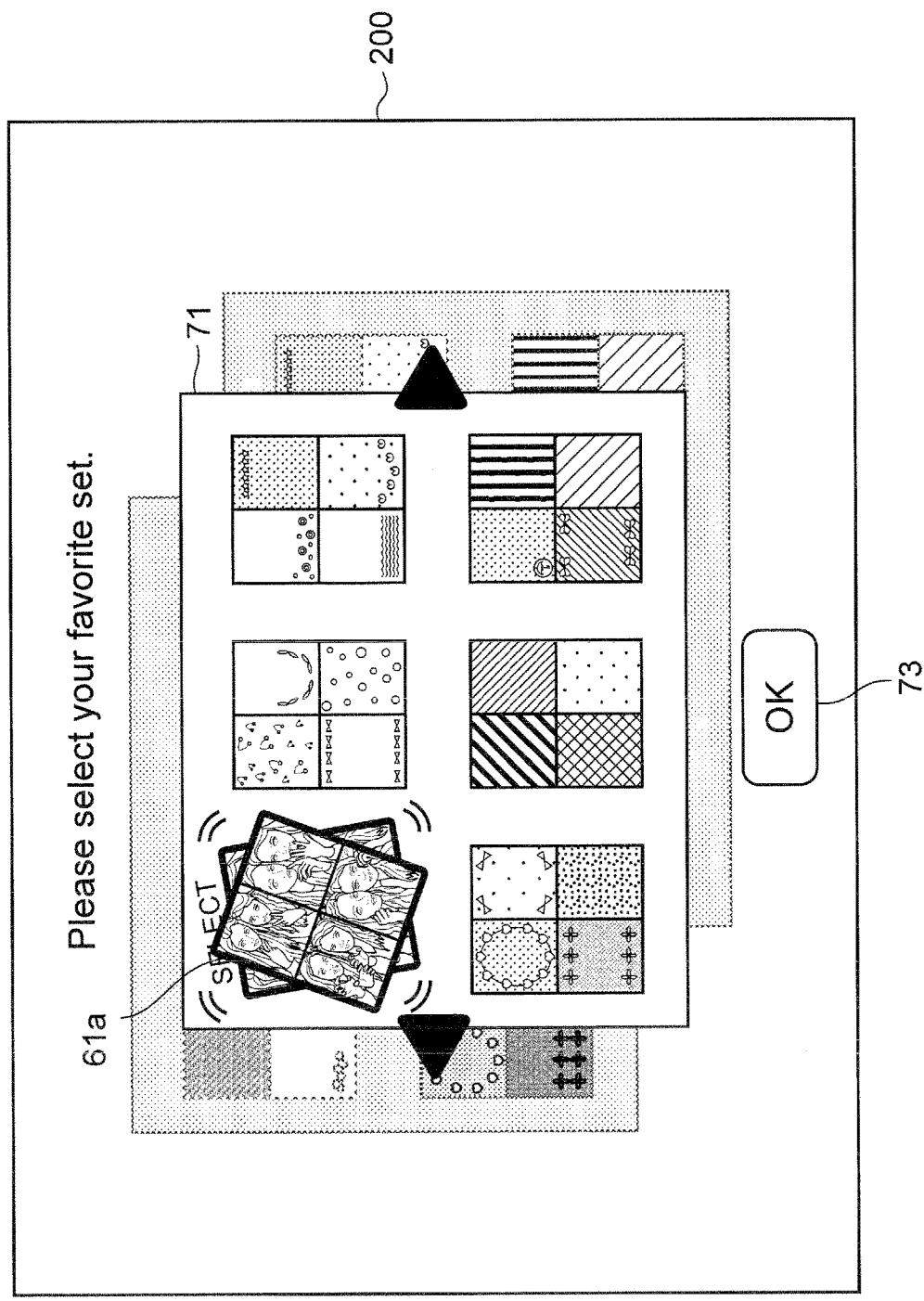
FIG. 18 is a view explaining a background selection process of a fifth modified example (animation-displaying the composite images)

As still another method for making the method for displaying the selected background set different from the method for displaying the non-selected background set, the selected background set may be animation-displayed. For example, when a desired background set is selected by the user on the background selection screen 200 (FIG. 7), the composite images 61a where the predetermined portrait images are superimposed on the selected background set may be moved (for example, moved as if being horizontally vibrated), as shown in FIG. 18, and displayed.

Figure 19:
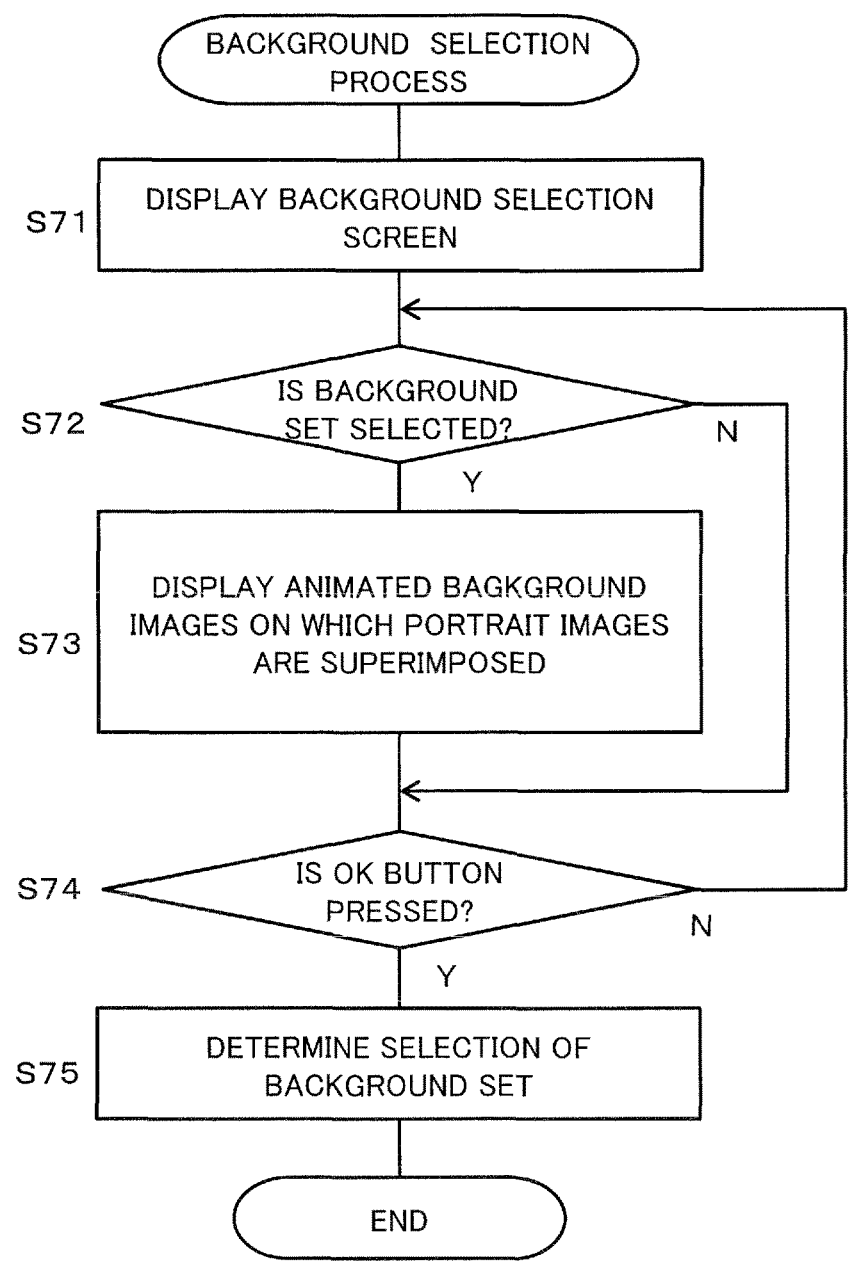
FIG. 19 is a flowchart showing the background selection process of the fifth modified example.

FIG. 19 is a flowchart showing such a background selection process. The control device 11 displays, on the touch panel monitor 23, the background selection screen 200 for allowing the user to select a background image (S71). When a background set is then selected by the user (YES in S72), the control device 11 displays the composite images 61a where the portrait images are superimposed on the selected background set on the touch panel monitor 23 while moving the composite images 61a (S73).

As thus described, by animation-displaying the image including the portrait images superimposed on the selected background set, the user can easily recognize which background set (background images) is being selected.

(f) Sixth Modified Example

Figure 20A:
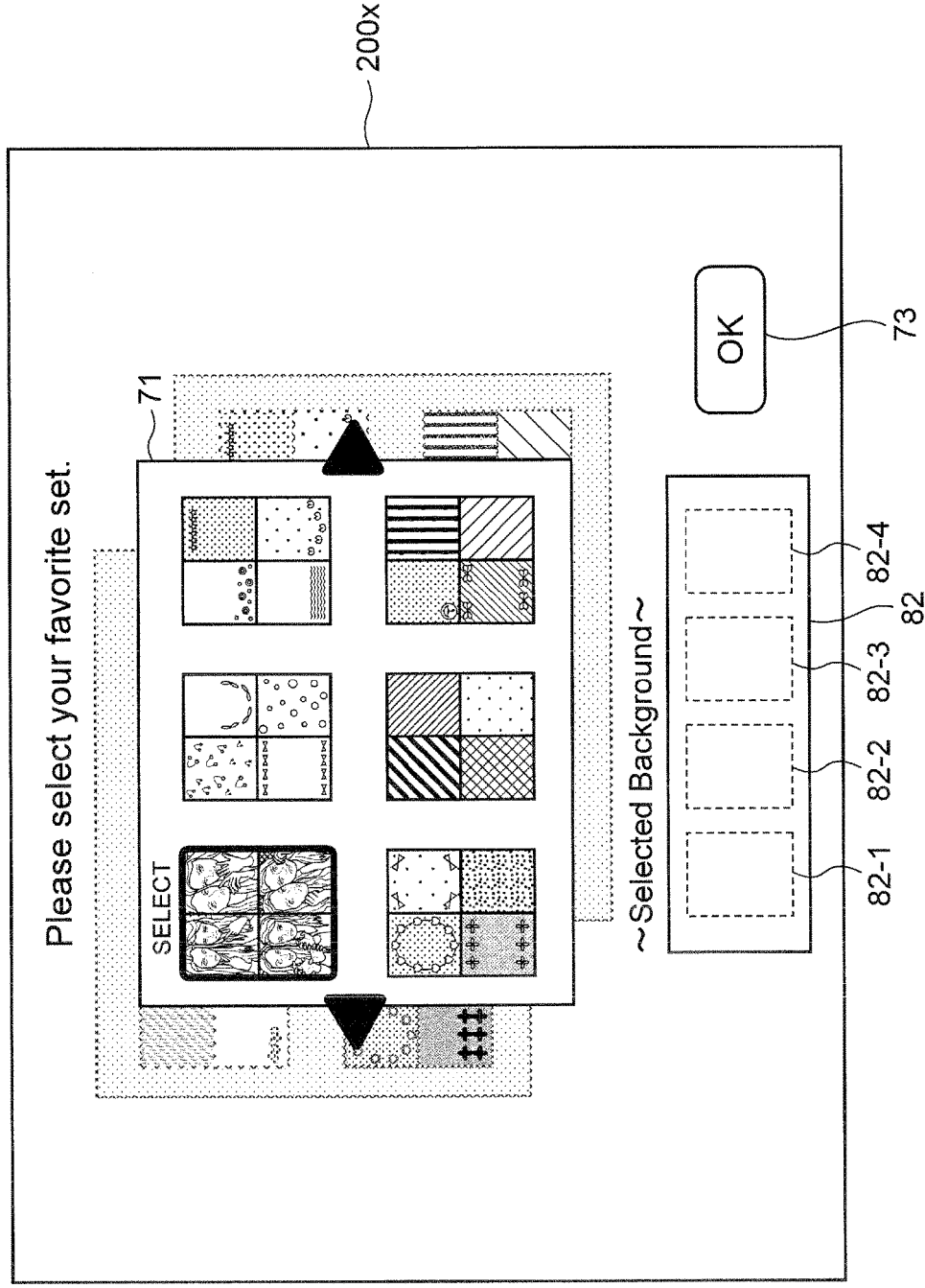
FIG. 20A is a view explaining a background selection process of a sixth modified example (a background selection screen having an upper-level region for displaying selectable background sets and a lower-level region for displaying selected background images)

Another configuration of the background selection process is described below. Here, a background selection screen provided with a region for displaying a background set which has been selected by the user but not been determined yet. FIGS. 20A and 20B show examples of the background selection screen. A background selection screen 200x shown in FIGS. 20A and 20B has a region (first region) 71 for displaying images of selectable background sets on an upper level of the screen, and a region (second region) 82 for displaying background images of the selected background set on a lower level of the screen. The lower-level region 82 includes four display regions 82-1 to 82-4 where the portrait images are combined with images of the selected background set and displayed.

When one background set is selected on the background selection screen 200x, as shown in FIG. 20A, composite images where the predetermined portrait images are superimposed on the selected background set are displayed for a predetermined period. After completion of the predetermined period, as shown in FIG. 20B, the display of the predetermined portrait images disappear in the upper-level region 71, and the composite images 61a in which the predetermined portrait images are superimposed on the selected background set are displayed in one of the regions 82-1 to 82-4 in the lower-level region 82.

Figure 21:
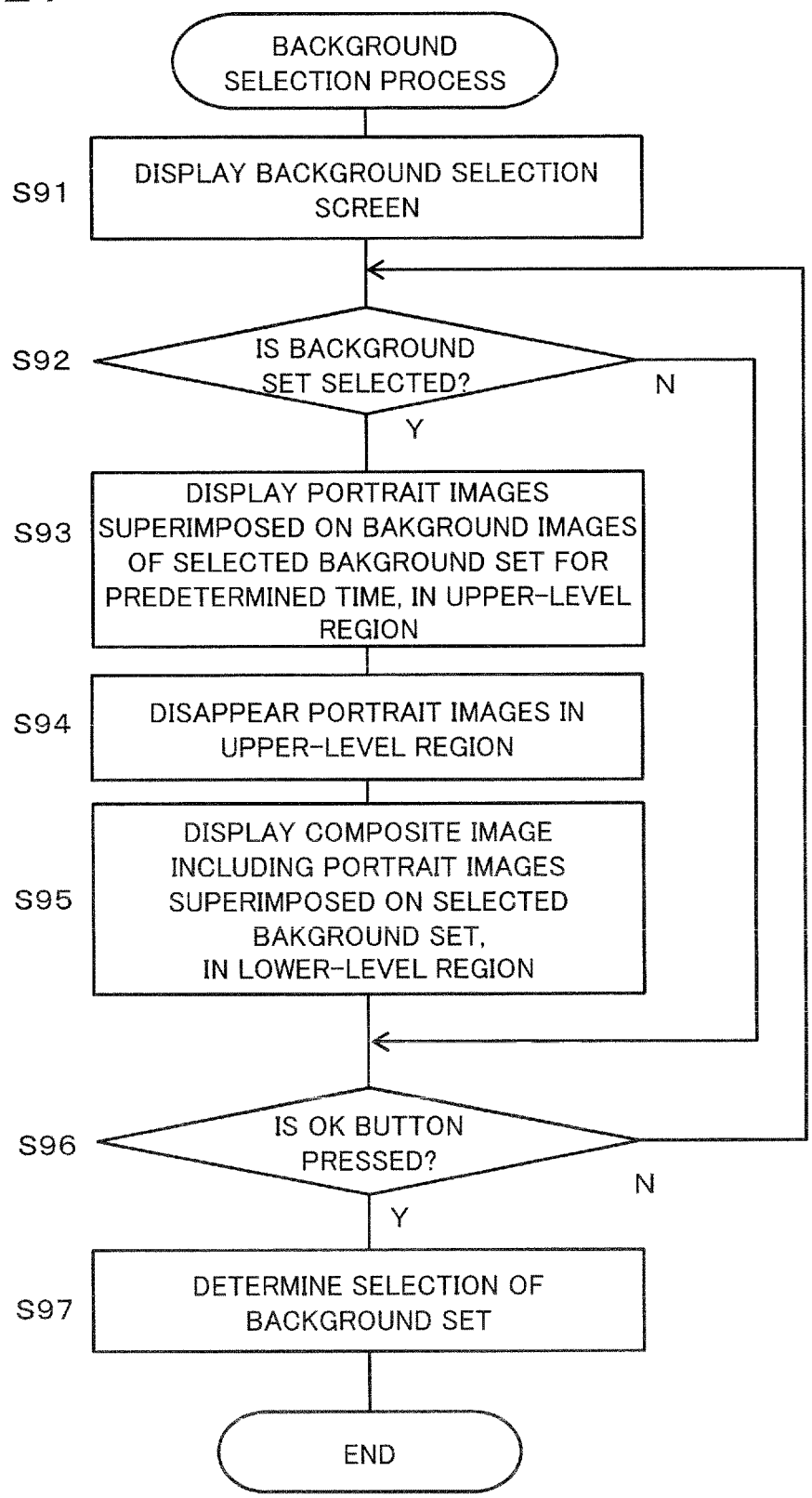
FIG. 21 is a flowchart showing the background selection process of the sixth modified example.

FIG. 21 is a flowchart showing such a background selection process performed on the background selection screen 200x. The control device 11 displays, on the touch panel monitor 23, the background selection screen 200x for allowing the user to select a background image (S91). When a background set is then selected by the user (YES in S92) in the upper-level region 71 of the background selection screen 200x, the control device 11 displays the composite images 61a in which the portrait images are superimposed on the background images of the selected background set in the upper-level region 71 on the touch panel monitor 23 for a predetermined period (S93).

Upon completion of the display of the composite images 61a for the predetermined period, the control device 11 deletes the displaying of the portrait images superimposed on the background images of the selected background set in the upper-level region 71 (S94), as shown in FIG. 20B. Further, the control device displays, in the lower-level region 82, composite images generated by superimposing the portrait images on the respective background images of the selected background set (S95). Here, in the lower-level region 82, the composite images are sequentially arranged in the empty display regions 82-1 to 82-4. When there is no empty region, the composite images are overwritten on the region displaying images of the background set which is selected at the oldest time among the background sets displayed in the lower-level region 82.

In the above example, the composite images related to the selected background set are displayed in the lower-level region 82, when the predetermined time elapses after selecting the background set on the background selection screen 200x (S95). However the composite images may be displayed in the lower-level region 82 at a different timing. For example, the background selection screen 200 may be provided with a provisional determination button. When the provisional determination button is pressed, the portrait images which is superimposed on the selected background set may be disappeared in the upper-level region 71, and the composite images related to the selected background set may be displayed in the lower-level region 82. Further a cancel button may be displayed for each composite images related to the background set which are displayed in the lower-level region 82. When the cancel button is pressed, the selection of the background set which is related to the pressed cancel button may be cancelled.

The user selects one of the background sets displayed in the lower-level region 82. When the OK button 73 is finally pressed by the user (YES in S96), the control device 11 determines one background set being selected by the user from the background sets displayed in the lower-level region 82, as the background set finally selected by the user (S97). The control device 11 stores information indicating the selected background set into the RAM 17, to complete the present process.

With the above background selection screen 200x, when the background set is selected in the upper-level region, the portrait images are superimposed on the selected background set and displayed in the lower-level region 82. Hence the user can compare and recognize a plurality of candidates of background sets currently selected in the lower-level region 82, leading to improvement in convenience of the user in selection of a background image.

(g) Seventh Modified Example

Figure 22:
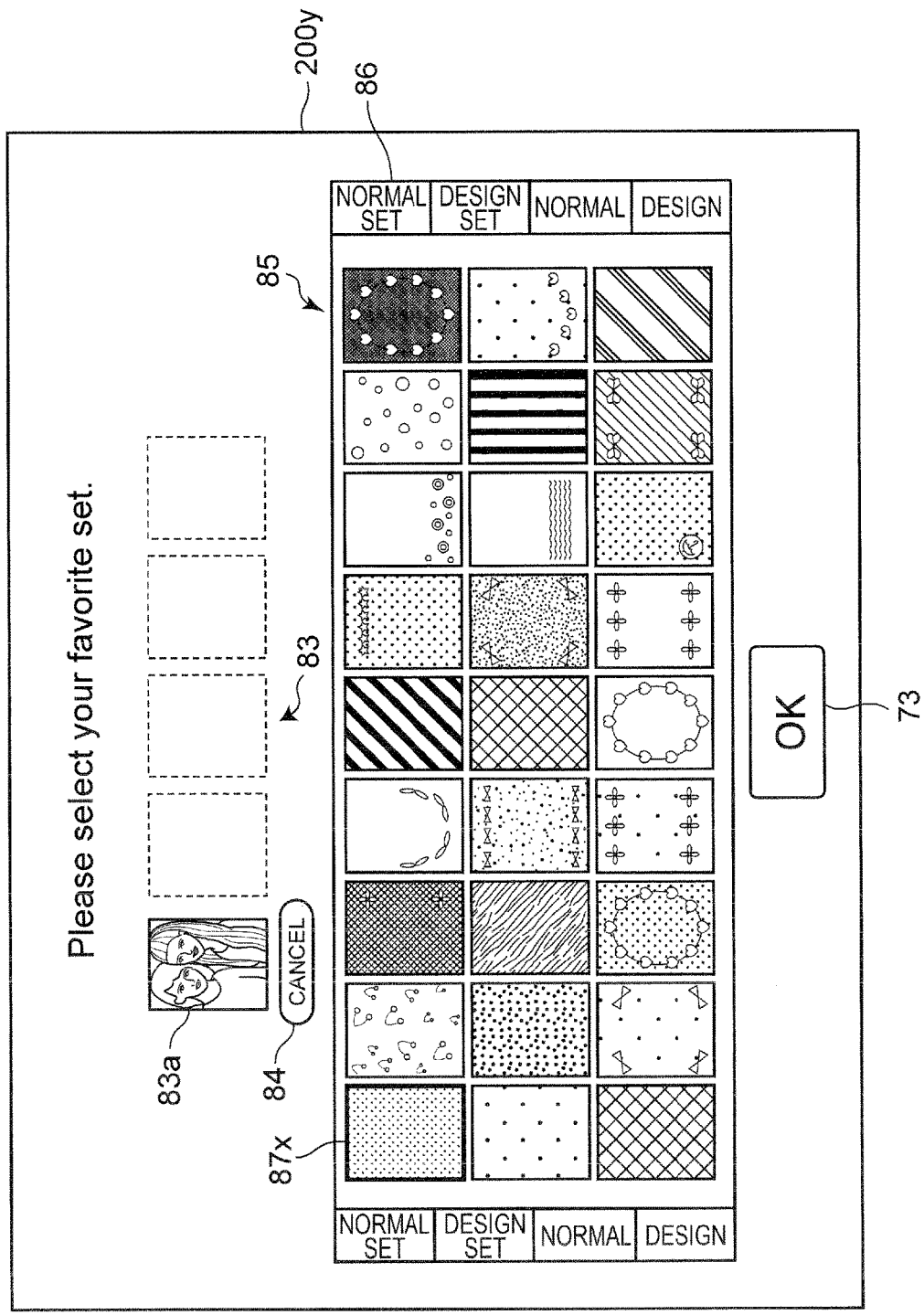
FIG. 22 is a view explaining a background selection process of a seventh modified example (a background selection screen having an upper-level region for displaying selectable background images and a lower-level region for displaying selected background images)

Although the background images have been selected in units of a background set in the background selection screen 200x shown in FIGS. 20A and 20B, the selection is made in units of a background image on a background selection screen of the present example. FIG. 22 shows the background selection screen of the present example.

As shown in FIG. 22, a background selection screen 200y has a region (first region) 85 for displaying a plurality of selectable background images on a lower level, and a region (second region) 83 for displaying selected background images on an upper level. The background selection screen 200y displays a plurality of selectable background images, respectively, in the region 85. The background images are classified for each of themes, and the theme can be switched by means of a tab 86. In the region 85, a plurality of background images related to the theme selected by the tab 86 are displayed.

On the background selection screen 200y, when one background image is selected, an anchor display (thick-bordered frame) 87 showing the selection is placed on the selected background image. Further, in the upper-level region 83, a composite image 83a in which a predetermined portrait image is superimposed on the selected background image is displayed. Moreover, a cancel button 84 is displayed with respect to the newly displayed composite image

83a. By this cancel button 84, the selection of the background image can be canceled.

Figure 23:
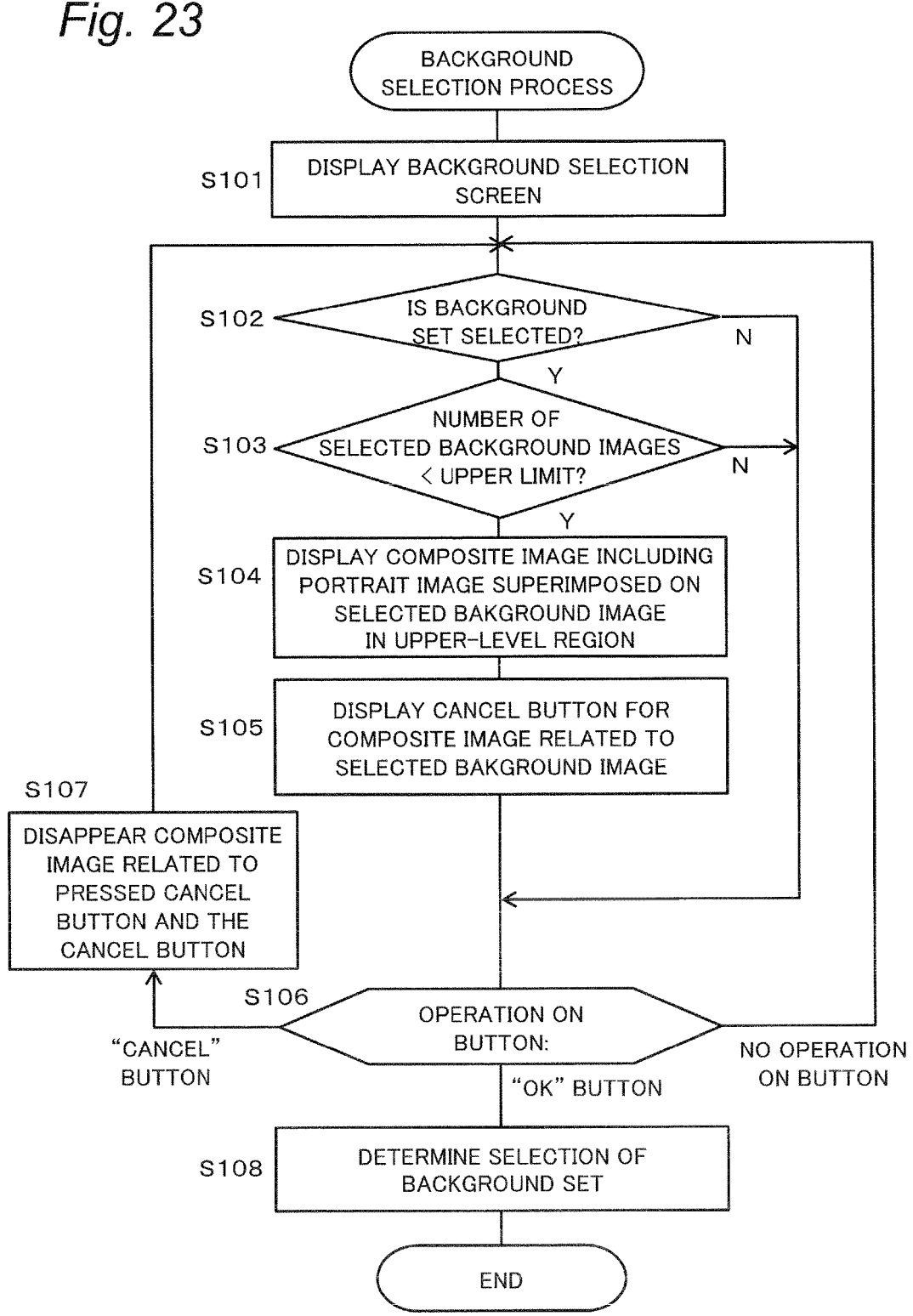
FIG. 23 is a flowchart showing the background selection process of the seventh modified example.

FIG. 23 is a flowchart showing such a background selection process performed on the background selection screen 200y. The control device 11 first displays on the touch panel monitor 23 the background selection screen 200y for allowing the user to select a background image (S101). Subsequently, when a background image is selected by the user (YES in S102) in the lower-level region 85 of the background selection screen 200y, the control device 11 determines whether or not the number of the already selected background images is smaller than an upper limit (four in the present example) of the selectable background images (S103). When the number of the already selected background images is not smaller than the upper limit (NO in S103), the control device 11 proceeds to the control of Step S106. In this case, the maximum number of background images have already been selected, and thus a further selection is impossible. The user can make a new selection by cancelling one or more selections of the background image with the cancel button 84.

On the other hand, when the number of the selected background images is smaller than the upper limit (YES in S103), the control device 11 displays, in the upper-level region 83, the composite image 83a in which the portrait image is superimposed on the selected background image (S104). The control device 11 simultaneously displays the cancel button 84 corresponding to the composite image 83a (S105).

When the cancel button is then pressed (touched), the control device 11 deletes the displaying of the composite image 83a related to the pressed cancel button and displaying of the cancel button 84 (S107). In this case, the control device 11 cancels the selection of the background image related to the pressed cancel button.

Further, when the OK button 73 is pressed by the user, the control device 11 determines the background images displayed in the upper-level region 83 as the finally selected background images (S108), and stores information indicating those background images into the RAM 17, to complete the present process.

As described above, according to the background selection screen 200y shown in FIG. 22, while the selection can be made in units of a background image, the user can recognize a plurality of candidates for background images to be selected in the upper-level region 83, thus leading to improvement in convenience for selecting a background image.

(h) Eighth Modified Example

Hereinafter, a function of allowing the user to change the order of background images in a background set is described.

FIG. 24A is a diagram showing a background selection screen of the present example. Similarly to the above, when a background image set is selected, the background selection screen 200 displays composite images including the portrait images combined with images of the selected background image set. Regarding the background set, the portrait image may be superimposed only on the background image which is selected by the user while the portrait image may not be superimposed on the background image which is not selected by the user. Further, the background selection screen 200 has an ARRANGE button 77 in addition to the OK button 73. When this ARRANGE button 77 is pressed, as shown in FIG. 24B, the control device 11 displays a pop-up screen 80c including an image obtained by enlarging the composite images 61a including the portrait images superimposed on the background image set. On this pop-up screen, the user can perform an operation of dragging and dropping one of two composite images (background images), the order of which is wished to be interchanged by the user, onto the other image, thereby to interchange the order of those composite images. For example, by dragging and dropping an upper-left image to a lower-right image with a stylus pen or the like in the composite images 61a shown in FIG. 24B, the upper-left composite image and the lower-right composite image are interchanged, as shown in FIG. 24C.

By user's pressing the OK button 74, the order of the background images in the background set is determined to be the interchanged order.

As described above, by interchanging the order of the background images, the order of the shot images to the background images to be combined with the shot images is interchanged. This is specifically described below.

As shown in FIG. 24D, in the composite images 61a, it is assumed that an upper-left background image is a background image A, an upper-right background image is a background image B, a lower-left background image is a background image C, and a lower-right background image is a background image D. In this case, in creating a sticker, the shot image firstly shot is combined with the background image A, the shot image secondly shot is combined with the background image B, the shot image thirdly shot is combined with the background image C, and the shot image fourthly shot is combined with the background image D. When the upper-left image and the lower-right image in the composite image 61a in FIG. 24D are interchanged, the upper-left background image becomes the background image D and the lower-right background image becomes the background image A in the composite image 61c as shown in FIG. 24E. Herewith, in creating a sticker, the shot image firstly shot is combined with the background image D, and the shot image fourthly shot is combined with the background image A. That is, the background images to be combined with the shot images firstly and fourthly shot are interchanged. By changing the order of background images in the composite image in such a manner, the background images to be combined with the shot images can be interchanged.

Figure 25:
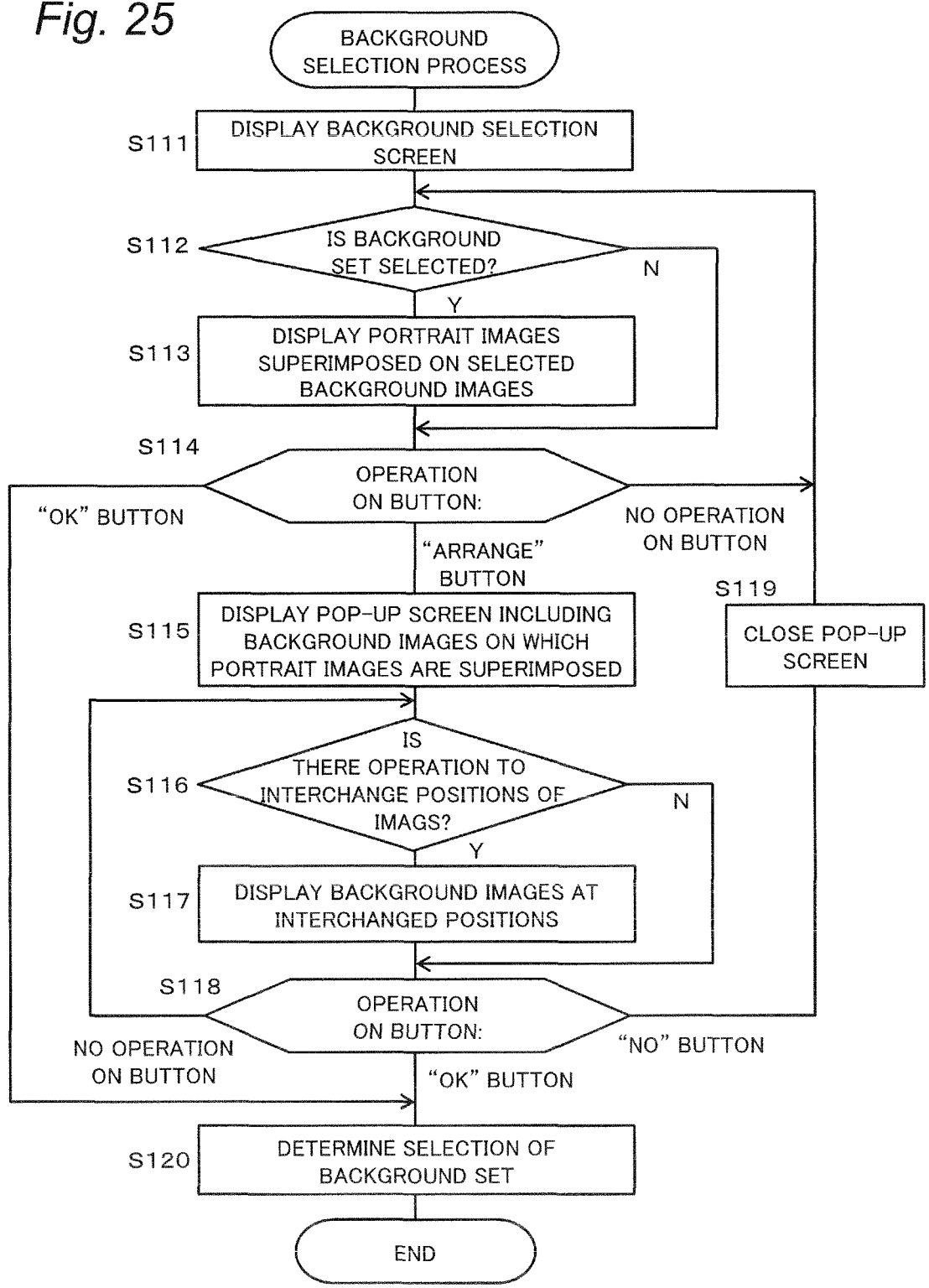
FIG. 25 is a flowchart showing the background selection process of the eighth modified example.

FIG. 25 is a flowchart showing the background selection process of the present example. The control device 11 first displays the background selection screen 200 on the touch panel monitor 23 (S111). When a background set is then selected by the user (YES in S112), the control device 11 displays a composite image including the predetermined portrait images superimposed on the selected background set (S113).

Here, the control device 11 determines whether or not a button is operated (S114). When no button is operated, the control device 11 returns to the control in Step S112. When the OK button 74 is pressed (touched), the control device 11 determines the selection of the background set (S120) and stores information indicating the determined background set into the RAM 17, to complete the present process.

When the ARRANGE button 77 is pressed, the pop-up screen 80c, as shown in FIG. 24B, including the image obtained by enlarging the composite images 61a including the portrait images superimposed on the background image set, is displayed (S115). Subsequently, it is determined whether or not an image interchanging operation (drag-and-drop operation) is performed by the user (S116). When the image interchanging operation is performed by the user (see FIG. 24B), the composite images (background images) are interchanged in accordance with the user's operation on the pop-up screen 80c, and the pop-up screen 80c in which the order of the composite images has been interchanged is displayed (see FIG. 24C) (S117).

In this state, the control device 11 determines whether or not the button is operated (S118). When no button is operated, the control device 11 returns to the control in Step S116. When the NO button 75 is pressed, the control device 11 closes the pop-up screen 80c (S119), returns to the control in Step S112, and repeats the processes in Steps S112 to S119 until the OK button 74 is pressed. When the OK button 74 is pressed, the control device 11 determines the selection of the background set (S120) and stores information indicating the determined background set into the RAM 17, to complete the present process.

With such an arrangement described as above, it is possible to change the correlation between the shot image and the background image to be combined with the shot image, thus leading to improvement in convenience of the user.

(i) Ninth Modified Example

Figure 26:
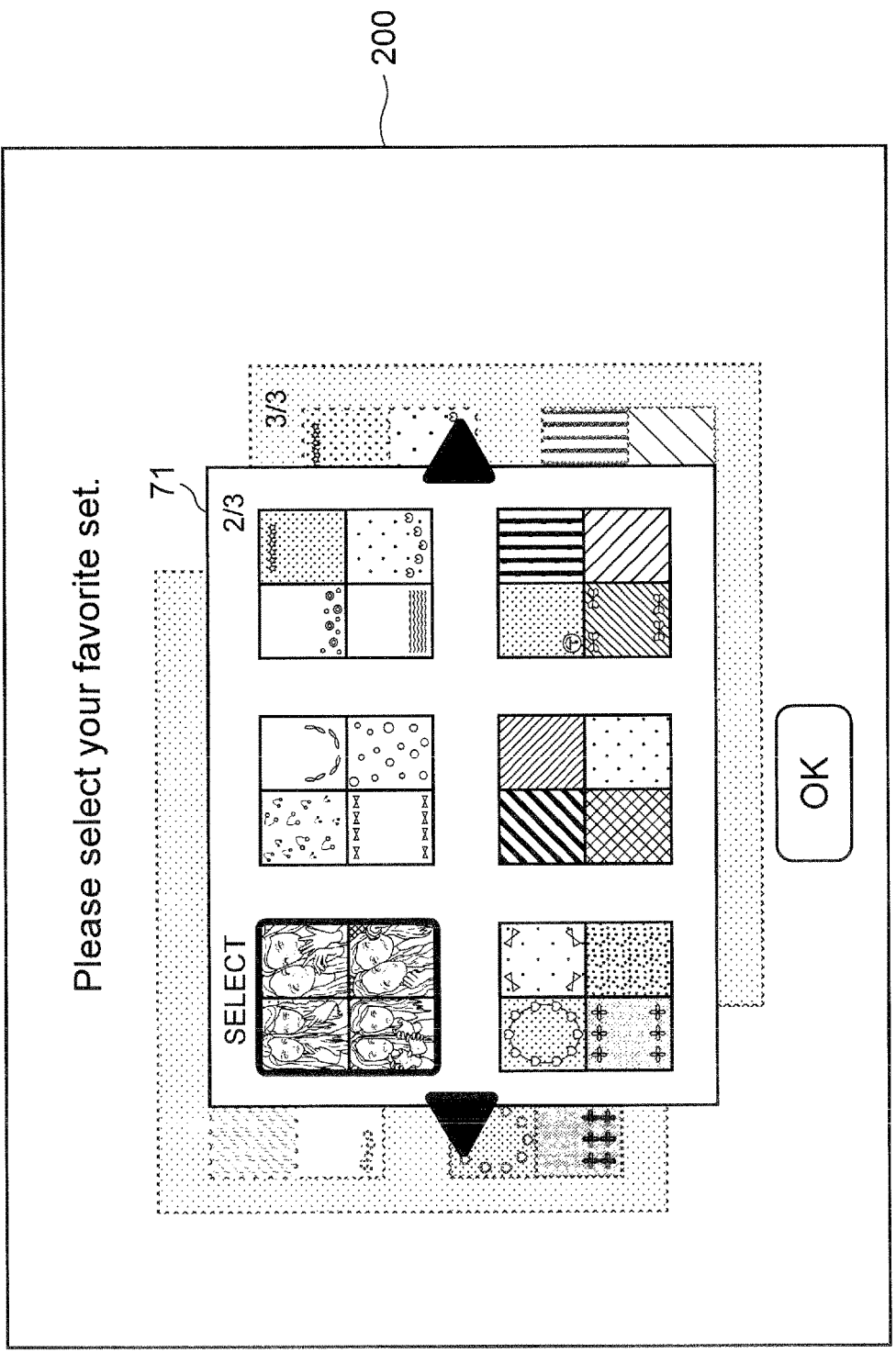
FIG. 26 is a view explaining a background selection process of a ninth modified example (display of page numbers)

On the above background selection screens 200, ..., page number of page where the background images are displayed in addition to the background images. For example, as shown in FIG. 26, the page number may be displayed in the form of "a page number of the current page/a total number of pages", such as "2/3" and "3/3". By displaying the total page number, the user can grasp how many background sets exist as a whole, and can also grasp intuitively how many background images have been checked at the present moment.

Figure 27:
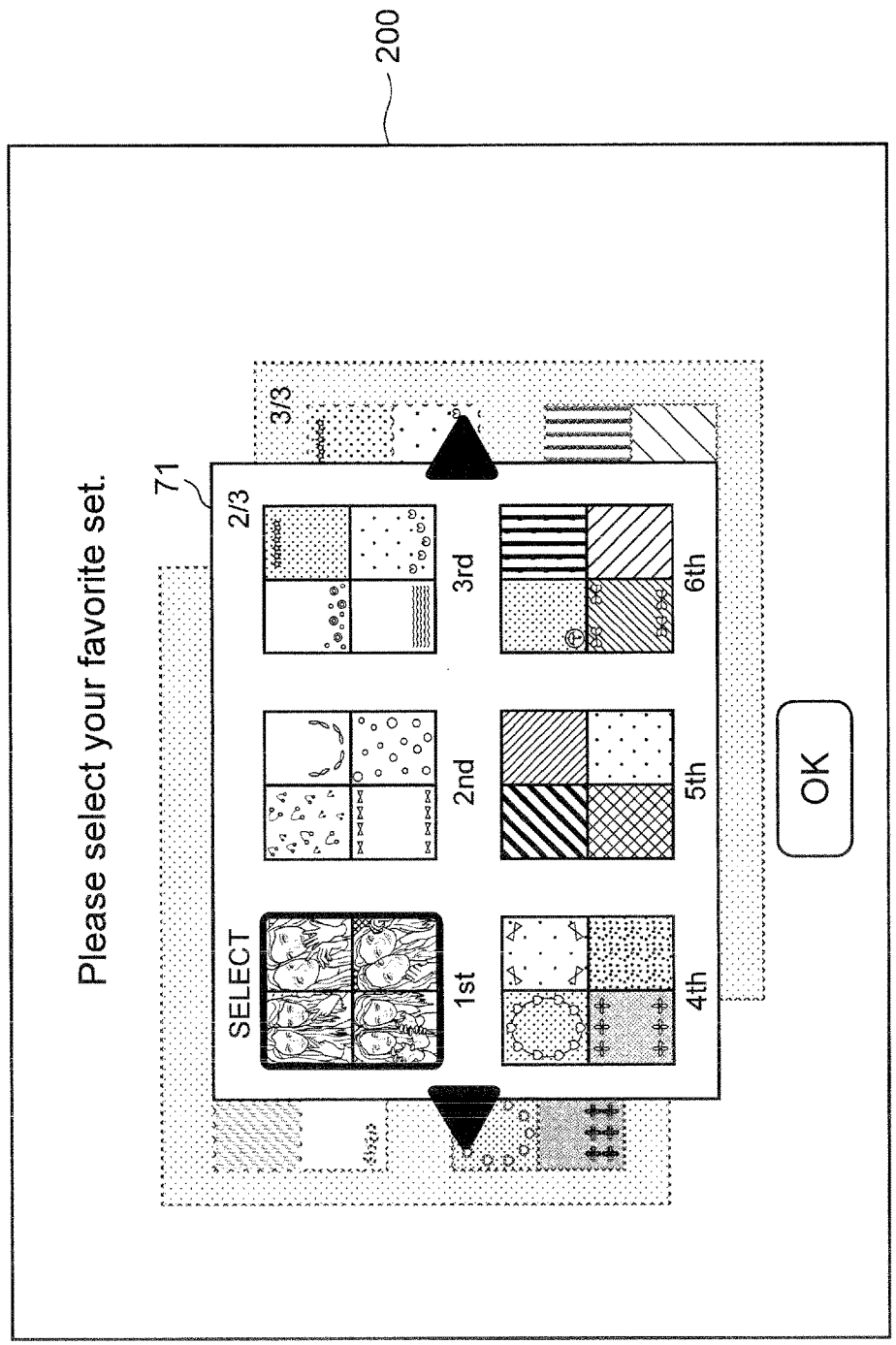
FIG. 27 is a view explaining the background selection process of the ninth modified example (display of popular ranking)

Further, popular ranking for background sets may be displayed on the background selection screens 200, .... For example, as shown in FIG. 27, ranking (first place, second place, ...) may be displayed for each background set. For this purpose, the control device 11 records a history of selection of background-sets into the storage medium 12 every time a background set is selected by the user. Further, in every predetermined period (e.g., every week, every month or every predetermined number of months), the control device 11 performs tallies up the history of selection recorded in the storage medium 12 to obtain the ranking of selected frequency for each background set. The obtained ranking is recorded into the storage medium 12. The control device 11 reads the ranking for each background set from the storage medium 12, and also displays it along with images of the background set on the background selection screen 200. Displaying such ranking allows the user to know which background set is popular. Further, the displaying method of background set may be changed depending on the ranking. For example, images of a background set ranked high (not lower than a predetermined rank) may be displayed in larger size, or displayed while being moved. Further, for the background set ranked high (not lower than the predetermined rank), a text showing a rank may be blinked, or may be displayed with a different color from that of a text showing a low rank.

Moreover, when the background set is selected on the background selection screens 200, ..., information affirming the selection may be displayed. For example, the control device 11 may add a text 81 of "Good Choice" as shown in FIG. 28 to the selected background set. Further, the control device 11 may add a text meaning affirmation to the selection of the background set, such as "like" or "Great". In place of the text, an image affirming the selection of the background set may be displayed. Further, in place of or in addition to the text or the display of the image, audio sound affirming the selection of the background set may be outputted from the speaker 25. Moreover, when the background set is selected, an illumination method of the lighting apparatuses 26a to 26e may be controlled to perform illumination in a manner to affirm the selection (e.g., illumination light may be flashed, or a color of the illumination light may be changed.) By notifying the user of information affirming the selection as thus described, the user who hesitates to make a selection can be confident at the time of making a selection, and consequently, the selection operation can be rapidly completed. It is to be noted that each display method and control described using FIGS. 26 to 28 can be combined as appropriate.

2.4 Guidance Display in Photographing Process

A guidance display that is performed on the touch panel monitor 23 at the time of photographing is described below. When a predetermined background image is selected, the photograph sticker creating apparatus 1 of the present embodiment displays, on the screen, a preferable pose prepared in accordance with the background image, in the photographing process. This allows the user to recognize a pose suitable for the background image and can shoot an image with the pose. For this purpose, the photograph sticker creating apparatus 1 stores, in the storage medium 12, an image of people each striking a pose suitable for a predetermined background image in association with the background image.

Figure 29A:
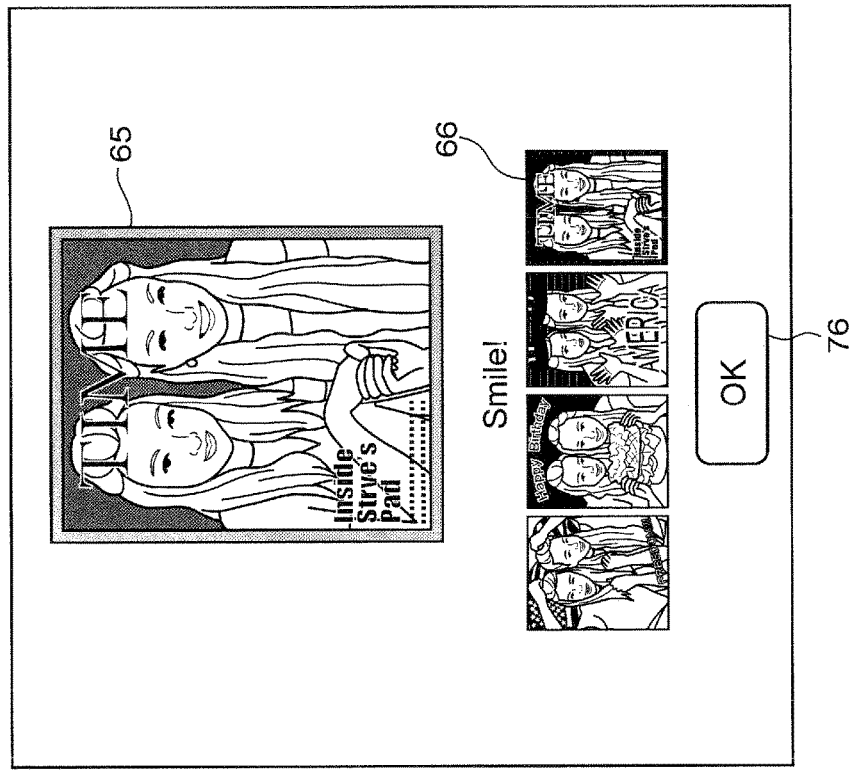
FIGS. 29A and 29B are views showing examples of a composite image to be displayed at the time of photographing, that suggests a pose in accordance with a background image.
Figure 29B:
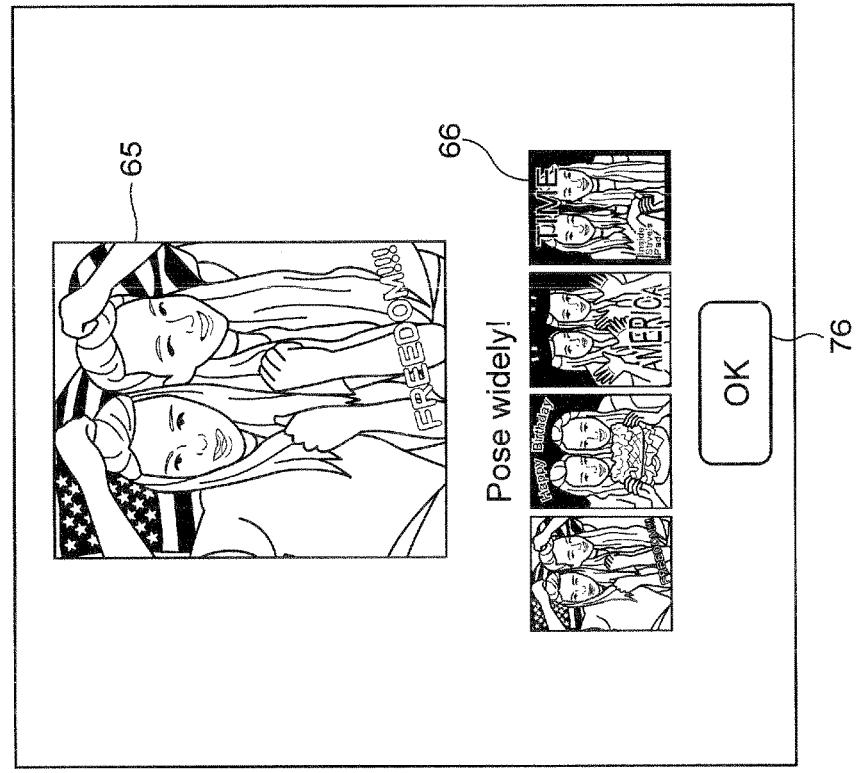

FIGS. 29A and 29B are views showing examples of a composite image of a background image and a portrait image striking a pose corresponding to the background image, which is displayed on the touch panel monitor 23 in the photographing process. FIGS. 29A and 29B are examples of the screen displayed on the touch panel monitor 23 upon shooting a first image and a fourth image, respectively. On the center of each screen, there is displayed a composite image 65 in which an image of people each striking a pose corresponding to the first or fourth background image included in the selected background set is superimposed on the background image.

Figure 30:
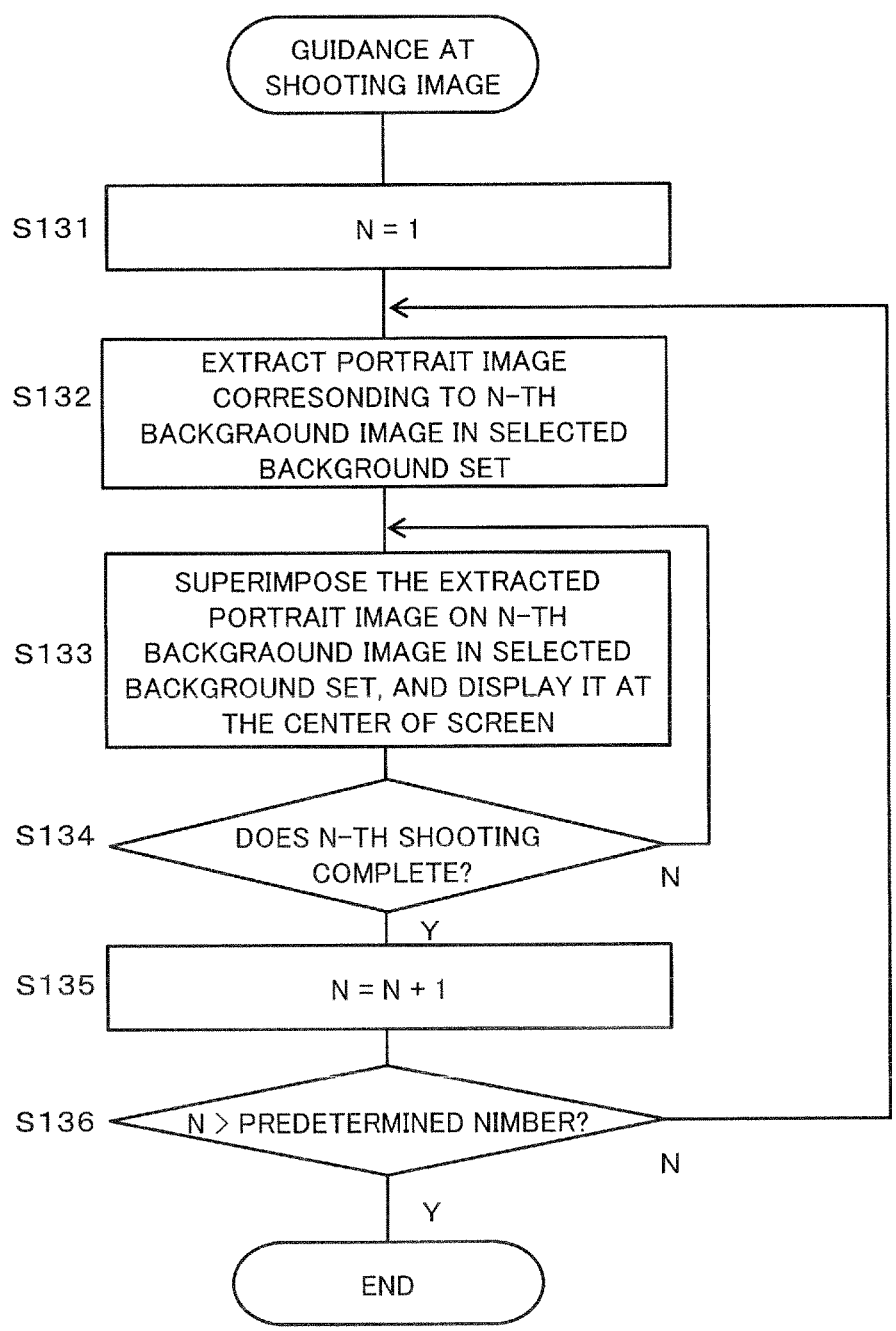
FIG. 30 is a flowchart showing a background selection process of displaying a composite image that suggests a pose in accordance with a background image.

FIG. 30 is a flowchart concerning a process of the guidance display in the photographing process. First, the control device 11 initializes a variable N showing the number of times of photographing to 1 (S131). The control device 11 extracts, from the storage medium 12, data of an image of people each striking a pose corresponding to an N-th background image in the selected background set (S132). The control device 11 displays, on the center of the screen, a composite image in which the extracted portrait image is superimposed on the N-th background image in the selected background set (S1333). The control device 11 determines whether or not the N-th photographing operation performed by the camera 21 has been completed (S134). Until the N-th photographing operation is completed, the control device 11 keeps displaying the composite image concerning the N-th background image (S134 to S133). When the N-th photographing operation is completed, the variable N is incremented. The control device 11 determines whether or not the variable N exceeds a predetermined number of times of photographing operation (four in the present example), to determine whether or not the entire photographing operations are completed (S136). The above processes are repeated (S132 to S136) until completion of the predetermined number of times of photographing operations. Consequently, a pose corresponding to a background image is displayed on the touch panel monitor 23 in each photographing process. It is to be noted that the control device 11 may be configured to output, via the speaker 35, voice sound for prompting the user to strike a pose corresponding to the background image, in synchronism with the timing of the photographing operation (shutter ON). For example, the speaker 35 may output an announcement of "Please make a heart with your arms."

Performing such notification as above allows the user to recognize a pose suitable for the background image and can shoot an image while striking that pose.

2.5 Layout Selection Process

The layout selection process (Step S5) in the flowchart of FIG. 5 is described. The layout selection process is a process of deciding a layout of the photograph sticker.

Figure 31A:
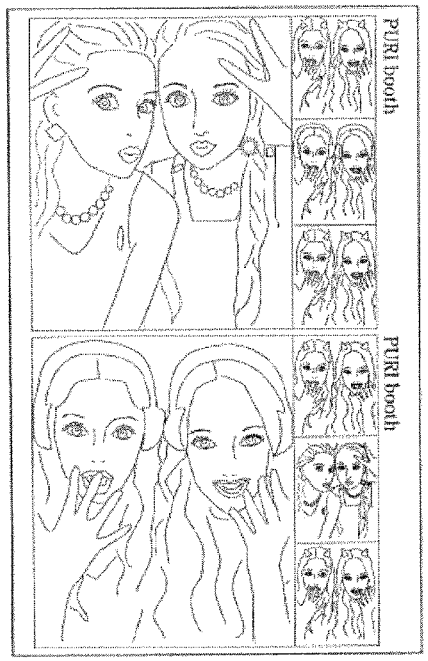
FIGS. 31A to 31D are views showing examples of a layout of a photograph sticker.
Figure 31B:
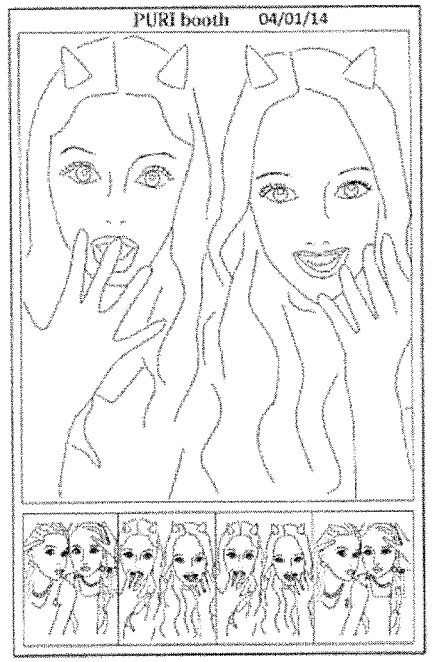
Figure 31C:
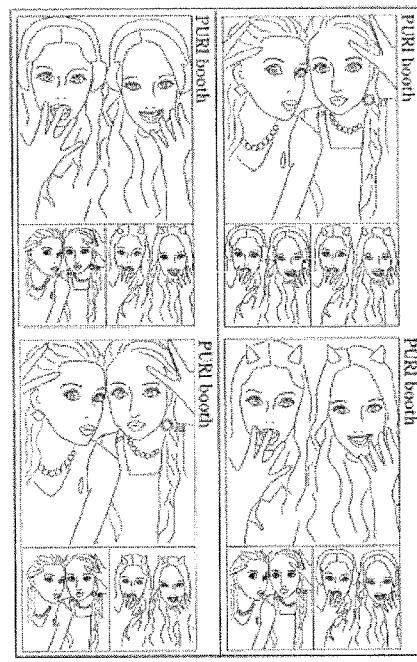
Figure 31D:
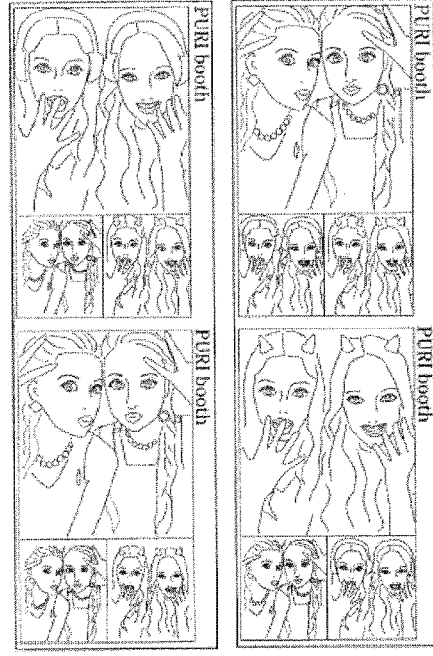

FIGS. 31A to 31D are views showing examples of the layout of the photograph sticker. Regarding a layout of FIG. 31A, the whole region of the photograph sticker is vertically equally divided into two parts, and in each of the divided regions, one large-sized image and three small-sized images which are vertically arrayed to the right side of the one large-sized image are arranged. Regarding a layout of FIG. 31B, one large-sized image and four small-sized images which are laterally arrayed under the one large-sized image are arranged. Regarding a layout of FIG. 31C, the whole region of the photograph sticker is vertically/laterally equally divided into four parts, and in each of the divided regions, one large-sized image and two small-sized images which are laterally arrayed under one large-sized image are arranged. FIGS. 31A to 31C show examples of the layout for print on one piece of sticker sheet, but FIG. 31D shows an example of the layout for print on two pieces of sticker sheets. That is, FIG. 31D is an example of a layout for printing the left-half image and the right-half image of the whole image shown in the layout of FIG. 31C, on different sticker sheets, respectively, in the present embodiment, the user can select one desired layout out from a plurality of layouts as shown in FIGS. 31A to 31D.

Figure 32:
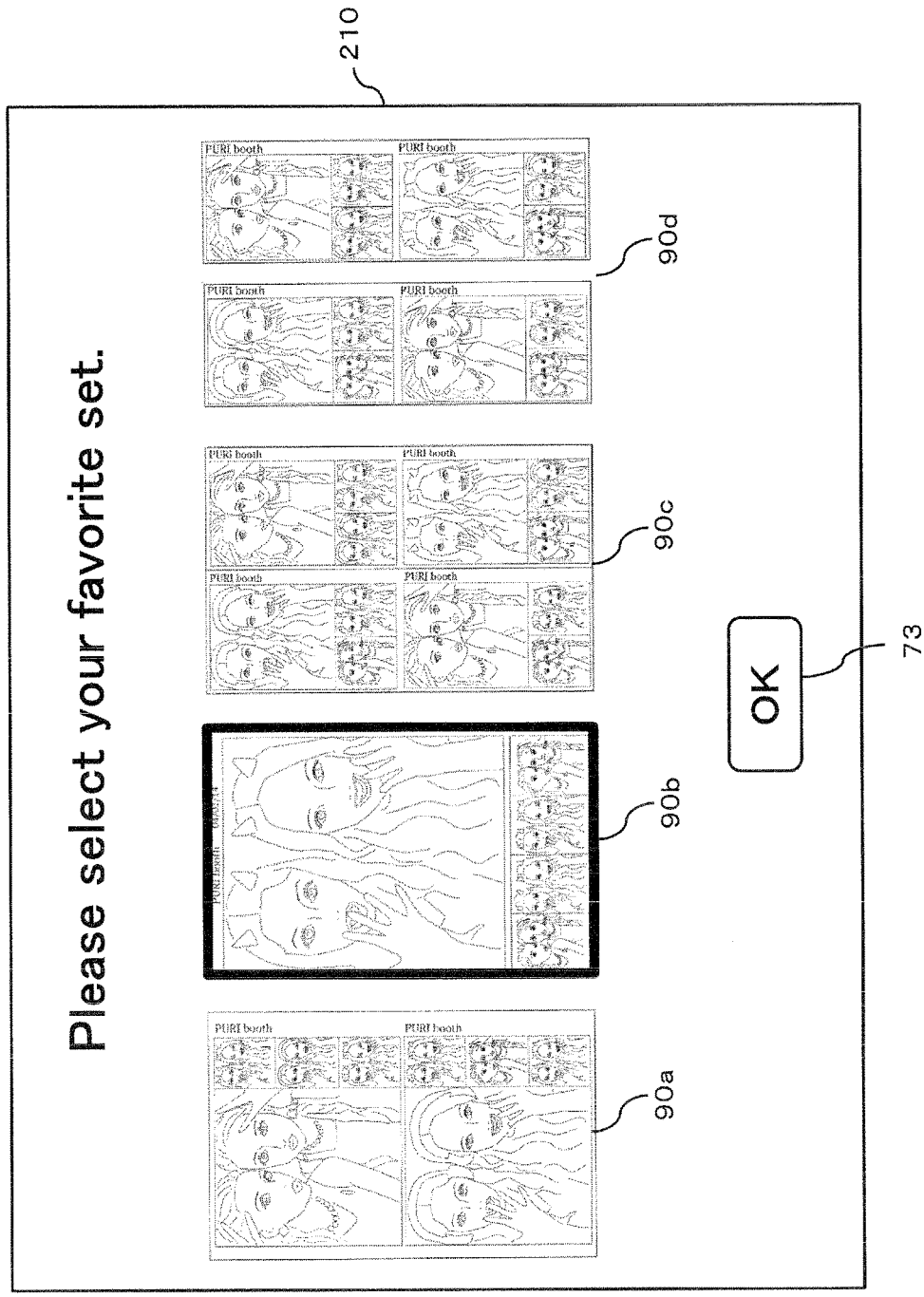
FIG. 32 is a view showing an example of a layout selection screen.

In the layout selection process, the control device 11 displays a layout selection screen 210 as shown in FIG. 32 on the tablet built-in monitor 33 of the editing section 120. By pressing the OK button 73 with the stylus pen 37 or the like on this layout selection screen 210, the user can select a desired layout to be applied to the photograph sticker from the plurality of layouts 95a to 95d. When one layout is selected by the user, the control device 11 stores information indicating the selected layout into the RAM 17.

Subsequently, the control device 11 arranges shot images in accordance with the information indicating the layout stored in the RAM 17, to create a photograph sticker.

2.6 Printer Control

Figure 33:
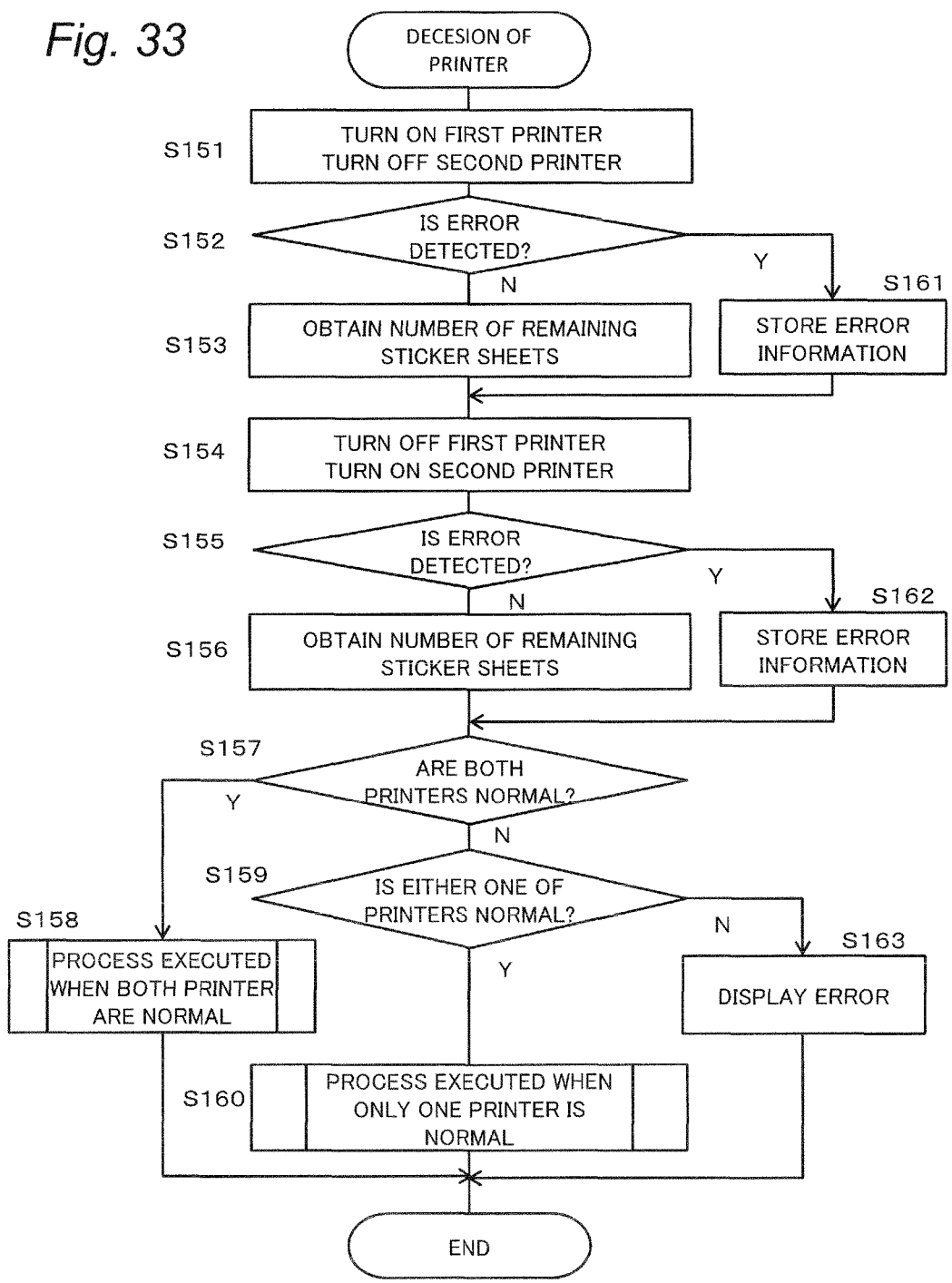
FIG. 33 is a flowchart showing a process of printer decision performed on startup of the photograph sticker creating apparatus.

As described before, the photograph sticker creating apparatus 1 has two printers 51a and 5ab (see FIG. 3). Switching control of the two printers 51a and 851b is described below. First, with reference to FIG. 33, a process for deciding the printer upon startup of the photograph sticker creating apparatus 1.

When the photograph sticker creating apparatus 1 is turned on and activated, the control device 11 turns on the first printer 51a and the turns off the second printer 51b (S151). When detecting an error of the first printer 51a (YES in S152), the control device 11 stores information indicating the error to the RAM 17 (S161). It is noted that the error is a state where the printing out is impossible. When detecting no error of the first printer 51a (No in S152), the control device 11 obtains the number of remaining (unused) sticker sheets from the first printer 51a, and stores information indicating the number of remaining sticker sheets to the RAM 17 (S153). It is to be noted that both first and second printers 51a and 51b count the respective remaining sticker sheets, and store the respective counts to the respective recording media.

Then the control device 11 turns off the first printer 51a and the turns on the second printer 51b (S154). When detecting an error of the second printer 51b (YES in S155), the control device 11 stores information indicating the error to the RAM 17 (S162). When detecting no error of the second printer 51b (No in S155), the control device 11 obtains the number of remaining sticker sheets from the second printer 51b, and stores information indicating the number of remaining sticker sheets to the RAM 17 (S156).

The control device 11 determines whether both the first and second printers 51a and 51b are normal (S157). When both printers 51a and 51b are normal, the control device 11 performs a predetermined operation as shown in a flowchart of FIG. 34A.

Figure 34A:
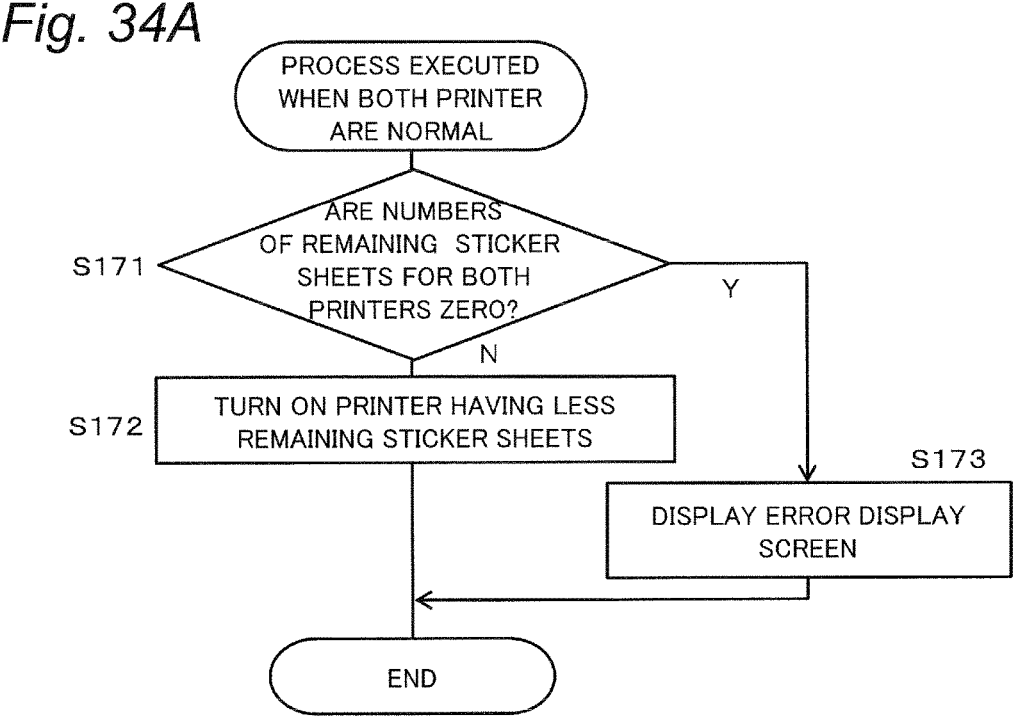
FIG. 34A is a flowchart showing a process performed when both two printers are normal.
Figure 35A:
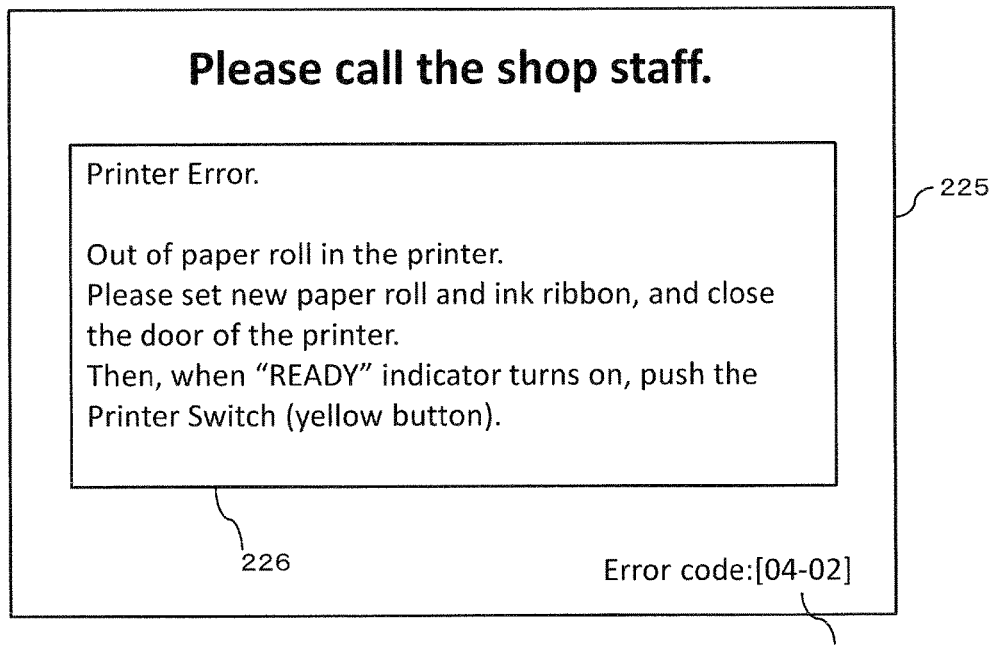
FIG. 35A is a view showing one example of error display screen.

Specifically, in the flowchart of FIG. 34A, the control device 11 determines whether or not both of the respective numbers of remaining sticker sheets for both the printers 51a and 51b are zero (S171). When both of the respective numbers of remaining sticker sheets are zero (YES in S171), the control device 11 displays an error display on the touch panel monitor 23 (S173). FIG. 35A shows one example of an error display screen. The error display screen 225 displays information 226 indicating occurrence of error, paper out (lack of sticker sheets), and countermeasure thereof. The error display screen 225 also displays an error code 227 indicating an error status. When the numbers of remaining sticker sheet is zero, information indicating the paper out may be sent to a predetermined destination (e-mail address). The information indicating the paper out includes information indicating that the numbers of remaining sticker sheet is zero, information indicating the shop at which the photograph sticker creating apparatus 1 is installed, information of date and time the error is detected, and so on.

Figure 36A:
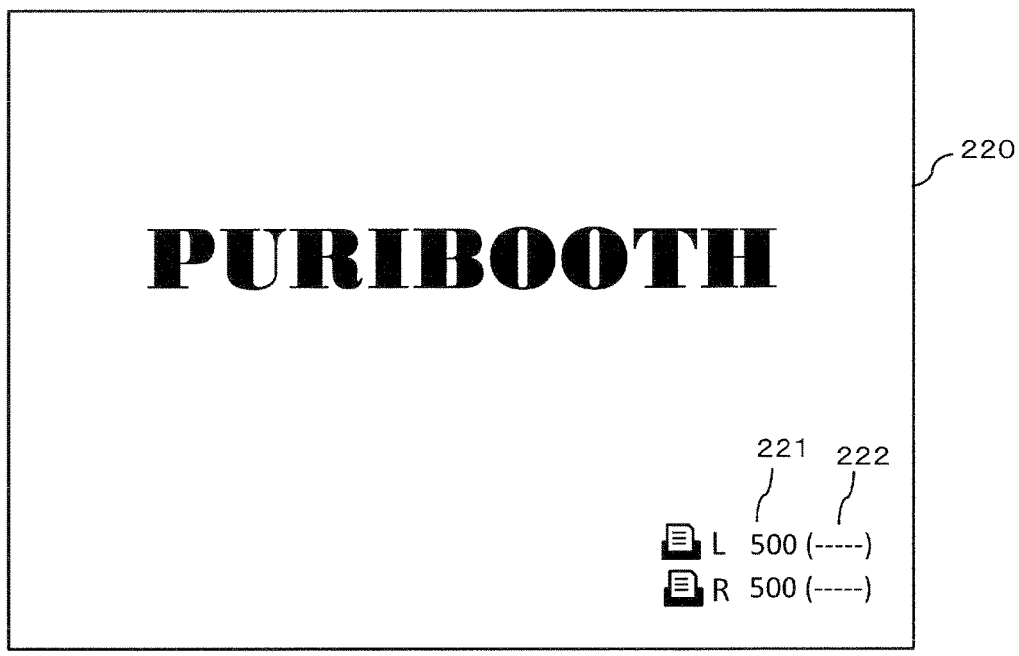
FIG. 36A is a view showing one example of a demonstration screen.

When at least one of the respective numbers of remaining sticker sheets for printers 51a and 51b is zero (NO in S171), the control device 11 turns on the printer which has less remaining sticker sheets (S172), while the printer which has more remaining sticker sheets is turned off. Then the control device 11 displays a demonstration screen as shown in FIG. 36A on the touch panel monitor 23. The demonstration screen 220 shown in FIG. 36A displays the number of remaining sticker sheets 221 and the error code 222 for each of printers 51a and 51b. In the demonstration screen 220 shown in FIG. 36A, any information is not displayed for the error code 222 since there is no error. It is to be noted that the number of remaining sticker sheets 221 and the error code 222 for each of printers 51a and 51b may be displayed in any screen (background selection screen, graffiti editing screen, etc.) other than the demonstration screen.

Figure 34B:
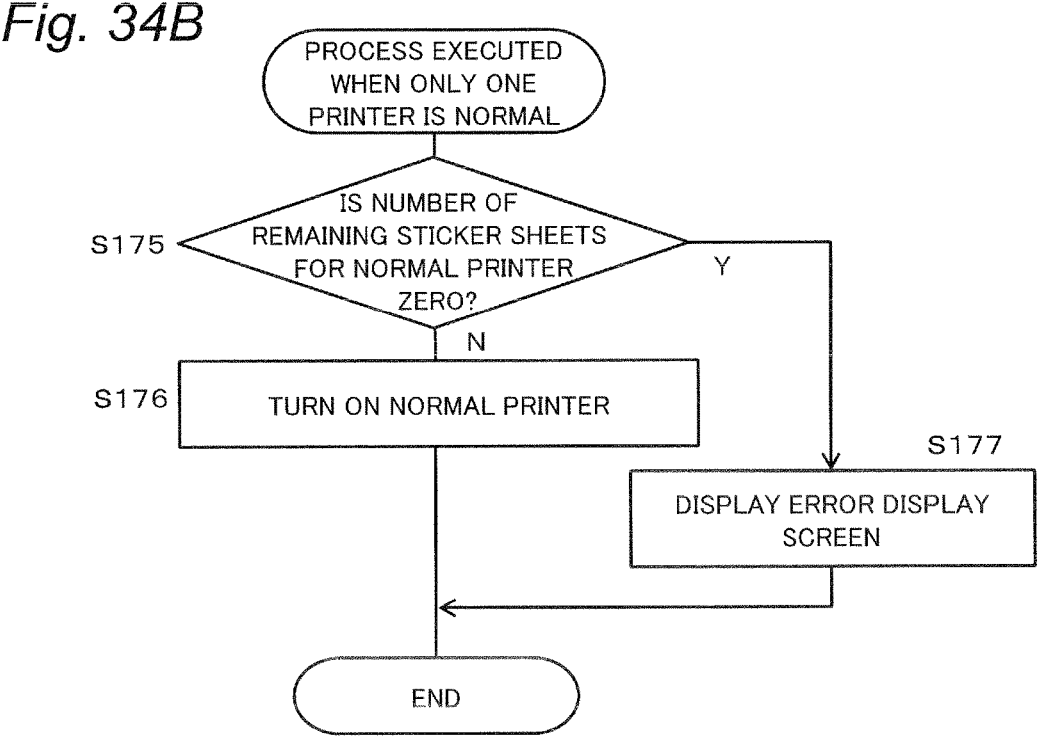
FIG. 34B is a flowchart showing a process performed when only one printer is normal.

Returning to FIG. 33, when either one of first and second printers 51a and 51b is normal (YES in S159), the control device 11 performs a predetermined operation as shown in a flowchart of FIG. 34B (S160). Specifically, in the flowchart of FIG. 34B, the control device 11 determines whether or not the number of remaining sticker sheets for the normal printer 51a or 51b is zero (S175). When the number of remaining sticker sheet for the normal printer is zero (YES in S175), the control device 11 displays an error display on the touch panel monitor 23 (S177). For example, the screen 225 as shown in FIG. 35A is displayed, indicating paper out (lack of sticker sheets) and countermeasure thereof.

Figure 36B:
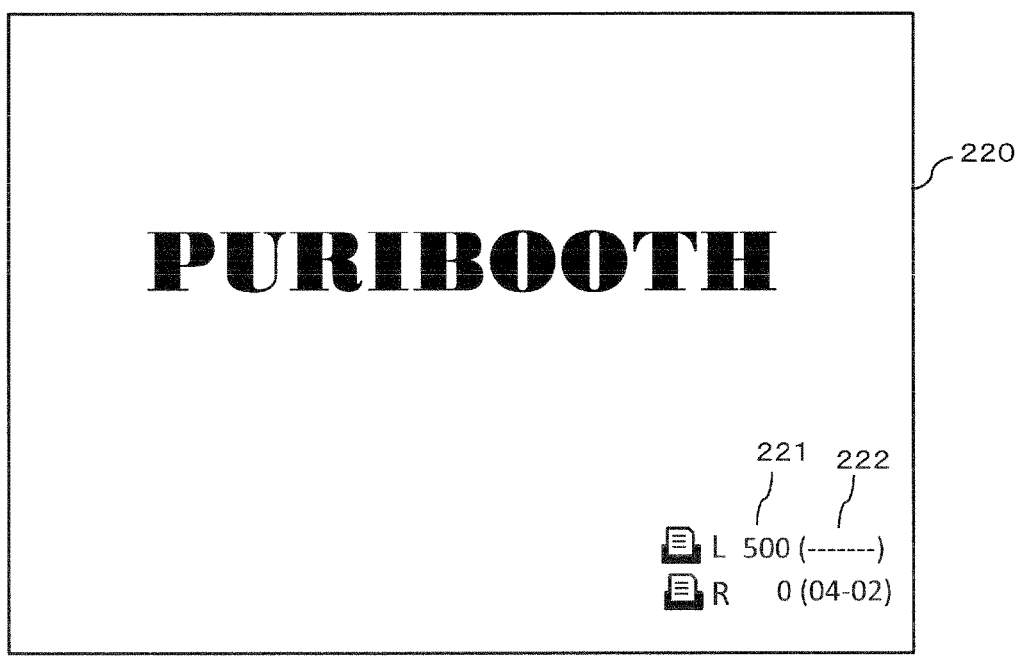
FIG. 36B is a view showing one example of a demonstration screen displaying error indication.

On the other hand, when the number of remaining sticker sheet for the normal printer is not zero (NO in S175), the control device 11 turns on the normal printer (S176), while the printer which is not normal is turned off. Then the control device 11 displays, for example, a demonstration screen 220 as shown in FIG. 36B on the touch panel monitor 23. In the demonstration screen 220, the error code "04-02" indicating the paper out (lack of the sticker sheets) is displayed for the printer having the error (second printer 51b on right side). In this manner, when one of the printers is normal, the error code for the other printer having the error is displayed in the demonstration screen. Referring to the number 221 of the remaining sticker sheets and the error code 222, a person who performs maintenance work of the photograph sticker creating apparatus 1 can easily recognize whether or not the paper out (lack of sticker sheets) and/or other error (for example, out of ink, no power supply, thermal protect) occurs in the printer 51a or 51b.

Figure 35B:
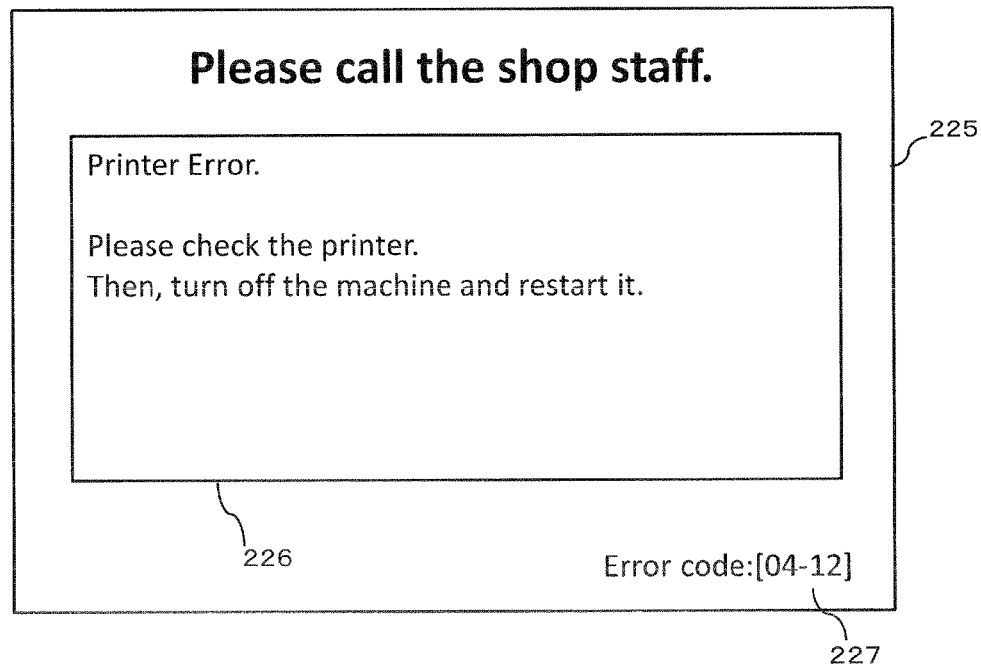
FIG. 35B is a view showing one example of error display screen.

Returning to FIG. 33, when neither of first and second printers 51a and 51b are normal (NO in S159), the control device 11 displays an error display on the touch panel monitor 23 (S163). For example, the error display screen 225 as shown in FIG. 35B is displayed. In this case, the error code for the error of either one of the printers 51a and 51b is indicated on the error display screen 225.

Figure 37:
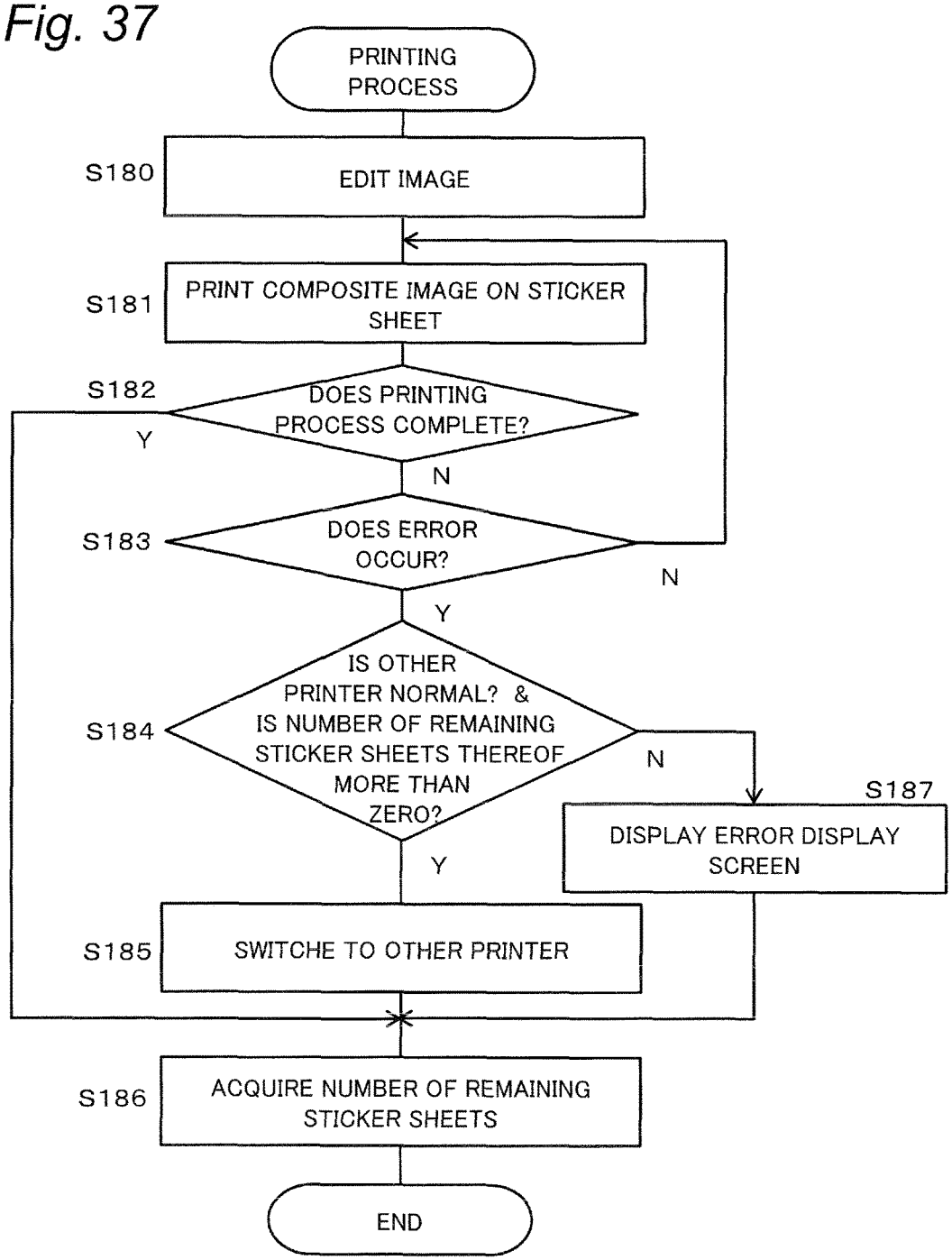
FIG. 37 is a flowchart showing a printing process of the photograph sticker creating apparatus.

With reference to a flowchart of FIG. 37, the printing process in the photograph sticker creating apparatus 1 is described. The control device 11 edits an image for printing based on the background images selected by the background selection process (S3), the layout selected by the layout selection process (S5), and the contents of the graffiti and the decorating image directed by the graffiti editing process (S6) (S180). The control device 11 controls the one of printers that is decided at the startup of the apparatus 1 to print the edited image on the sticker sheet (S181). After completion of the printing the edited image, the control device 11 obtains the number of remaining sticker sheets (S188), then completing the present process. The obtained number of remaining sticker sheets is stored in the RAM 17.

In the middle of printing process, when an error such as paper out (lack of sticker sheets) or paper jam occurs (YES in S183), the control device 11 confirms a status of the printer which is not currently operating (S184). Specifically, the control device 11 determines whether the printer which is not currently operating is normal and the number of remaining sticker sheets thereof is more than zero.

When the printer which is not currently operating is normal and the number of remaining sticker sheets thereof is more than zero (YES in S184), the printer to be used is switched to the printer which is not currently operating (S185). That is, the printer currently operating is turned off and the printer currently not operating is turned on. Then the control device 11 obtains the number of remaining sticker sheets from the printer which is newly operating (S186).

On the other hand, when the printer which is not currently operating is not normal and the number of remaining sticker sheets thereof is not more than zero (NO in S184), the control device 11 displays an error display on the touch panel monitor 23 (S167). For example, the screen as shown in FIG. 35B is displayed. Then the control device 11 obtains the number of remaining sticker sheets from the printer which is newly operating (S186).

As described above, the photograph sticker creating apparatus 1 of the present embodiment preferentially uses the one of printers that has less remaining sticker sheets. When the number of remaining sticker sheets becomes zero, the printer to be used is switched to the other of the printers. This arrangement allows the printer function to be continuously provided for a long time, so that frequency of maintenance work can be reduced. This would be effective to a case where the photograph sticker creating apparatus 1 is installed in an unmanned game arcade or an unmanned store in a shopping mall, and so on.

It is to be noted that the control device 11 of the photograph sticker creating apparatus 1 may determine whether or not a new game can be started by comparing the number of user groups which can simultaneously play the game ("two" in this embodiment) with the number of remaining sticker sheets (the control device 11 recognizes the number of user groups which can simultaneously play the game in the photograph sticker creating apparatus 1). Specifically, when the number of user groups which can simultaneously play the game is less than the number of remaining sticker sheets, the control device 11 may determine that a new game cannot be started. In this case, the control device 11 controls the photograph sticker creating apparatus 1 to accept no request for starting a new game, and to display an indication representing an error such as paper out (lack of sticker sheets) on the touch panel monitor 23. In a state that no request for starting a new game is accepted, it is not accepted to insert coins or bills. In this case, indication representing an error may be displayed on the display, and/or information indicating that no request for starting a new game is accepted may be provided by guide illumination, or the like provided on the photograph sticker creating apparatus 1.

3. Summary of First Embodiment

As described above, the photograph sticker creating apparatus 1 of the present embodiment includes the camera 21 that photographs a user as a subject to generate a shot image, the storage medium 12 that stores a plurality of composite-use images to be combined with the shot image, the control device 11 that combines the shot image generated by the camera 21 with the composite-use image to generate the composite image, the printer 51a, 51b that prints the composite image on the sticker sheet 55, and the touch panel monitor 23 that displays the background selection screen 200 on which the plurality of composite-use images are arranged, the background selection screen 200 allowing the user to select a desired composite-use image to be used for composite image from the plurality of composite-use images. The selection screen 200, . . . is generated by the control device 11. The touch panel monitor 23 receives selection of the composite-use image by the user on the background selection screen 200, . . . . The control device 11 generates and displays the background selection screen 200, . . . on the touch panel monitor 23, by combining a predetermined portrait image with the composite-use image selected by the touch panel monitor 23, and combining no predetermined portrait image with a composite-use image other than the selected composite-use image.

Controlling the display of the background selection screen as described above can enable the user to easily grasp an image to be obtained after the image composition, and also recognize the composite-use image selected on the background selection screen 200, . . . .

Other Embodiments

The variety of ideas described in the above embodiment can be combined as appropriate, or can be changed, replaced, added or omitted as appropriate based on a technical common sense of a skilled person in the art. Hereinafter, other configurations applicable to the ideas disclosed in the above embodiment are described.

In the above embodiment, the composite images with the combined portrait image are displayed for the background set selected by the user on the background selection screen, while only the background images without the combined portrait image are displayed for the background sets which are not selected by the user. On the other hand, only the background images without the combined portrait image may be displayed for the background set selected by the user on the background selection screen, while the composite images with the combined portrait image may be displayed for the background sets which are not selected by the user.

In the above embodiment, four background images are managed in one background set and a background image is selected in units of a background set. However, the method for selecting a background image is not restricted to this manner. The selection may be made in units of a background image. Also in this case, it is possible to similarly apply the variety of ideas of the display method for a composite image on the background selection screen, which have been shown in the above embodiment.

Further, the order of each process in the operation of one example of the photograph sticker creating apparatus shown in the flowchart of FIG. 5 may be changed as appropriate. For example, in the flowchart of FIG. 5, although the background selection process (S3) is executed before the photographing process (S4), the background selection process may be executed after the photographing process. Further, although the layout selection process (S5) is executed after the photographing process (S4), the layout selection process may be implemented before the photographing process.

Moreover, in the above embodiment, the composite images obtained by combining predetermined portrait images stored in the storage medium 12 with the selected background set (or background images) are displayed on the background selection screen 200. In contrast, in the case of executing the background selection process after the photographing process, composite images obtained by combining shot images with the selected background set (background images) may be displayed on the background selection screen 200. In this case, the shot images to be combined with the background images are allocated to the respective background images in the background set in the order of photographing operation.

Figure 38B:
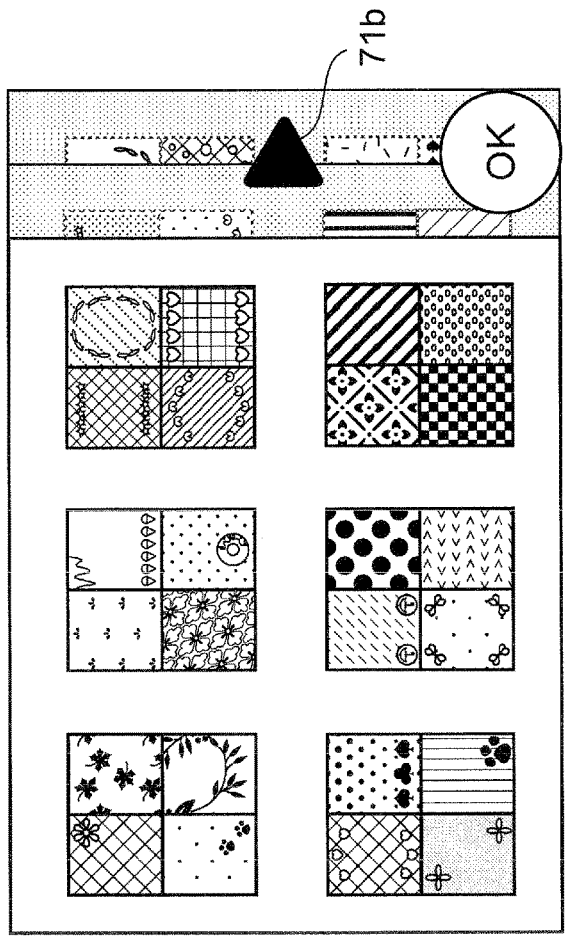
FIG. 38B is a view showing the state of the background selection screen of which page is scrolled to the previous page from the page as shown in FIG. 38A.
Figure 39A:
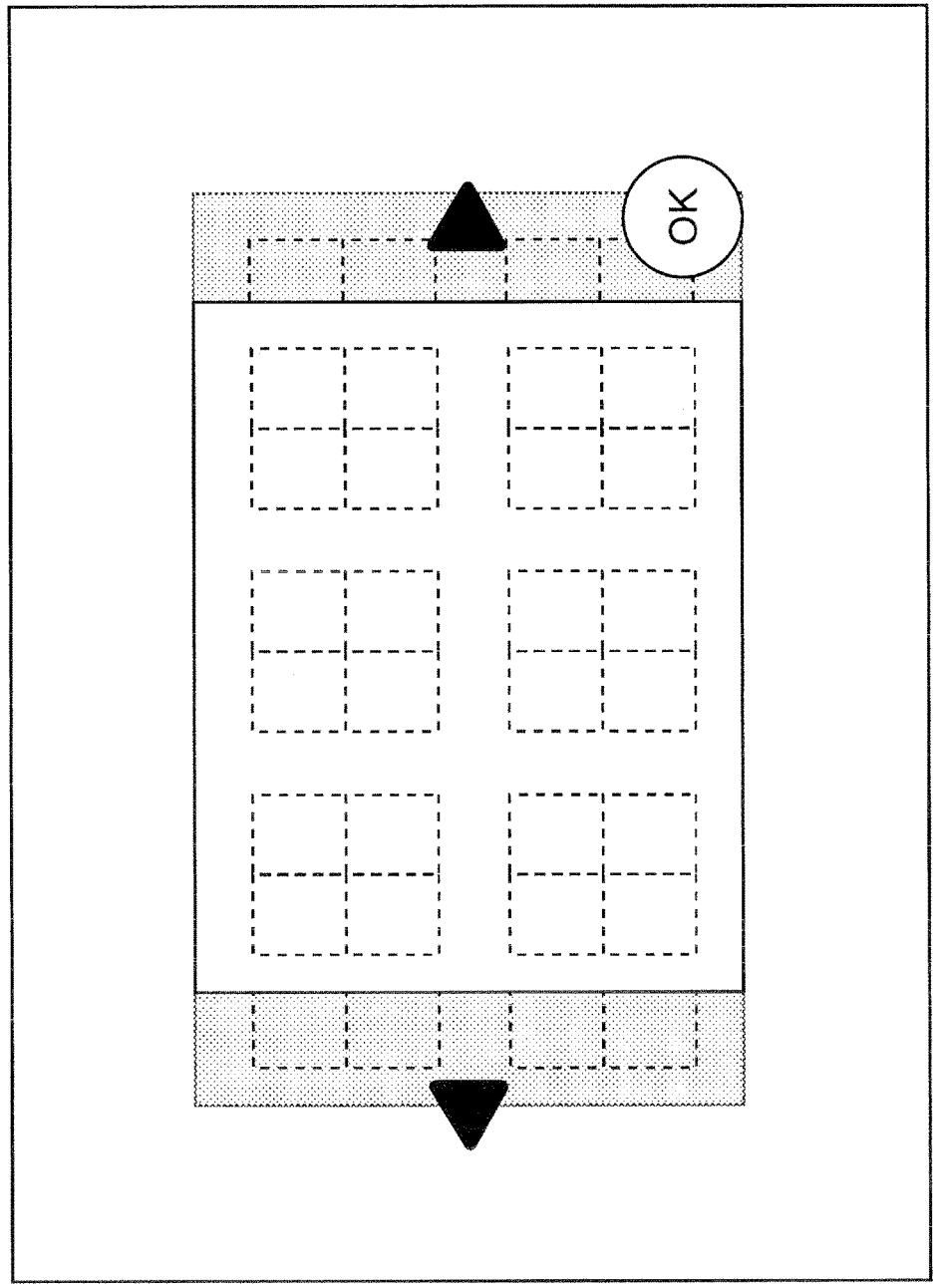
FIG. 39A is a view of the background selection screen with drawing patterns of background sets removed from the background selection screen shown in FIG. 38A.
Figure 39B:
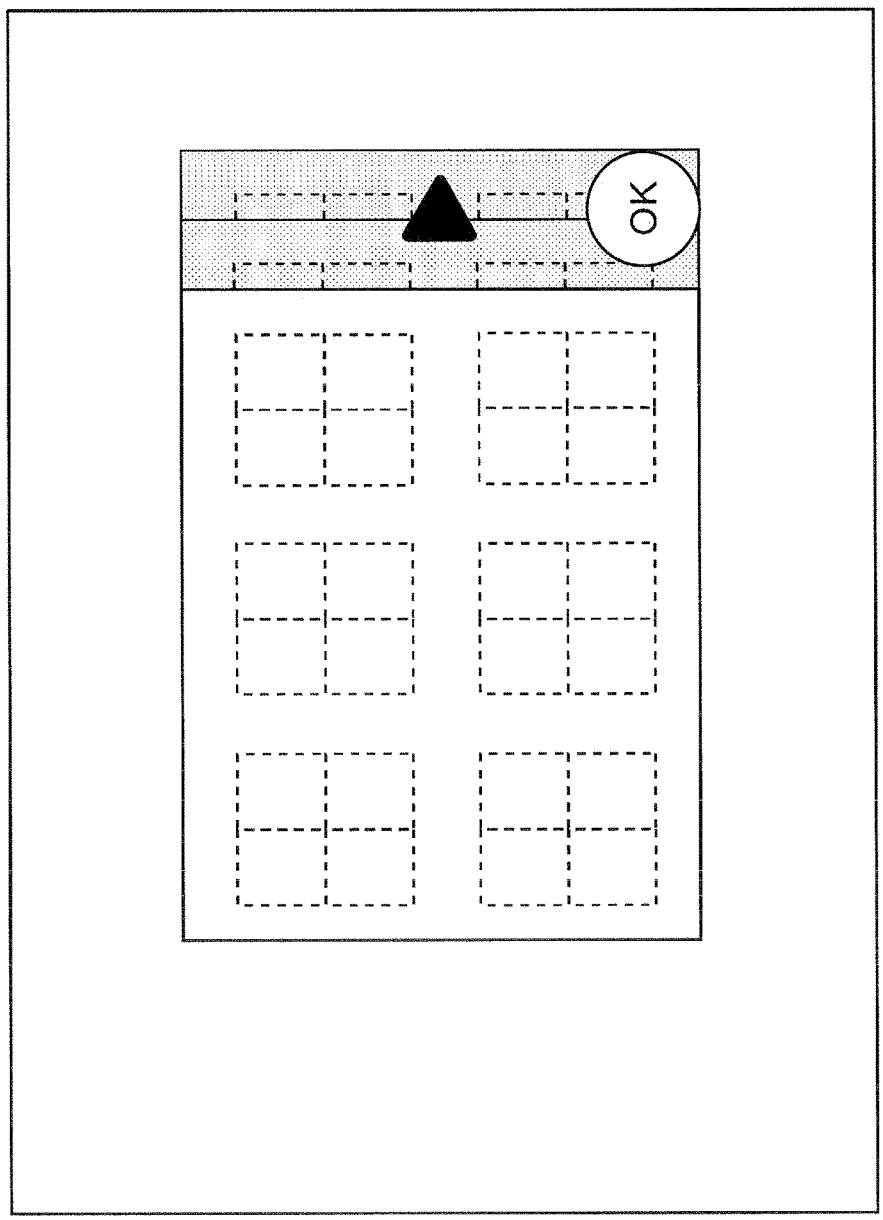
FIG. 39B is a view of the background selection screen with drawing patterns of background sets removed from the background selection screen shown in FIG. 38B.

The layout of the background selection screen 200 is not limited to that as shown in FIG. 7 or the like, and may be those as shown in FIGS. 38A to 38C. FIGS. 38A to 38C show examples with the base image (image selection region) of the background set which composed of three pages. In FIG. 38A, the second page of the base image is displayed as an active page on the most front side, and the first and third pages of the base image including background sets of the first and third pages are displayed at the back of the second page. When a scroll button 71a is pressed in this state, the first page (prior to the second page by one page) of the base image including background sets of the first page is displayed on the most front side, and at the back thereof, the second page of the base image including background sets of the second page is displayed, as shown in FIG. 38B. Further, at the back of the second page, the third page of the base image including background sets of the third page is displayed. When a scroll button 71b is pressed in the state shown in FIG. 38, the third page (posterior to the second page by one page) of the base image including background sets of the third page is displayed on the most front side, and at the back thereof, the second page of the base image including background sets of the second page is displayed, as shown in FIG. 38C. Further, at the back of the second page, the first page of the base image including background sets of the first page is displayed. In this manner, the scroll buttons 71a and 71b can switch the background sets to be displayed on the most front side. FIGS. 39A, 39B and 39C are drawings in which drawing patterns of background sets are removed from the background selection screen shown in FIGS. 38A, 38B and 38C, respectively, so that the layout of the background sets can easily be understood.

The ideas disclosed in the above embodiment can also be applied to an image process apparatus other than the photograph sticker creating apparatus. That is, the ideas disclosed in the above embodiment can be applied to an image processing apparatus that combines a composite-use image with a shot image, and displays a selection screen for selecting a composite-use image to be combined with the shot image.

The above embodiment also discloses the ideas of the following image processing apparatus, and the like. It is to be noted that the photograph sticker creating apparatus 1 is one example of the image processing apparatus. The camera 21 is one example of the image pickup device. The storage medium 12, the removable media 15 and the RAM 17 are each one example of the storage device. The background set and the background image are one example of the composite-use image. The base image 71 is one example of the image selection region. The background selection screen 200, . . . , is one example of the selection screen. The control device 11 is one example of the compositing processor. The touch panel monitor is one example of the direction receiving device. The configuration formed by combining the control device 11 and the touch panel monitor 23 is one example of the display processor. The printer 51a, 51b and the printing section 130 are one example of the printing device.

(1) An image processing apparatus (1) includes: an image pickup device (21) configured to shoot an image of a user to generate a shot image, a storage device (15) configured to store a plurality of composite-use images, each composite-use image to be combined with the shot image; a compositing processor (11) configured to combine the shot image generated in the image pickup device and the composite-use image to generate a composite image; a printing device (51a, 51b, 130) configured to print the composite image on a sticker sheet; a display processor (11, 23) configured to generate and display a selection screen (200, . . . ) which allows the user to select a desired composite-use image to be used for the composite image from a plurality of composite-use images, the selection screen including the plurality of composite-use images disposed in the image selection region (71); and a direction receiving device (23) configured to receive selection of the composite-use image performed by the user on the selection screen.

The display processor (11, 23) combines a predetermined portrait image with the composite-use image selected by the direction receiving device and does not combine the portrait image with a composite-use image other than the selected composite-use image, in the image selection region (71), to generate and display the selection screen.

With this configuration, the user can recognize the selected composite-use image (back round image), and can also imagine the shot image combined with the background image.

(2) The display processor (11, 23) may generate and display the selection screen (200, . . . ) so as to simultaneously display a composite-use image (61a) which is selected by the direction receiving device and is combined with the portrait image, and a composite-use image (61) which is other than the composite-use image selected by the direction receiving device and is not combined with the portrait image (see FIG. 9).

With this configuration, the user can confirm the composite-use image (background image) combined with the portrait image and the composite-use image (background image) not combined with the portrait image, comparing those composite-use images.

(3) Further, the display processor (11, 23) may generate and display the selection screen (200*a*, 200*b*, . . . ) so as to alternately display a composite-use image (61*a*) which is selected by the direction receiving device and is combined with the portrait image, and a composite-use image (61) which is the composite-use image selected by the direction receiving device and is not combined with the portrait image (see FIG. 10).

Also with this configuration, the user can confirm the composite-use image (background image) combined with the portrait image and the composite-use image (background image) not combined with the portrait image, comparing those composite-use images.

(4) The display processor (11, 23) may make a displaying method of a composite-use image which is selected by the user and is combined with the portrait image, different from a displaying method of a composite-use image which is other than the composite-use image selected by the user and is not combined with the portrait image (see FIGS. 14, 16, 18).

With this configuration, the user can clearly discriminate and recognize the selected background image and the non-selected background image.

(5) In (4), the composite-use image which is selected by the user and is combined with the portrait image, may be made different from the composite-use image which is other than the composite-use image selected by the user and is not combined with the portrait image, in terms of at least one of a saturation, a brightness, a tone, a size, color inversion and movement of the composite-use image.

(6) The display processor may display a guidance image that prompts a user to strike a pose at the time of shooting an image (see FIG. 29). The guidance image may be changed in accordance with the composite-use image selected by the direction receiving device.

(7) The display processor may display the plurality of composite-use images over a plurality of pages on the selection screen. The direction receiving device (71*a*, 71*b*) may receive a selection of a desired page by the user from the plurality of pages. In the case of displaying the plurality of composite-use images over the plurality of pages, the display processor (11, 23) May make a displaying method of objects (images) related to a page selected by the direction receiving device different from a displaying method of objects related to a page not selected by the direction receiving device (graying out, changing a display size, etc., see FIG. 7). This can enables the user to easily discriminate and recognize the currently selected page and the currently non-selected page.

(8) The display processor may display information indicating a ranking of the composite-use image based on the frequency of selection on the selection screen (see FIG. 27). Hence the user can recognize which composite-use image is popular.

(9) There may further be provided a notification unit (cf. 23, 25, 26*a* to 26*e*) configured to notify the user of information affirming appropriateness of the selection of the composite-use image selected by the direction receiving device (see FIG. 28). The user who hesitates to make a selection can be confident in his or her selection, and consequently, the selection operation can be rapidly completed.

(10) The selection screen (200*x*, 200*y*) may have a first region (71, 85) in which a plurality of selectable composite-use images are arranged, and a second region (82, 83) in which a composite-use image selected on the selection screen is arranged. In the second region, the composite-use image may be displayed, combined with the portrait image (see FIGS. 20A, 22B, and 22). Hence the user can check the selected composite-use image before making a final decision in the second region.

(11) When a plurality of composite-use images are selected and displayed on the selection screen, the direction receiving device may receive, from the user, a direction to interchange displayed positions of the selected composite-use images (see FIG. 24B). The display processor may change the displayed positions of the selected composite-use images based on the direction received by the direction receiving device (see FIG. 24C). The compositing processor may associate the shot image generated in the image pickup device with the composite-use image in accordance with the changed displayed position of the composite-use image, and combines the associated images with each other. Hence it is possible to set/change the background image to a favorite position, and also possible to change the background image to be combined with the shot image.

(12) In (11), the direction receiving device may receive, prior to shooting of image, the direction to interchange the displayed positions of the selected composite-use images.

(13) In (11), the direction receiving device may receive, after shooting of images, the direction to interchange the displayed positions of the selected composite-use images.

(14) In any one of (1) through (13), the composite-use image may include a foreground image and/or a background image.

(15) In any of (1) one through (13), a predetermined number of composite-use images may be managed as one composite-use image group. The direction receiving device may select composite-use images for each of composite-use image groups on the selection screen.

(16) An image processing method includes the steps of: shooting an image of a user to generate a shot image with a image pickup device (21); generating a selection screen (200, . . . ) which allows the user to select a desired composite-use image to be used for the composite image from a plurality of composite-use images stored in a predetermined recording medium (15), the selection screen including the plurality of composite-use images disposed in an image selection region (71); displaying the selection screen on a display unit (23); receiving selection of the composite-use image performed by the user on the selection screen; combining the shot image generated in the image pickup device and the composite-use image selected on the selection screen to generate a composite image; and printing the composite image on a sticker sheet (55) with a printing device (51*a*, 51*b*, 130). In the generating the selection screen, on an image selection region (71), a predetermined portrait image is combined with the selected composite-use image, and the predetermined portrait image is not combined with a composite-use image other than the selected composite-use image, thereby to generate the selection screen.

This application is based on the Japanese patent application No. 2014-232104, filed on Nov. 14, 2014, the entire contents of which are incorporated herein by reference.

Although the present disclosure has been described in connection with specified embodiments thereof, many other modifications, corrections and applications are apparent to those skilled in the art. Therefore, the present invention is not limited by the disclosure provided herein but limited only to the scope of the appended claims.

The invention claimed is:

1. A photograph sticker creating apparatus, comprising:
an image pickup device configured to shoot an image of a user to generate a shot image;
a storage device configured to store a plurality of composite-use images, each composite-use image to be combined with the shot image;
a compositing processor configured to combine the shot image generated in the image pickup device and the composite-use image to generate a composite image;
a printing device configured to print the composite image on a sticker sheet;
a display processor configured to generate and display selection screen which allows the user to select a desired composite-use image to be used for the composite image from a plurality of composite-use images, the selection screen including the plurality of composite-use images disposed in an image selection region; and
a direction receiving device configured to receive selection of the composite-use image performed by the user on the selection screen,
wherein the display processor combines a predetermined portrait image with the composite-use image selected by the direction receiving device and does not combine the portrait image with a composite-use image other than the selected composite-use image, in the image selection region, to generate and display the selection screen.

2. The photograph sticker creating apparatus according to claim 1, wherein the display processor generates and displays the selection screen so as to simultaneously display a composite-use image which is selected by the direction receiving device and is combined with the portrait image, and a composite-use image which is other than the composite-use image selected by the direction receiving device and is not combined with the portrait image.

3. The photograph sticker creating apparatus according to claim 1, wherein the display processor generates and displays the selection screen so as to alternately display a composite-use image which is selected by the direction receiving device and is combined with the portrait image, and a composite-use image which is the composite-use image selected by the direction receiving device and is not combined with the portrait image.

4. The photograph sticker creating apparatus according to claim 1, wherein the display processor makes a displaying method of a composite-use image which is selected by the user and is combined with the portrait image, different from a displaying method of a composite-use image which is other than the composite-use image selected by the user and is not combined with the portrait image.

5. The photograph sticker creating apparatus according to claim 4, wherein the display processor makes the composite-use image which is selected by the user and is combined with the portrait image, different from the composite-use image which is other than the composite-use image selected by the user and is not combined with the portrait image, in terms of at least one of a saturation, a brightness, a tone, a size, color inversion and movement of the composite-use image.

6. The photograph sticker creating apparatus according to claim 1, wherein
the display processor displays a guidance image that prompts a user to strike a pose at the time of shooting an image, and
the guidance image is changed in accordance with the composite-use image selected by the direction receiving device.

7. The photograph sticker creating apparatus according to claim 1, wherein
the display processor displays the plurality of composite-use images over a plurality of pages on the selection screen,
the direction receiving device receives a selection of a desired page by the user from the plurality of pages, and
in the case of displaying the plurality of composite-use images over the plurality of pages, the display processor makes a displaying method of objects related to a page selected by the direction receiving device different from a displaying method of objects related to a page not selected by the direction receiving device.

8. The photograph sticker creating apparatus according to claim 1, wherein the display processor displays information indicating a ranking of the composite-use image based on frequency of selection on the selection screen.

9. The photograph sticker creating apparatus according to claim 1, further comprising a notification unit configured to notify the user of information affirming appropriateness of the selection of the composite-use image selected by the direction receiving device.

10. The photograph sticker creating apparatus according to claim 1, wherein
the selection screen has a first region in which a plurality of selectable composite-use images are arranged and a second region in which a composite-use image which is selected on the selection screen, and
in the second region, the composite-use image is displayed, combined with the portrait image.

11. The photograph sticker creating apparatus according to claim 1, wherein
the direction receiving device receives, from the user, a direction to interchange displayed positions of selected composite-use images, when a plurality of composite-use images are selected and displayed on the selection screen,
the display processor changes the displayed positions of the selected composite-use images based on the direction received by the direction receiving device, and
the compositing processor associates the shot image generated in the image pickup device with the composite-use image in accordance with the changed displayed position of the composite-use image, and combines the associated images with each other.

12. The photograph sticker creating apparatus according to claim 11, wherein the direction receiving device receives, prior to shooting of images, the direction to interchange the displayed positions of the selected composite-use images.

13. The photograph sticker creating apparatus according to claim 11, wherein the direction receiving device receives, after shooting of images, the direction to interchange the displayed positions of the selected composite-use images.

14. The photograph sticker creating apparatus according to claim 1, wherein the composite-use image includes a foreground image and/or a background image.

15. The photograph sticker creating apparatus according to claim 1, wherein a predetermined number of composite-use images are managed as one composite-use image group, and the direction receiving device selects composite-use images for each of composite-use image groups on the selection screen.

16. A method of creating a photograph sticker comprising:

shooting an image of a user to generate a shot image with an image pickup device;

generating a selection screen which allows the user to select a desired composite-use image to be used for the composite image from a plurality of composite-use images stored in a predetermined recording medium, the selection screen including the plurality of composite-use images disposed in an image selection region;

displaying the selection screen on a display unit;

receiving selection of the composite-use image performed by the user on the selection screen;

combining the shot image generated in the image pickup device and the composite-use image selected on the selection screen to generate a composite image; and printing the composite image on a sticker sheet with a printing device, wherein, in the generating the selection screen, on an image selection region, a predetermined portrait image is combined with the selected composite-use image, and the predetermined portrait image is not combined with a composite-use image other than the selected composite-use image, thereby to generate the selection screen.

* * * * *